US010942985B2

(12) United States Patent
Espig et al.

(10) Patent No.: US 10,942,985 B2
(45) Date of Patent: Mar. 9, 2021

(54) APPARATUSES, METHODS, AND SYSTEMS FOR FAST FOURIER TRANSFORM CONFIGURATION AND COMPUTATION INSTRUCTIONS

(71) Applicant: Intel Corporation, Santa Clara, CA (US)

(72) Inventors: Michael Espig, Newberg, OR (US); Christopher J. Hughes, Santa Clara, CA (US); Jongsoo Park, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 16/236,464

(22) Filed: Dec. 29, 2018

(65) Prior Publication Data
US 2020/0210516 A1  Jul. 2, 2020

(51) Int. Cl.
*G06F 17/14* (2006.01)
*G06F 17/16* (2006.01)
(Continued)

(52) U.S. Cl.
CPC .......... *G06F 17/142* (2013.01); *G06F 7/5443* (2013.01); *G06F 9/3016* (2013.01);
(Continued)

(58) Field of Classification Search
CPC ....... G06F 7/4806–4812; G06F 7/5443; G06F 15/8023; G06F 17/142; G06F 17/16; G06F 9/30036; G06F 9/3893
See application file for complete search history.

(56) References Cited

U.S. PATENT DOCUMENTS 5,247,632 A    9/1993 Newman
5,475,822 A   12/1995 Sibigtroth et al.
(Continued)

FOREIGN PATENT DOCUMENTS

KR   10-2011-0079495 A   7/2011
WO      2004/053841 A2   6/2004
(Continued)

OTHER PUBLICATIONS

Corrected Notice of Allowability, U.S. Appl. No. 15/201,442, dated Jan. 22, 2019, 5 pages.
(Continued)

*Primary Examiner* — Matthew D Sandifer
(74) *Attorney, Agent, or Firm* — Nicholson De Vos Webster & Elliott LLP

(57) ABSTRACT

Systems, methods, and apparatuses relating to performing fast Fourier transform (FFT) configuration and computation operations are described. In one embodiment, a processor includes a matrix operations accelerator circuit that includes a two-dimensional grid of processing element circuits; a first plurality of registers that represents a first two-dimensional matrix coupled to the matrix operations accelerator circuit; a second plurality of registers that represents a second two-dimensional matrix coupled to the matrix operations accelerator circuit; a decoder, of a core coupled to the matrix operations accelerator circuit, to decode a single instruction into a decoded single instruction; and an execution circuit of the core to execute the decoded single instruction to cause the two-dimensional grid of processing element circuits to operate on a first packed data input value and a first complex twiddle factor value to produce a first result and a second result.

24 Claims, 40 Drawing Sheets

(51) Int. Cl.
*G06F 7/544* (2006.01)
*G06F 9/30* (2018.01)
*G06F 9/38* (2018.01)

(52) U.S. Cl.
CPC ........ *G06F 9/30036* (2013.01); *G06F 9/3893* (2013.01); *G06F 17/16* (2013.01)

(56) References Cited

U.S. PATENT DOCUMENTS

| | | | |
|---|---|---|---|
| 5,892,962 | A | 4/1999 | Cloutier |
| 6,161,219 | A | 12/2000 | Ramkumar et al. |
| 6,212,112 | B1 | 4/2001 | Naura et al. |
| 6,332,186 | B1 | 12/2001 | Elwood et al. |
| 6,877,020 | B1 | 4/2005 | Bratt et al. |
| 7,003,542 | B2 | 2/2006 | Devir |
| 7,209,939 | B2 | 4/2007 | Castrapel et al. |
| 7,725,521 | B2 | 5/2010 | Chen et al. |
| 7,792,895 | B1 | 9/2010 | Juffa et al. |
| 7,873,812 | B1 | 1/2011 | Mimar |
| 7,912,889 | B1 | 3/2011 | Juffa et al. |
| 7,932,910 | B2 | 4/2011 | Hansen et al. |
| 8,392,487 | B1 | 3/2013 | Mesh et al. |
| 8,984,043 | B2 | 3/2015 | Ginzburg et al. |
| 9,442,723 | B2 | 9/2016 | Yang et al. |
| 9,906,359 | B2 | 2/2018 | Gueron |
| 9,960,907 | B2 | 5/2018 | Gueron |
| 10,535,114 | B2 | 1/2020 | Bolz |
| 2003/0126176 | A1 | 7/2003 | Devir |
| 2004/0111587 | A1 | 6/2004 | Nair et al. |
| 2005/0193050 | A1 | 9/2005 | Sazegari |
| 2006/0101245 | A1 | 5/2006 | Nair et al. |
| 2006/0190517 | A1 | 8/2006 | Guerrero |
| 2007/0186210 | A1 | 8/2007 | Hussain et al. |
| 2008/0071851 | A1 | 3/2008 | Zohar et al. |
| 2008/0140994 | A1 | 6/2008 | Khailany et al. |
| 2008/0208942 | A1 | 8/2008 | Won et al. |
| 2009/0043836 | A1 | 2/2009 | Dupaquis et al. |
| 2009/0292758 | A1 | 11/2009 | Brokenshire et al. |
| 2009/0300091 | A1 | 12/2009 | Brokenshire et al. |
| 2009/0300249 | A1 | 12/2009 | Moyer et al. |
| 2010/0180100 | A1 | 7/2010 | Lu et al. |
| 2010/0325187 | A1 | 12/2010 | Juffa et al. |
| 2012/0079252 | A1 | 3/2012 | Sprangle |
| 2012/0113133 | A1 | 5/2012 | Shpigelblat |
| 2012/0137074 | A1 | 5/2012 | Kim et al. |
| 2012/0254588 | A1 | 10/2012 | Adrian et al. |
| 2012/0314774 | A1 | 12/2012 | Yang et al. |
| 2013/0305020 | A1 | 11/2013 | Valentine et al. |
| 2014/0149480 | A1 | 5/2014 | Catanzaro et al. |
| 2014/0280420 | A1* | 9/2014 | Khan .................. G06F 9/3887 708/404 |
| 2015/0067302 | A1 | 3/2015 | Gueron |
| 2015/0199266 | A1 | 7/2015 | Franchetti et al. |
| 2018/0113708 | A1 | 4/2018 | Corbal et al. |
| 2018/0189063 | A1 | 7/2018 | Fleming et al. |
| 2018/0189231 | A1 | 7/2018 | Fleming, Jr. et al. |
| 2020/0034145 | A1* | 1/2020 | Bainville .............. G06F 9/3001 |

FOREIGN PATENT DOCUMENTS

| | | |
|---|---|---|
| WO | 2016/003740 A1 | 1/2016 |
| WO | 2016/105727 A1 | 6/2016 |
| WO | 2018/125250 A1 | 7/2018 |

OTHER PUBLICATIONS

Corrected Notice of Allowability, U.S. Appl. No. 15/201,442, dated Mar. 11, 2019, 2 pages.
International Preliminary Report on Patentability, PCT App. No. PCT/US2017/040546, dated Oct. 3, 2019, 10 pages.
International Search Report and Written Opinion, PCT App. No. PCT/US2017/040546, dated Jan. 24, 2018, 15 pages.
Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.
Non-Final Office Action, U.S. Appl. No. 15/201,442, dated May 4, 2018, 11 pages.
Non-Final Office Action, U.S. Appl. No. 16/398,200, dated Jul. 28, 2020, 17 pages.
Notice of Allowance, U.S. Appl. No. 15/201,442, dated Dec. 14, 2018, 5 pages.
"FFT," Reliable Software, Apr. 23, 2006, downloaded from https://web.archive.org/web/20060423170713/http:/www.relisoft.com/science/Physics/fft.html on Dec. 31, 2018, 5 pages.

* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

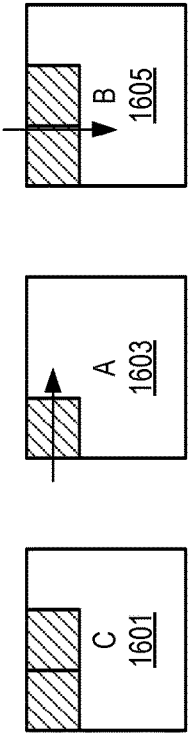

TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE

FIG. 16

| PALETTE ID 1901 | STARTM 1903 |
|---|---|
| STARTP 1905 | PAIR INDICATORS 1907 |
| 0 | 0 |
| 0 | 0 |

. . .

| 0 | 0 |
|---|---|
| TMM0 ROWS 1913 | TMM0 COLUMNS 1915 |
| TMM1 ROWS | TMM1 COLUMNS |
| ▪ ▪ ▪ | |
| TMM15 ROWS | TMM15 COLUMNS |
| 0 | |

FIG. 19

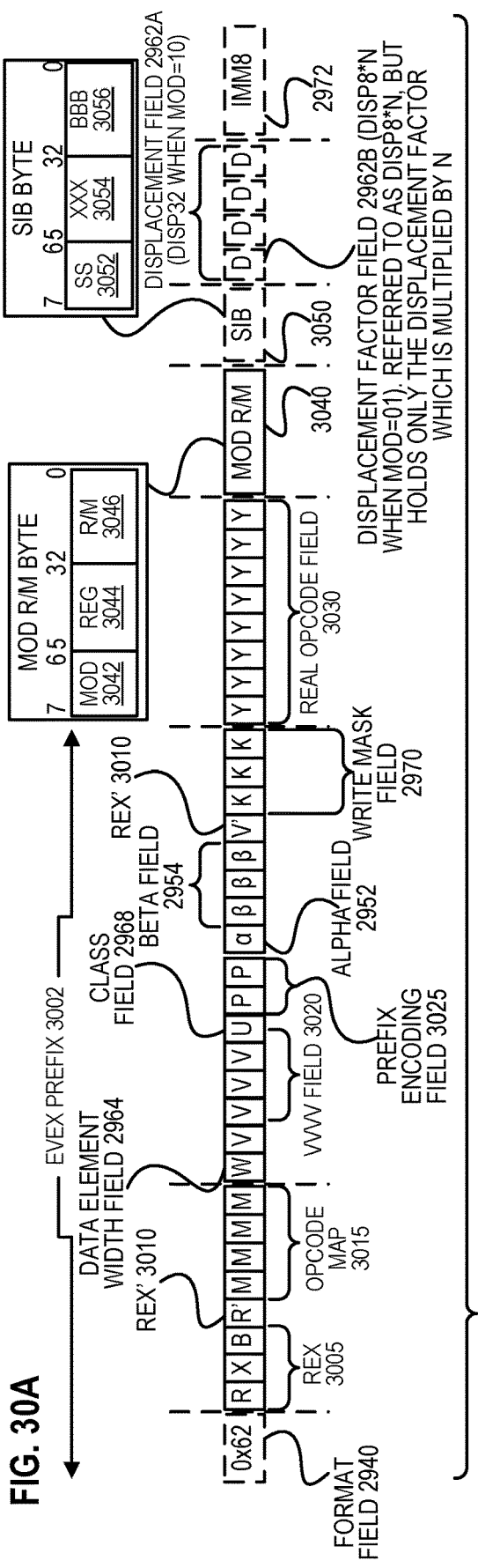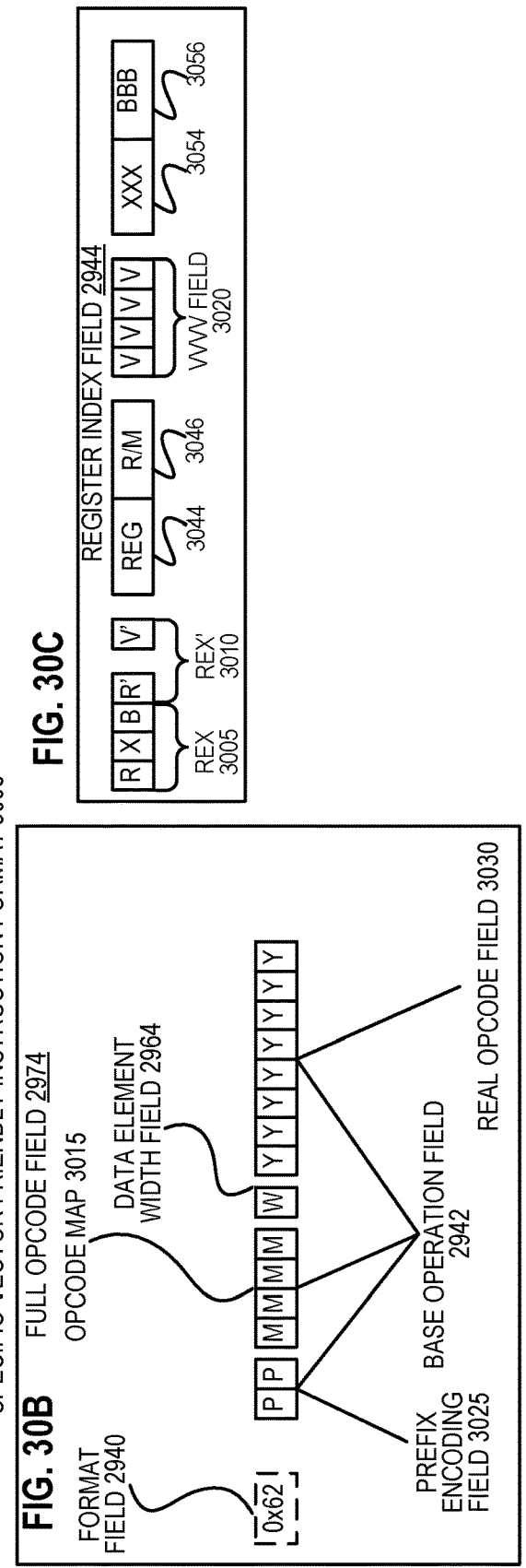

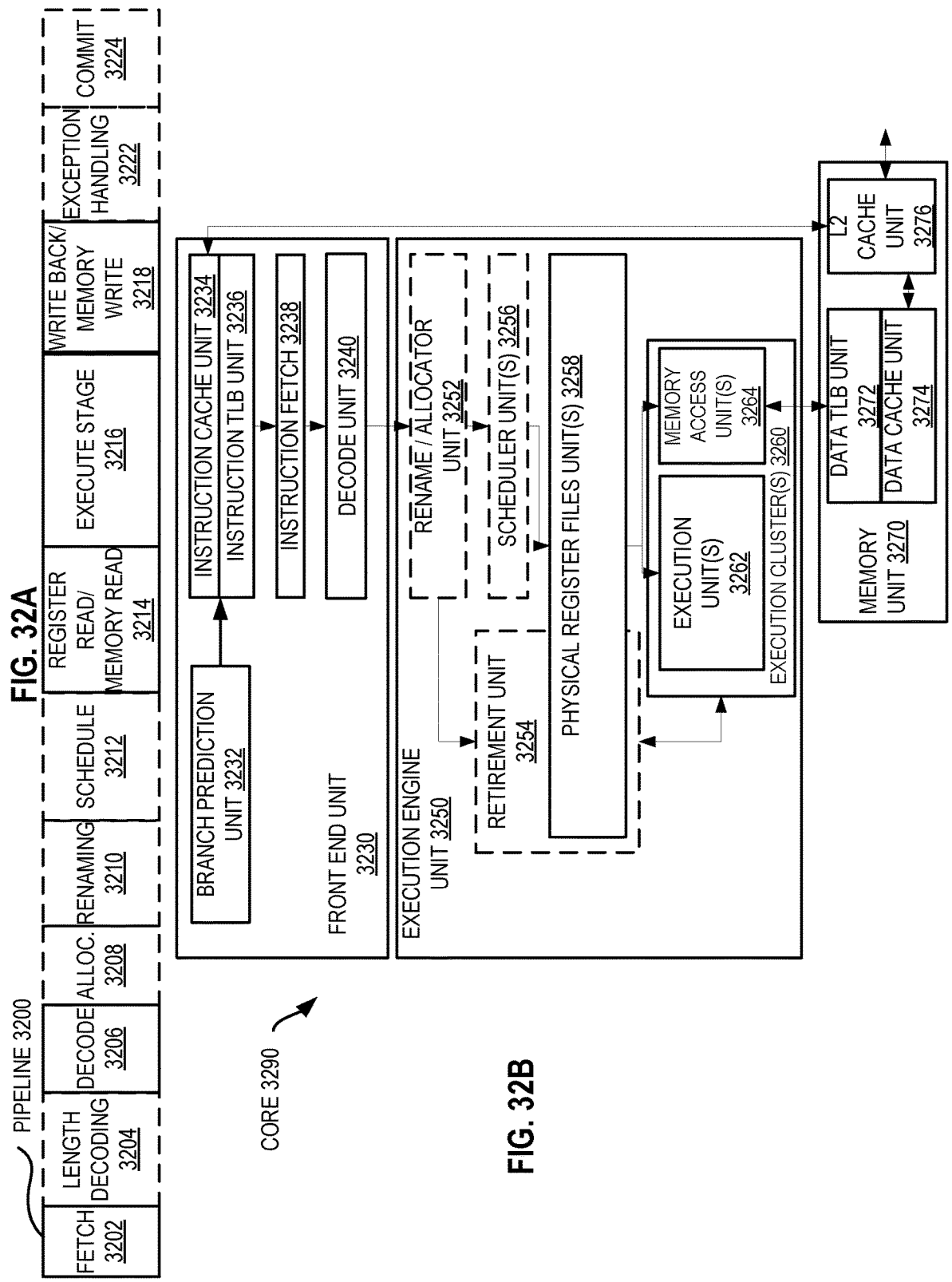

APPARATUSES, METHODS, AND SYSTEMS FOR FAST FOURIER TRANSFORM CONFIGURATION AND COMPUTATION INSTRUCTIONS

FIELD OF INVENTION

The disclosure relates generally to electronics, and, more specifically, an embodiment of the disclosure relates to circuitry to implement fast Fourier transform (FFT) configuration and computing instructions.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment.
FIG. 15 illustrates an example of a matrix expressed in row major format and column major format.
FIG. 16 illustrates an example of usage of matrices (tiles).
FIG. 19 illustrates an embodiment of a description of the matrices (tiles) to be supported.
FIG. 30A is a block diagram illustrating fields for the generic vector friendly instruction formats in FIGS. 29A and 29B according to embodiments of the disclosure.
FIG. 30B is a block diagram illustrating the fields of the specific vector friendly instruction format in FIG. 30A that make up a full opcode field according to one embodiment of the disclosure.
FIG. 30C is a block diagram illustrating the fields of the specific vector friendly instruction format in FIG. 30A that make up a register index field according to one embodiment of the disclosure.
FIG. 32A is a block diagram illustrating both an exemplary in-order pipeline and an exemplary register renaming, out-of-order issue/execution pipeline according to embodiments of the disclosure.
FIG. 32B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1A:
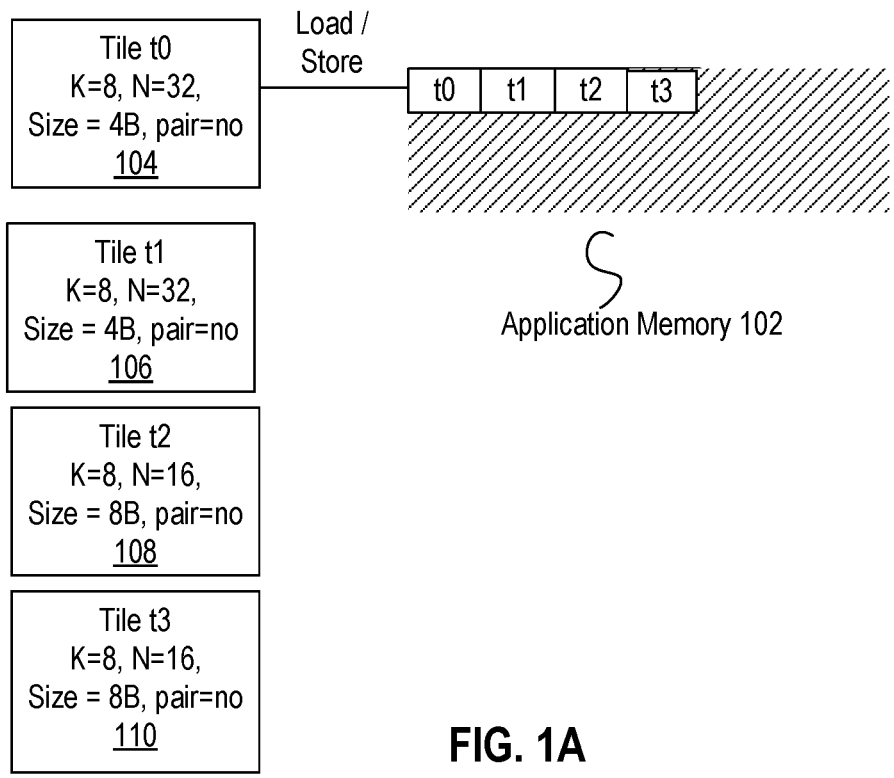
FIG. 1A illustrates an embodiment of configured tiles.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Matrices may be increasingly important in many computing tasks such as machine learning and other bulk data processing. Deep Learning is a class of machine learning algorithms Deep learning architectures, such as deep neural networks, may be applied to fields including computer vision, speech recognition, natural language processing, audio recognition, social network filtering, machine translation, bioinformatics and drug design.

Inference and training, two tools used for deep learning, may utilize low precision arithmetic. Maximizing throughput of deep learning algorithms and computations may assist in meeting the needs of deep learning processors, for example, those performing deep learning in a data center.

Matrix-matrix multiplication (a.k.a., GEMM or General Matrix Multiplication) is a compute-heavy operation on certain processors. Special hardware for matrix multiplication (e.g., GEMM) is a good option for improving the peak compute (and energy efficiency) of certain applications, such as deep learning. Some of these applications, including deep learning, can operate on input data elements with relatively few bits without losing accuracy, as long as the output elements have enough bits (e.g., more than the inputs).

In certain processors, handling matrices is a difficult and/or instruction intensive task. For example, rows of a matrix could be put into a plurality of packed data (e.g., SIMD or vector) registers and then operated on individually. For example, an add two 8×2 (e.g., row by column) matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

Discussion

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (e.g., use less than all of a tile) or utilize a plurality of tiles (e.g., the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transform, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc. Also described herein are instructions for performing fast Fourier transform (FFT) configuration and computing instructions.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating point, double precision floating point, integer, etc.) may be supported.

Exemplary Usage of Configured Tiles

In some embodiments, tile parameters can be configured. For example, a given tile may be configured to provide tile options. Exemplary tile options include but are not limited to: a number of rows of the tile, a number of columns of the tile, whether the tile is VALID, and whether the tile consists of a PAIR of equal-sized tiles.

FIG. 1A illustrates an embodiment of configured tiles. As shown, 4 kB of application memory 102 have stored thereon 4 (e.g., 1 kiloByte (1 kB)) tites, tile t0 104, tile t1 106, tile t2 108, and tile t3 110. In this example, the 4 tiles do not consist of pairs, and each have elements arranged in rows and columns. Tile t0 104 and tile t1 106 have K rows and N columns of 4-byte elements (e.g., single precision data), where K equals 8 and N=32. Tile 2 108 and tile 3 110 have K rows and N/2 columns of 8-byte elements (e.g., double precision data). As the double precision operands are twice the width of single precision, this configuration is consistent with a palette, used to provide tile options, supplying at least 4 names with total storage of at least 4 kB. In operation, the tiles can be loaded from and stored to memory using load and store operations. Depending upon the instruction encoding scheme used, the amount of available application memory, as well as the size, number, and configuration of available tiles varies.

Figure 1B:
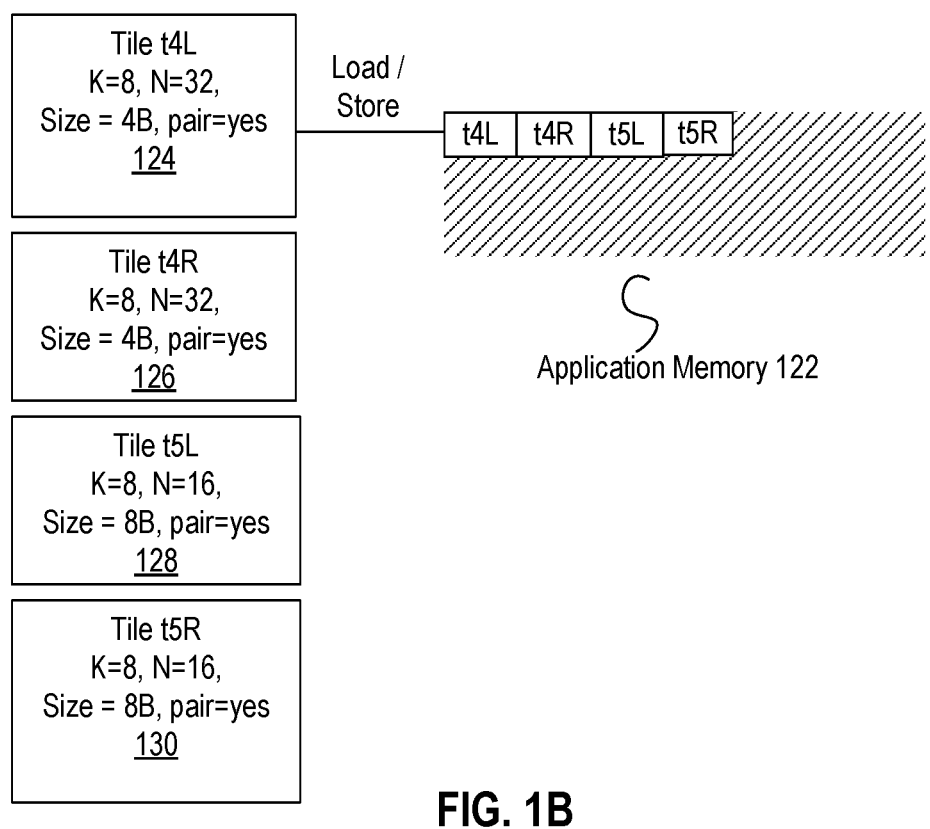
FIG. 1B illustrates an embodiment of configured tiles.

FIG. 1B illustrates an embodiment of configured tiles. As shown, 4 kB of application memory 122 have stored thereon 2 pairs of 1 kB-titles, the first pair being tile t4L 124 and tile t4R 126, and the second pair being tile t5L 128 and tile t5R 130. As shown the pairs of tiles are divided into a left tile and a right tile. In other embodiments, the pair of tiles are divided into an even tile and an odd tile. In this example, the 4 tiles each have elements arranged in rows and columns Tile t4L 124 and tile t4R 126 have K rows and N columns of 4-byte elements (e.g., single precision floating point data), where K equals 8 and N equals 32. Tile t5L 128 and tile t5R 130 have K rows and N/2 columns of 8-byte elements (e.g., double precision floating point data). As the double precision operands are twice the width of single precision, this configuration is consistent with a palette, used to provide tile options, supplying at least 2 names with total storage of at least 4 kB. The four tiles of FIG. 1A use 4 names, each naming a 1 kB tile, whereas the 2 pairs of tiles in FIG. 1B can use 2 names to specify the paired tiles. In some embodiments, tile instructions accept a name of a paired tile as an operand. In operation, the tiles can be loaded from and stored to memory using load and store operations. Depending upon the instruction encoding scheme used, the amount of available application memory, as well as the size, number, and configuration of available tiles varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row).

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Exemplary Tile Storage Types

Figure 2:
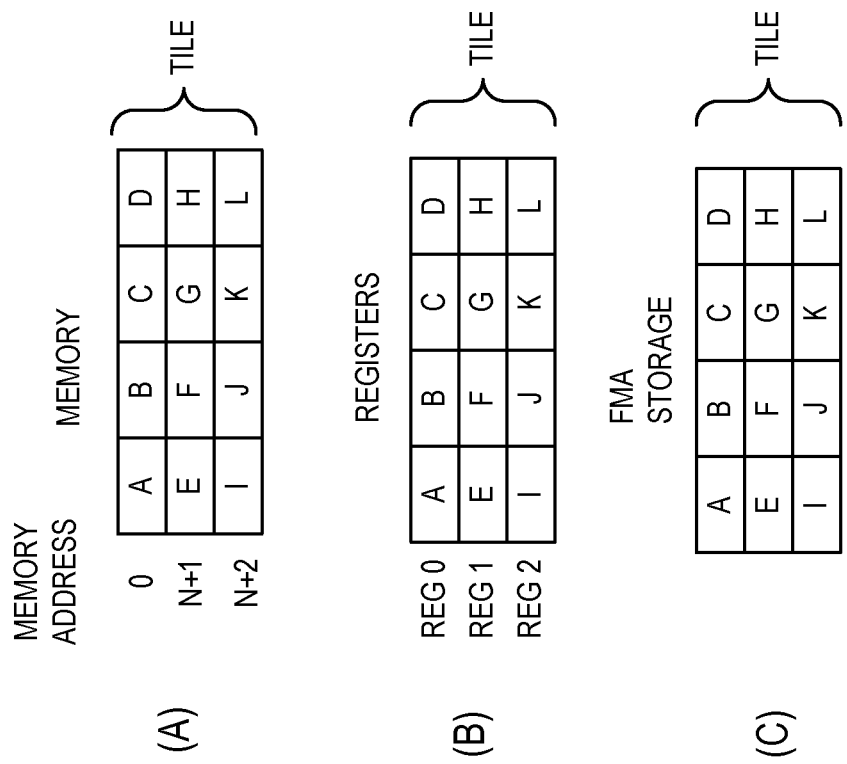
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILE-STORE instructions, or other instruction references to application memory as a TILE operand in load-op op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiply accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIG metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1 K tile with 64-byte rows, there would be 16 rows, so in this example, the last 6 rows would also be zeroed.

In some embodiments, a context restore instruction (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating-point exceptions, with the masking of the exceptions controlled by a control and/or status register.

To support restarting instructions after these events, the instructions store information in the start registers detailed below.

Matrix (Tile) Operation Systems

Exemplary Hardware Support

Figure 3:
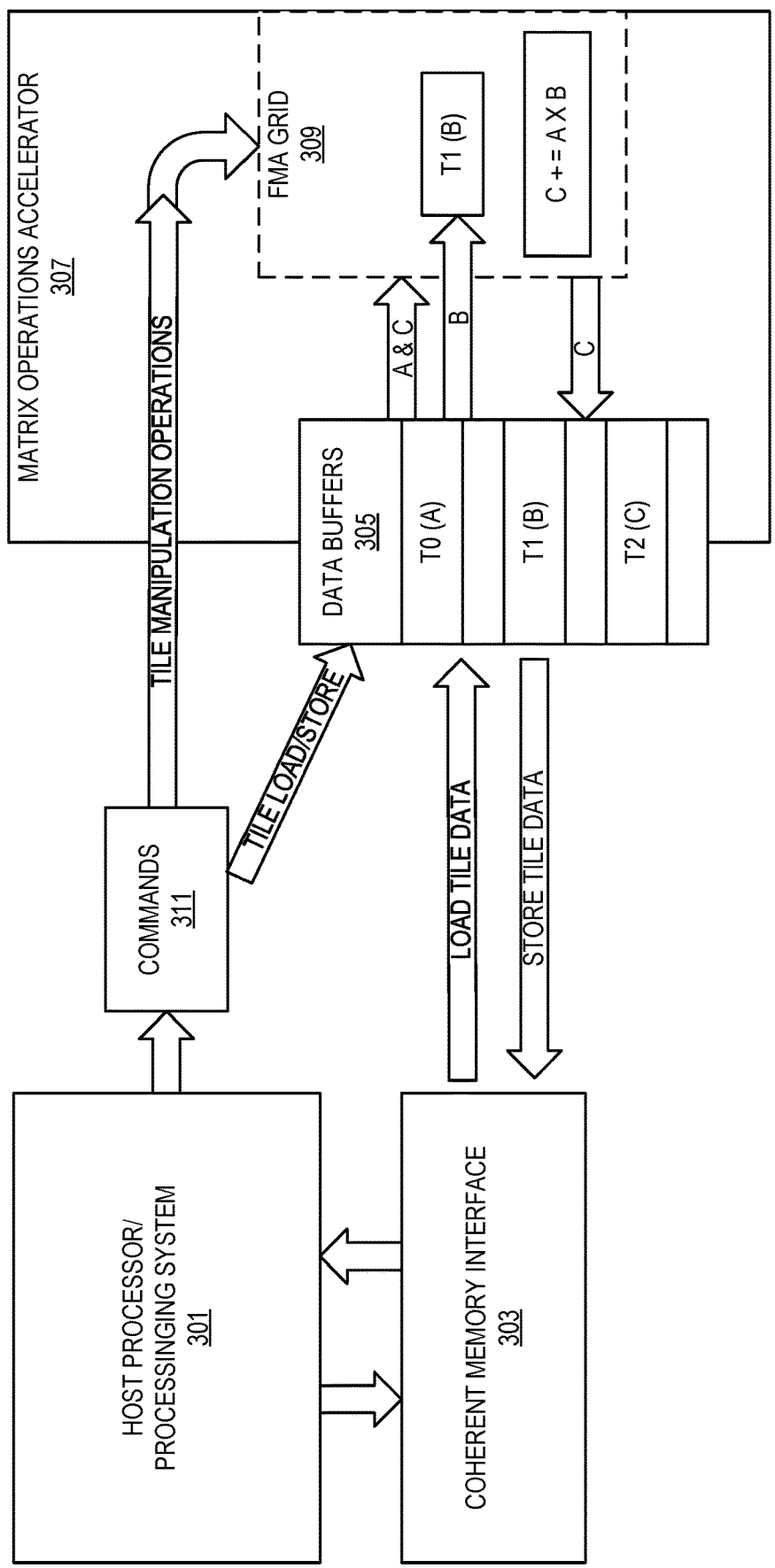
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
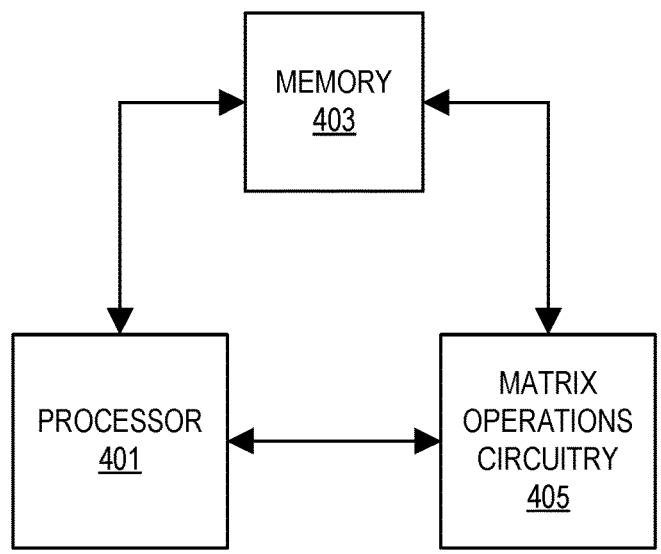
FIGS. 4 and 5 show different embodiments of how memory is shared using a matrix operations accelerator.
Figure 5:
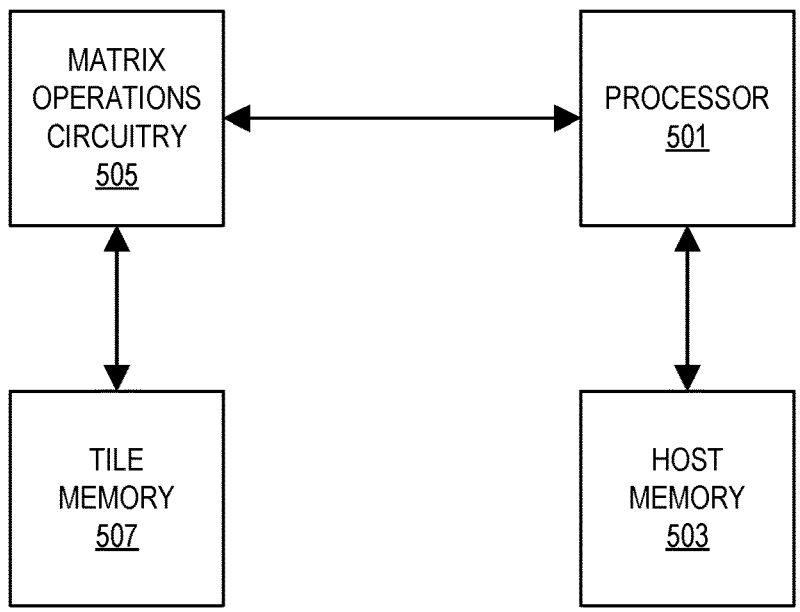

In this example, a coherent memory interface 303 is coupled to the host processor/processing system 301 and matrix operations accelerator 307 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

In some embodiments, tiles are supported using an overlay over physical registers. For example, a tile may utilize 16 1,024-bit registers, 32 512-bit registers, etc. depending on the implementation. In some embodiments, the matrix operations utilize 2-dimensional (2-D) data structures representing one or more packed regions of memory such as registers. Throughout this description, these 2-D data structures are referred to as tiles or tile registers.

In some embodiments, the matrix operations accelerator 307 includes a plurality of FMAs 309 coupled to data buffers 305 (in some implementations, one or more of these buffers 305 are stored in the FMAs of the grid as shown). The data buffers 305 may buffer tiles loaded from memory and/or tiles to be stored to memory (e.g., using a tileload or tilestore instruction). Data buffers may source data from a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset is stored in the FMA grid 309. As shown, T1 is housed and T0 and T2 are not. Note that A, B, and C refer to the matrices of these tiles which may or may not take up the entire space of the tile.

Figure 6:
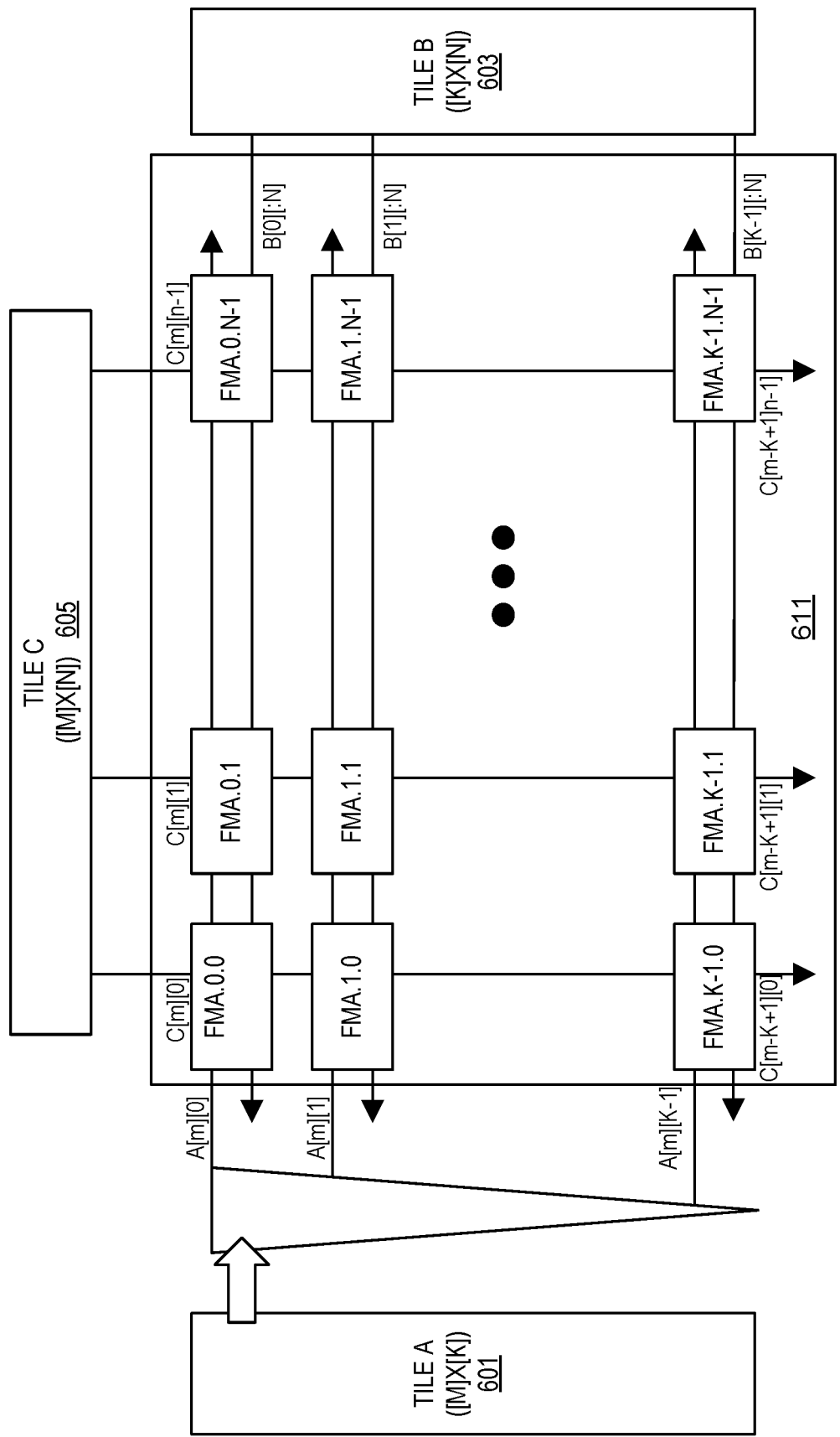
FIG. 6 illustrates an embodiment of matrix multiply accumulate operation using tiles ("TMMA").

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transformed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
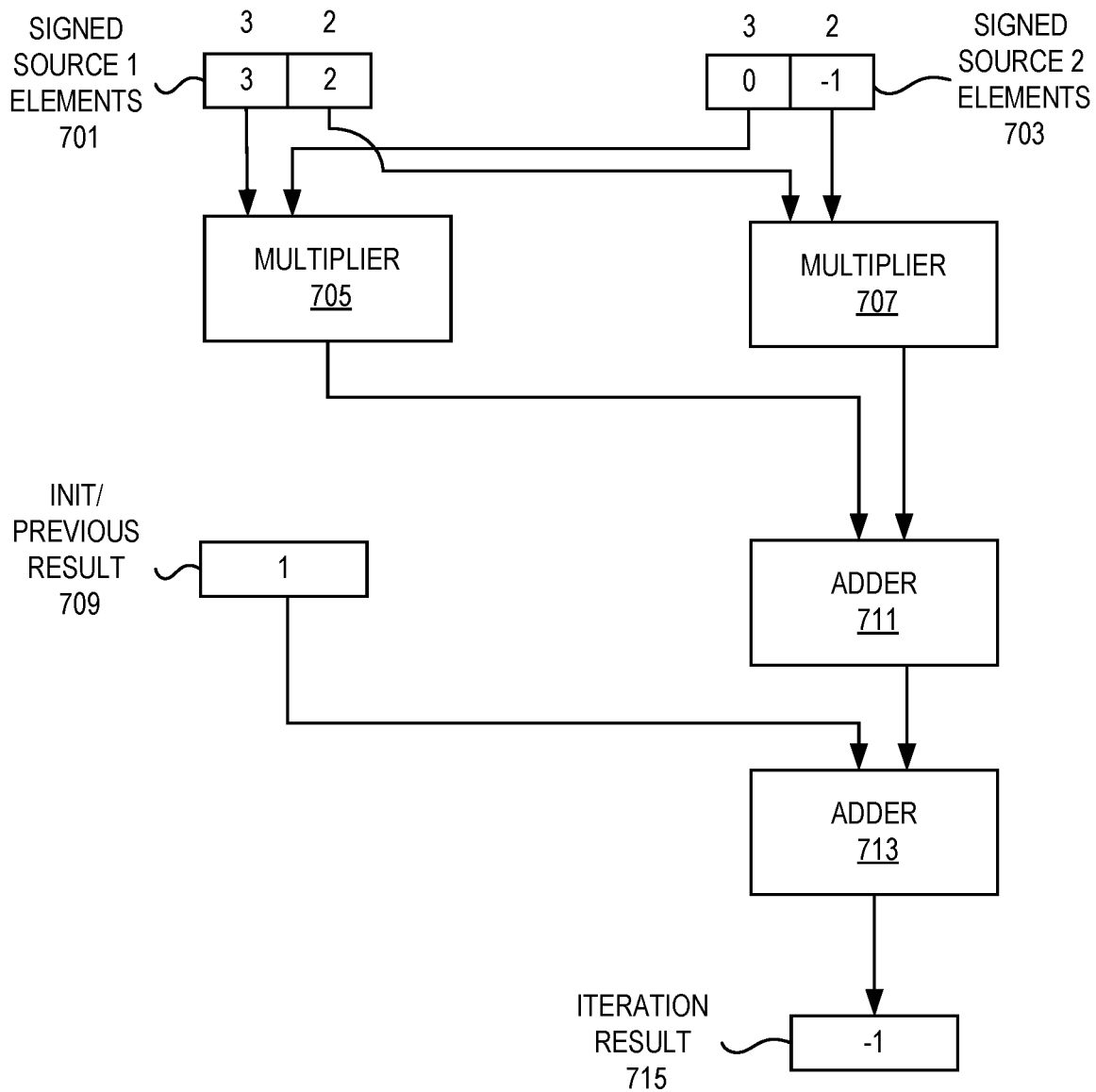
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating-point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating point) while the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (e.g., using a different adder 713 or the same adder 711).

Finally, the result of the second addition is either stored into the signed destination 715 in a packed data element position that corresponds to the packed data element position used from the signed third source 709 or passed on to the next iteration if there is one. In some embodiments, a writemask is applied to this storage such that if a corresponding writemask (bit) is set, the storage happens, and, if not set, the storage does not happen.

Figure 8:
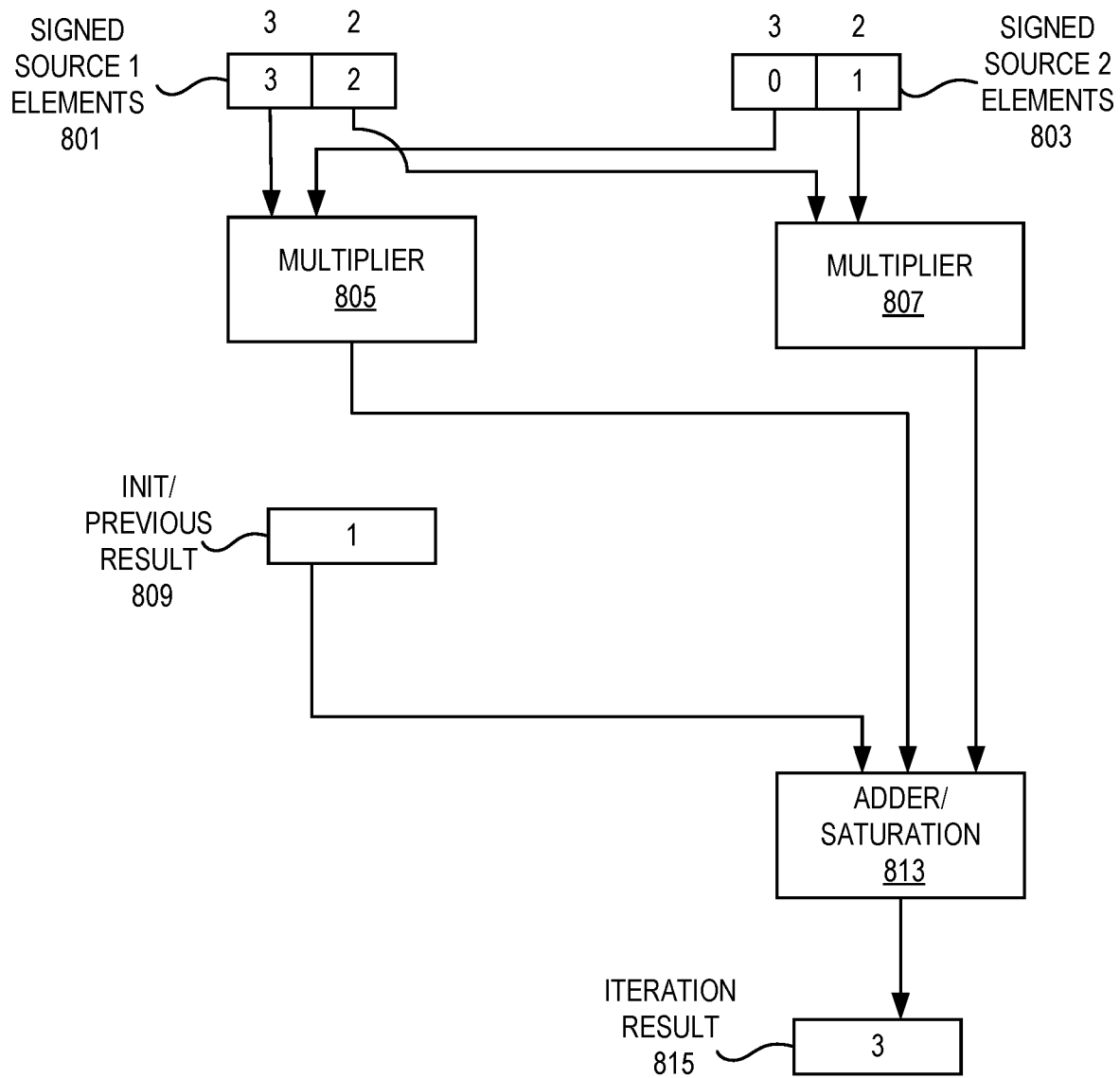
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 813.

Addition/saturation (accumulator) circuitry 813 preserves a sign of an operand when the addition results in a value that is too big. In particular, saturation evaluation occurs on the infinite precision result between the multi-way-add and the write to the destination or next iteration. When the accumulator 813 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from $-128(=-2^7)$ to $127(=2^7-1)$).

The result of the addition and saturation check is stored into the signed result 815 in a packed data element position that corresponds to the packed data element position used from the signed third source 809 or passed on to the next iteration if there is one. In some embodiments, a writemask is applied to this storage such that if a corresponding writemask (bit) is set, the storage happens, and, if not set, the storage does not happen.

Figure 9:
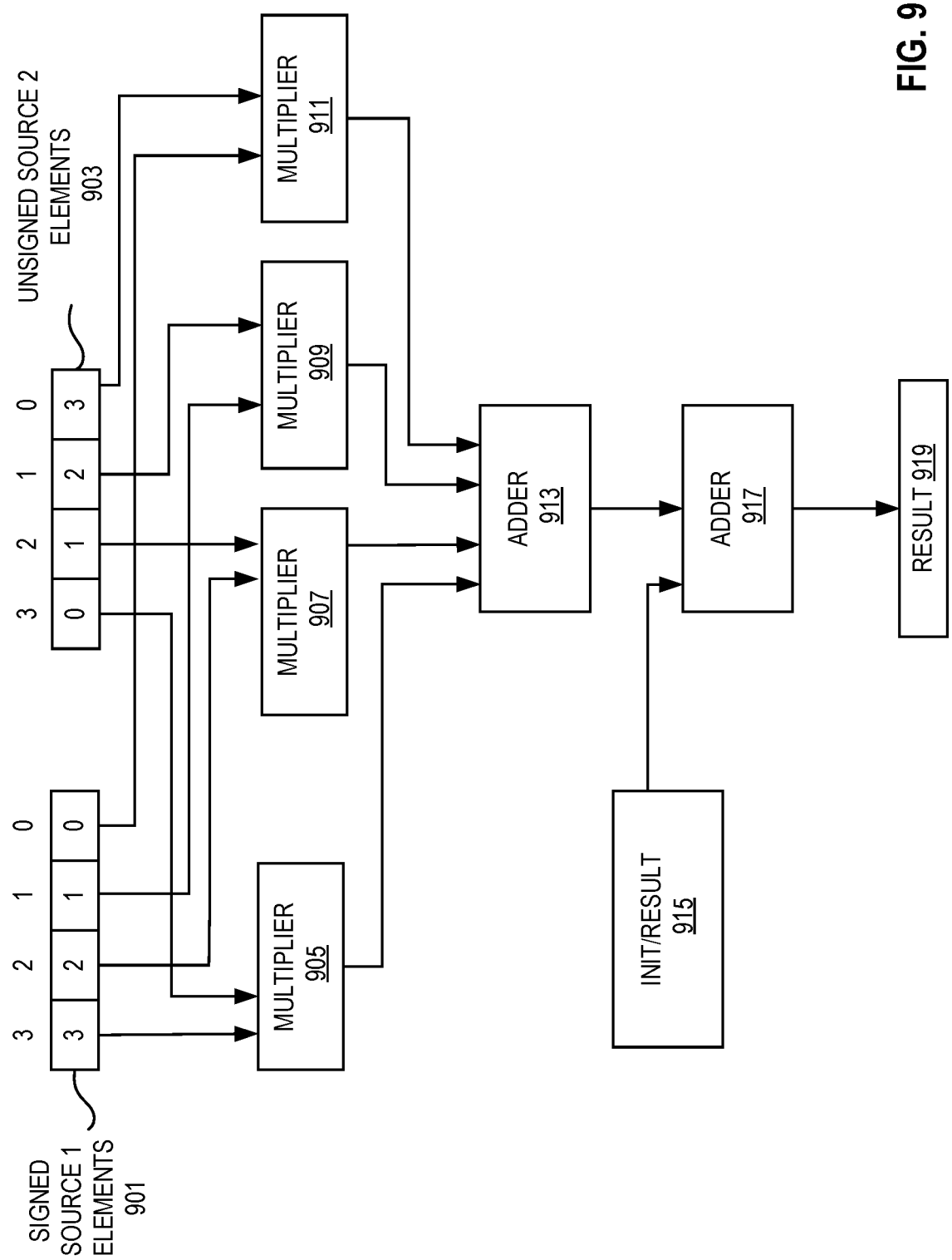
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 905, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 913.

The result of the addition of the results of the multiplications is added to the data from most significant packed data element position of the signed source 3 915 (using a different adder 917 or the same adder 913).

Finally, the result 919 of the second addition is either stored into the signed destination in a packed data element position that corresponds to the packed data element position used from the signed third source 915 or passed to the next iteration. In some embodiments, a writemask is applied to this storage such that if a corresponding writemask (bit) is set, the storage happens, and, if not set, the storage does not happen.

Figure 10:
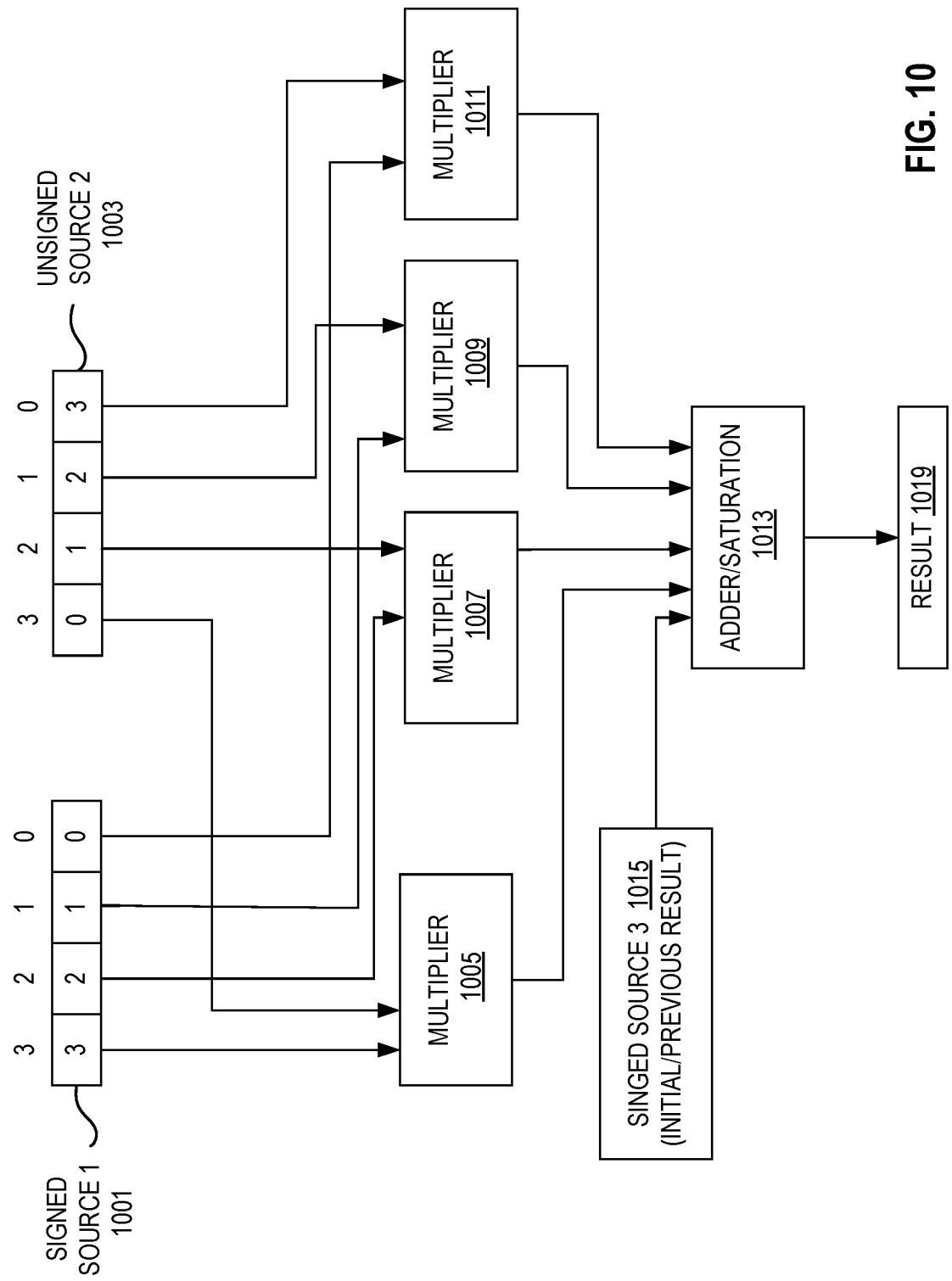
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source 1001 and a second unsigned source 1003 each have four packed data elements. Each of these packed data elements stores data such as floating point or integer data. A third signed source 1015 (initial or previous result) has a packed data element of which stores signed data. The sizes of the first and second sources are a quarter of the third signed source 1015 (initial or previous result). For example, the first and second sources could have 16-bit packed data elements (e.g., word) and the third signed source 1015 (initial or previous result) could have 64-bit packed data elements (e.g., double precision floating point or 64-bit integer).

In this illustration, the four most significant packed data element positions of the first signed source 1001 and the second unsigned source 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first signed source 1001 and the second unsigned source 1003 are multiplied using a multiplier circuit 1005, data from second most significant packed data element positions of the first signed source 1001 and the second unsigned source 1003 are multiplied using a multiplier circuit 1007, data from third most significant packed data element positions of the first signed source 1001 and the second unsigned source 1003 are multiplied using a multiplier circuit 1009, and data from the least significant packed data element positions of the first signed source 1001 and the second unsigned source 1003 are multiplied using a multiplier circuit 1011. In some embodiments, the signed packed data elements of the first signed source 1001 are sign extended and the unsigned packed data elements of the second unsigned source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of third signed source 1015 (initial or previous result). The result of the addition of the results of the multiplications is added to the data from most significant packed data element position of third signed source 1015 (initial or previous result) using adder/saturation 1013 circuitry.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from third signed source 1015 (initial or previous result) or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-intenger or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
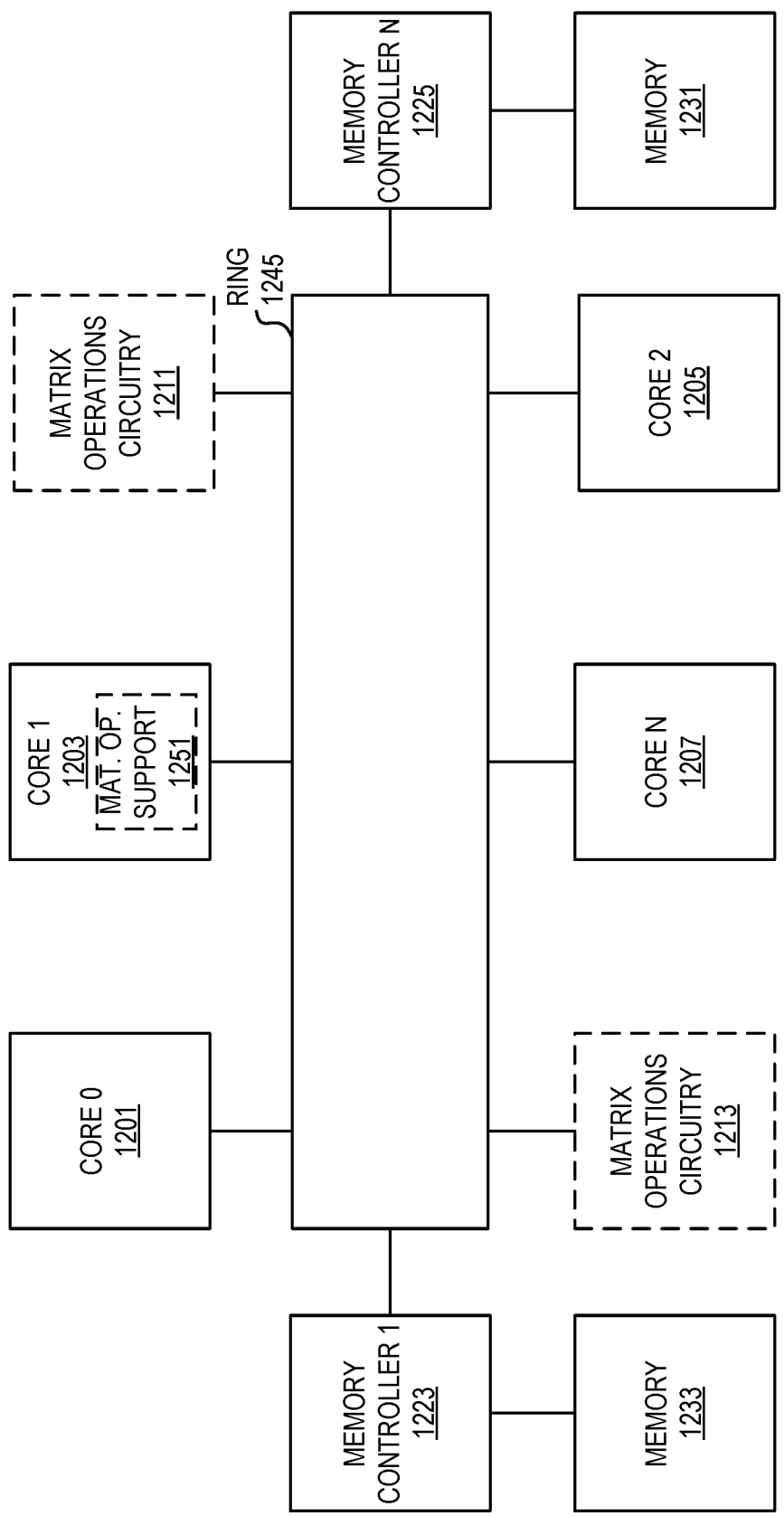
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, multiple entities are coupled with a ring interconnect 1245.

A plurality of cores, core 0 1201, core 1 1203, core 2 1205, and core N 1207 provide non-tile-based instruction support. In some embodiments, matrix operations circuitry 1251 is provided in a core 1203, and in other embodiments matrix operations circuitry 1211 and 1213 are accessible on the ring interconnect 1245.

Additionally, one or more memory controllers 1223-1225 are provided to communicate with memory 1233 and 1231 on behalf of the cores and/or matrix operations circuitry.

Figure 13:
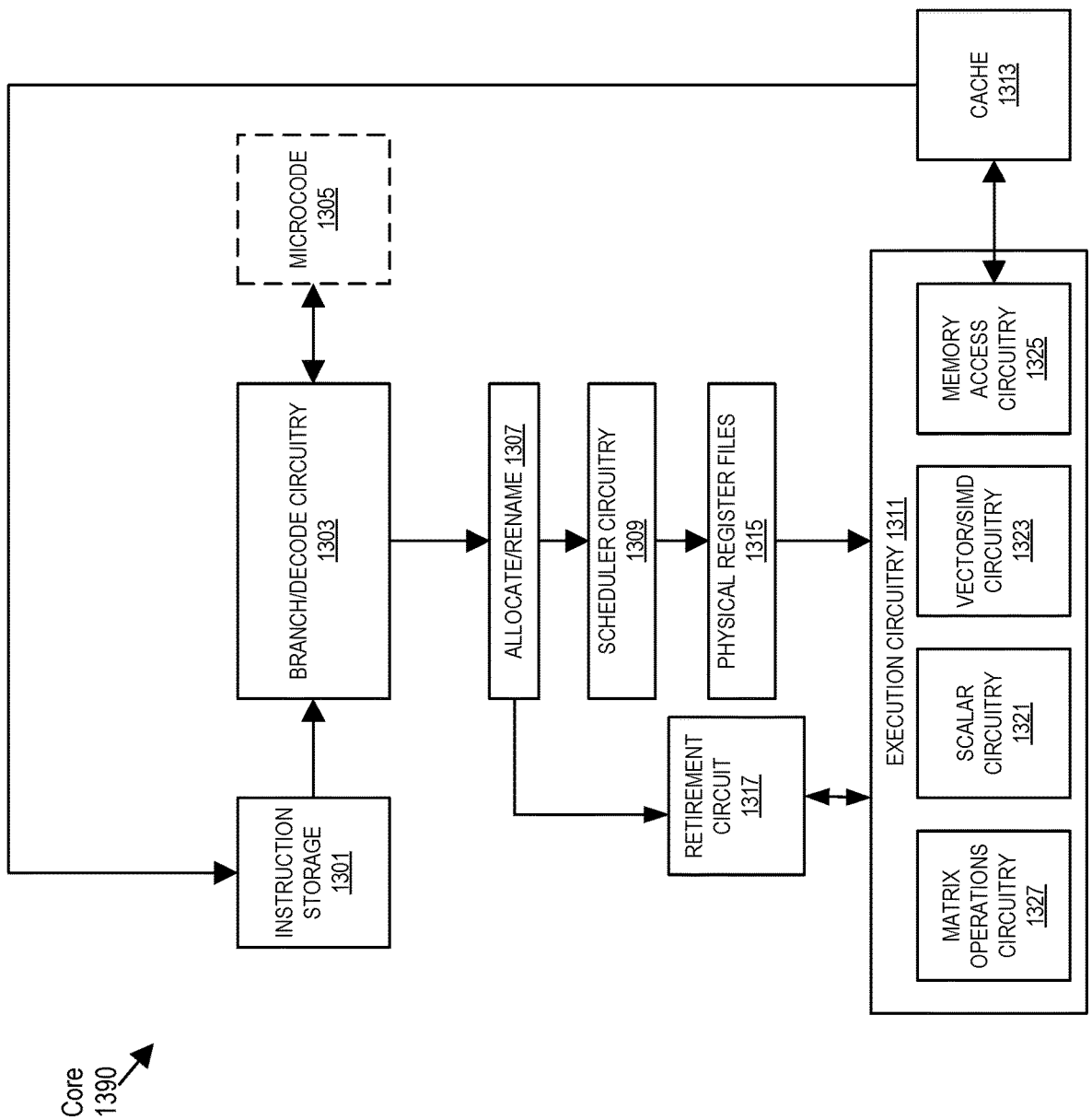
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 is a set of one or more execution circuits, including scalar circuitry 1321, vector/SIMD circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
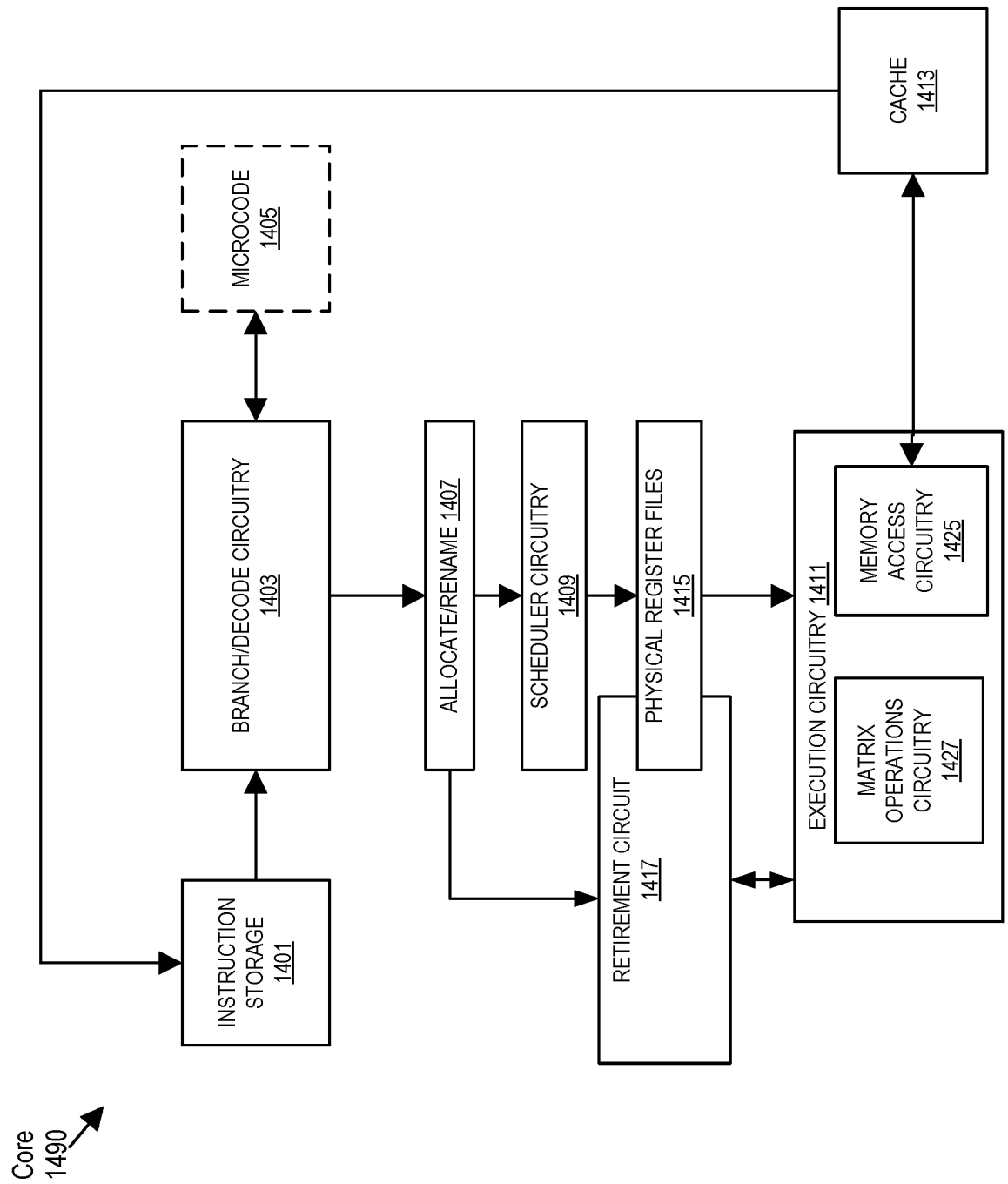
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to allocate/rename 1407 circuitry which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general-purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuitry 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425 to access cache 1413. The execution circuits 1427 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the allocate/rename 1407 circuitry performs an allocation stage and renaming stage; 4) the scheduler circuitry 1409 performs a schedule stage; 5) physical register file(s) (coupled to, or included in, the scheduler circuitry 1409 and allocate/rename 1407 circuitry and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T*B^T=(BA)^T$, where superscript T means transform. Reading column major data as row major data results in the matrix looking like the transform matrix.

In some embodiments, row-major semantics are utilized in hardware, and column major data is to swap the operand order with the result being transforms of matrix, but for subsequent column-major reads from memory it is the correct, non-transformed matrix.

For example, if there are two column-major matrices to multiply:

| a b       | g i k     | ag + bh  ai + bj  ak + bl |
|-----------|-----------|---------------------------|
| c d *     | h j l=    | cg + dh  ci + dj  ck + dl |
| e f       |           | eg + fh  ei + fj  ek + fl |
| (3 × 2)   | (2 × 3)   | (3 × 3)                   |

The input matrices would be stored in linear memory (column-major) as:
a c e b d f
and
g h i j k l.

Reading those matrices as row-major with dimensions 2×3 and 3×2, they would appear as:

| a c e | and | g h |
|-------|-----|-----|
| b d f |     | i j |
| k l   |     |     |

Swapping the order and matrix multiplying:

| g h     | a c e  | ag + bh cg + dh eg + fh |
|---------|--------|-------------------------|
| i j *   | b d f= | ai + bj ci + dj ei + fj |
| k l     |        | ak + bl ck + dl ek + fl |

The transform matrix is out and can then be stored in in row-major order:

| ag+bh | cg+dh | eg+fh | ai+bj | ci+dj | ei+fj | ck+dl | ak+bl | ek+fl |
|---|---|---|---|---|---|---|---|---| and used in subsequent column major computations, it is the correct un-transfomed transformed matrix:

| ag + bh | ai + bj | ak + bl |
|---|---|---|
| cg + dh | ci + dj | ck + dl |
| eg + fh | ei + fj | ek + fl |

Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the matrix A 1603 (tmm2) is re-used twice as it multiplied by two tiles from matrix B 1605. Pointers to load a new A matrix (tile) and two new B matrices (tiles) from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
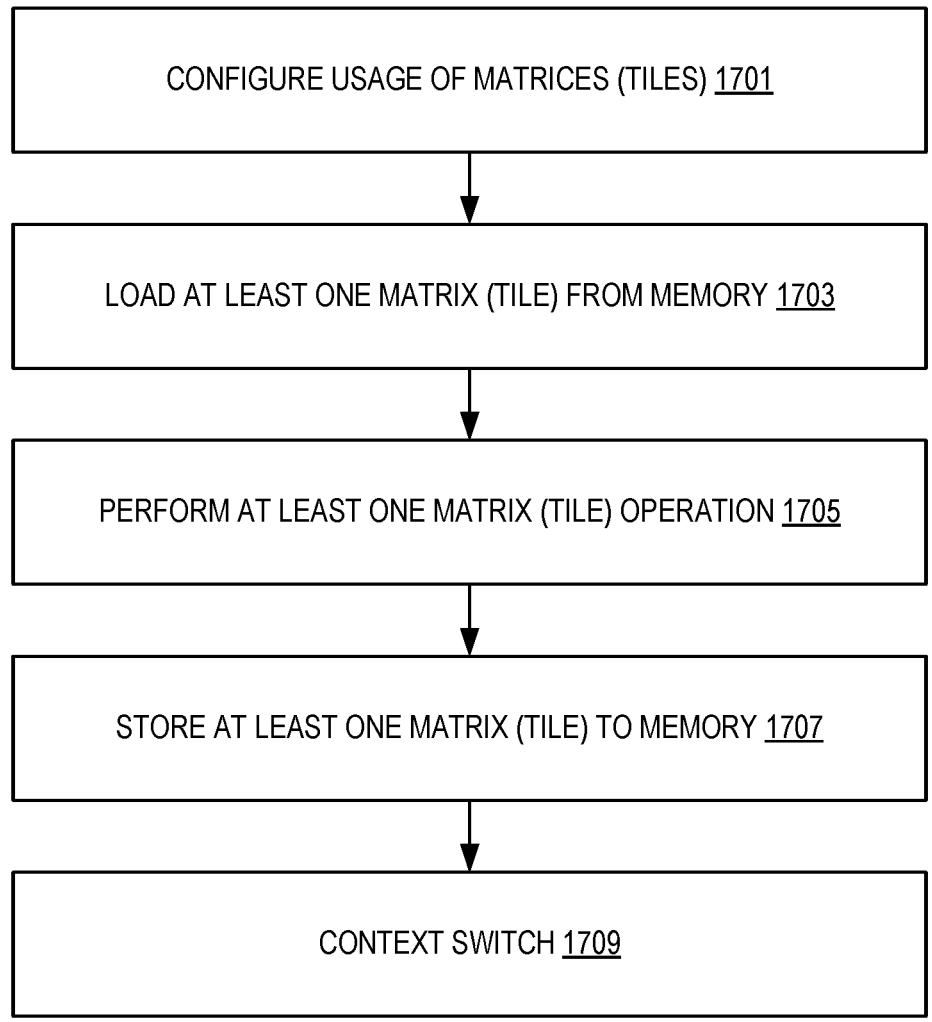
FIG. 17 illustrates an embodiment a method of usage of matrices (tiles).

FIG. 17 illustrates an embodiment of usage of matrices (tiles). At 1701, tile usage is configured. For example, a TILECONFIG instruction is executed to configure tile usage including setting a number of rows and columns per tile. Typically, at least one matrix (tile) is loaded from memory at 1703. At least one matrix (tile) operation is performed at 1705 using the matrices (tiles). At 1707, at least one matrix (tile) is stored out to memory and a context switch can occur at 1709.

Exemplary Configuration

Tile Configuration Hardware Support

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L×N) will typically not work if M and L are not the same.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix operations circuit (either as a part of a processor core, or as an external device, e.g., accelerator). In particular, an execution of the TILECONFIG instruction causes a configuration to be retrieved from memory and applied to matrix (tile) settings within a matrix accelerator.

Tile Usage Configuration

Figure 18:
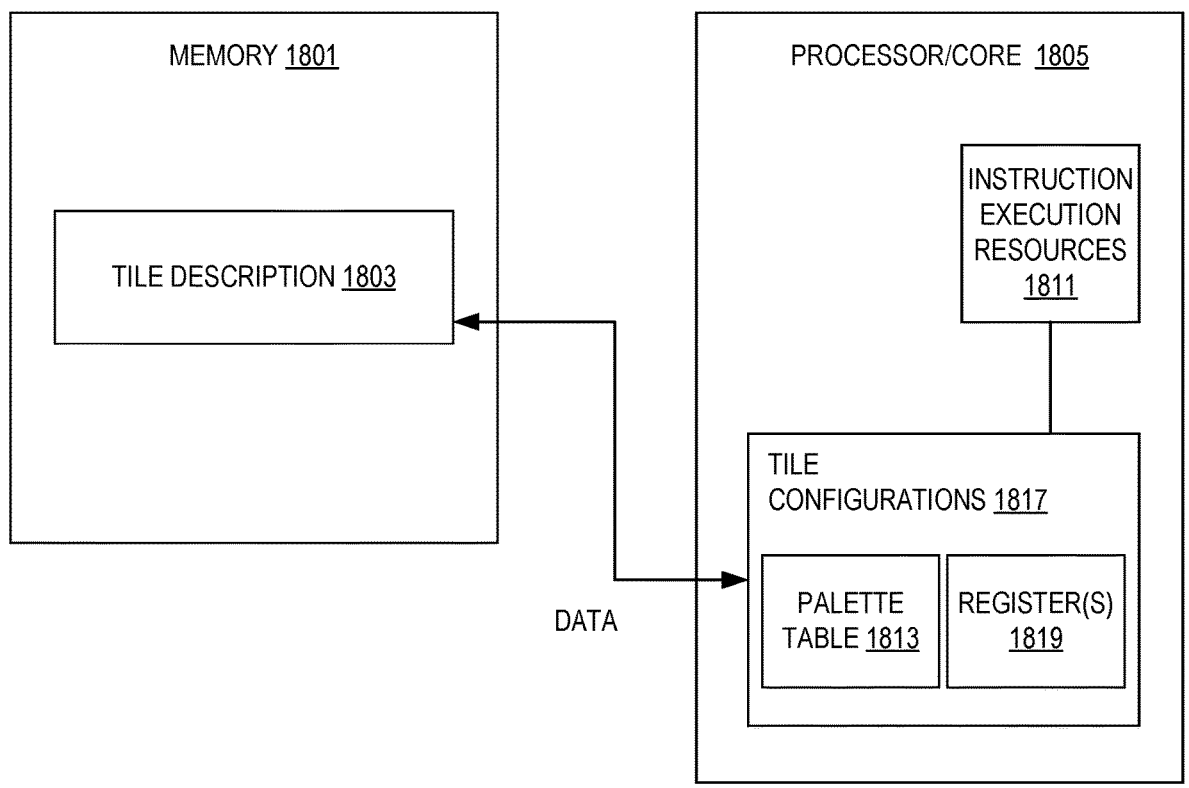
FIG. 18 illustrates support for configuration of the usage of tiles according to an embodiment.

FIG. 18 illustrates support for configuration of the usage of tiles according to an embodiment. A memory 1801 contains the tile description 1803 of the matrices (tiles) to be supported.

Instruction execution resources 1811 of a processor/core 1805 stores aspects of a tile description 1803 into tile configurations 1817 (e.g., tile configuration storage). The tile configurations 1817 include palette table 1813 to detail what tiles for a palette are configured (the number of rows and columns in each tile) and a marking that matrix support is in use. In particular, instruction execution resources 1811 are configured to use tiles as specified by the tile configurations 1817. The instruction execution resources 1811 may also include a configuration register (e.g., model specific register) to indicate tile usage. Additional values such as in-use and start values are also set. The tile configurations 1817 utilize register(s) 1819 to store tile usage and configuration information.

FIG. 19 illustrates an embodiment of a description of the matrices (tiles) to be supported. This is the description that is to be stored upon an execution of a STTILECFG instruction. In this example, each field is a byte. In byte [0], a palette ID 1901 is stored. The palette ID is used to index a palette table 1813 which stores, per palette ID, a number of bytes in a tile, and bytes per row of the tiles that are associated with this ID as defined by the configuration.

Byte 1 stores a value to be stored in a "startRow" register 1903 and byte 2 stores a value to be stored in a register, startP 1905. To support restarting instructions after these events, the instructions store information these registers. To support restarting instructions after break events such as those detailed above, the instructions store information in these registers. The startRow value indicates the row that should be used for restart. The startP value indicates the position within the row for store operations when pairs are used and, in some embodiments, indicates the lower half of the row (in the lower tile of a pair) or higher half of the row (in the higher tile of a pair). Generally, the position in the row (the column) is not needed.

With the exception of TILECONFIG and STTILECFG, successfully executing matrix (tile) instructions will set both startRow and startP to zero in certain embodiments.

Any time an interrupted matrix (tile) instruction is not restarted, it is the responsibility of software to zero the startRow and startP values. For example, unmasked floating point exception handlers might decide to finish the operation in software and change the program counter value to another instruction, usually the next instruction. In this case the software exception handler must zero the startRow and startP values in the exception presented to it by the operating system before resuming the program. The operating system will subsequently reload those values using a restore instruction.

Byte 3 stores an indication of pairs (1b per tile) of tiles 1907.

Bytes 16-17 store the number of rows 1913 and columns 1915 for tile 0, bytes 18-19 store the number of rows and columns for tile 1, etc. In other words, each 2-byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to an initial state with 0 rows, 0 columns.

Finally, the configuration in memory typically ends with an ending delineation such as all zeros for several consecutive bytes.

Exemplary Tile and Tile Configuration Storage

Figure 20A:
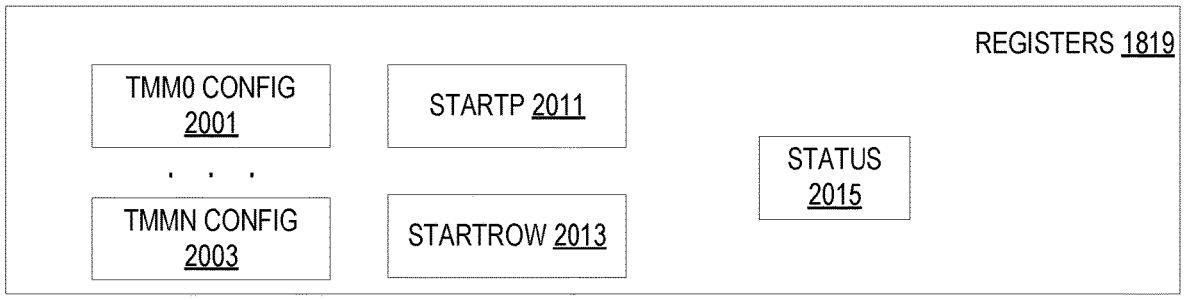
FIGS. 20(A)-(D) illustrate examples of register(s).

FIGS. 20(A)-(D) illustrate examples of register(s) 1819. FIG. 20(A) illustrates a plurality of registers 1819. As shown, each tile (TMM0 2001 . . . TMMN 2003) has a separate register with each register storing a row and column size for that particular tile. StartP 2011 and StartRow 2013 are stored in separate registers. One or more status registers 2015 are set (e.g., TILES_CONFIGURED=1) to indicate tiles are configured for use.

Figure 20B:
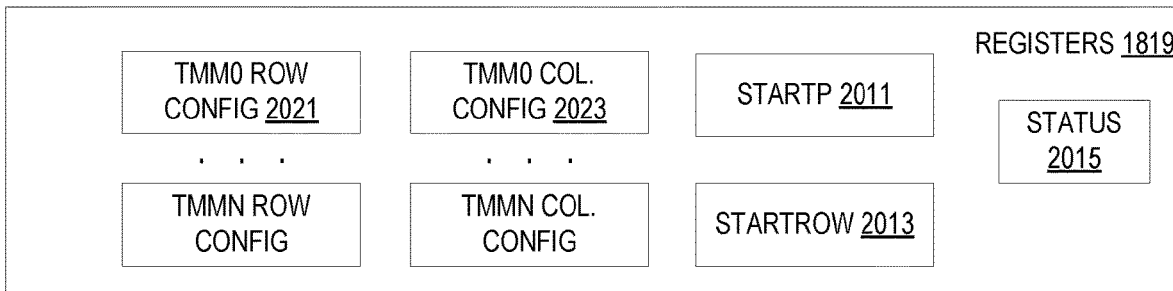

FIG. 20(B) illustrates a plurality of registers 1819. As shown, each tile has separate registers for its rows and columns. For example, TMM0 rows configuration 2021, TMM0 columns configuration 2023, StartP 2011 and StartRow 2013 are stored in separate registers. One or more status registers 2015 are set (e.g., TILES_CONFIGURED=1) to indicate tiles are configured for use.

Figure 20C:
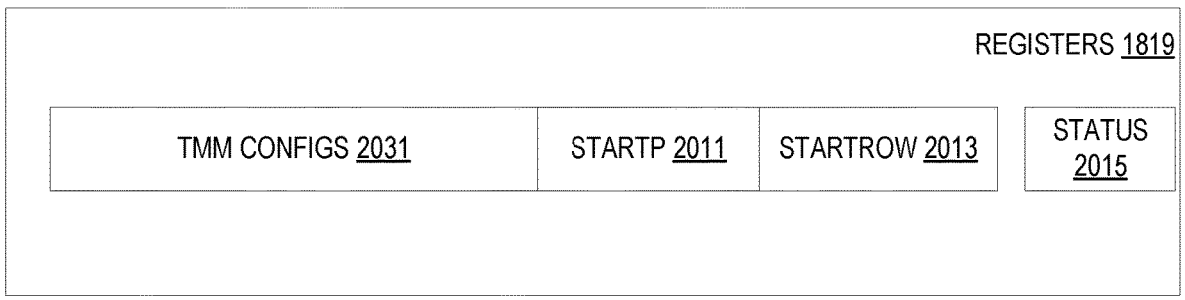

FIG. 20(C) illustrates a single register 1819. As shown, this register stores tile configurations (rows and columns per tile) 2031, StartP 2011, and StartRow 2013 are stored in single register as packed data registers. One or more status registers 2015 are set (e.g., TILES_CONFIGURED=1) to indicate tiles are configured for use.

Figure 20D:

FIG. 20(D) illustrates a plurality of registers 1819. As shown, a single register stores tile configuration (rows and columns per tile) 2031. StartP and StartRow are stored in separate registers 2011 and 2013. One or more status registers 2015 are set (e.g., TILES_CONFIGURED=1) to indicate tiles are configured for use.

Other combinations are contemplated such as combining the start registers into a single register where they are shown separately, etc.

Fast Fourier Transform (FFT) Instructions and Configurations

As mentioned above, special hardware for General Matrix Multiplication (a.k.a., GEMM), is a good option for improving the peak compute (and energy efficiency) of certain applications, such as deep learning. In addition to general matrix multiplication uses (e.g., modes), it may be desirable to perform one or more fast Fourier transform (FFT) operations.

In certain embodiments, a discrete Fourier transform (DFT) operation converts a signal (e.g., input value) from a first (e.g., original) domain (e.g., time or space) to a representation in the frequency domain, and/or to a representation in the first (e.g., original) domain (e.g., time domain or space (spatial) domain) from the frequency domain (e.g., the inverse DFT (IDFT)). The DFT results may be useful, but computing it directly from the definition may be too slow to be practical. In certain embodiments, the naive implementation of the N-point DFT involves calculating the scalar product of the input values (treated as an N-dimensional vector) with N separate basis (e.g., twiddle) vectors. Since each scalar product involves N multiplications and N additions, the total time is proportional to $N^2$ (in other words, it's an $O(N^2)$ algorithm). However, these operations can be cleverly re-arranged to optimize the algorithm down to $O(N \log(N))$, which for large N may greatly reduce the number of operations. The optimized version of the algorithm may be referred to as the fast Fourier transform (FFT).

In one embodiment, a two-point FFT is:

$$V[k] = W_2^{0*k} v[0] + W_2^{1*k} v[1], k=0,1 \quad (1)$$

FFT code (e.g., a FFT kernel) may be used in high performance computing. FFTs can be of varied dimensions (e.g., 1D, 2D, 3D, etc.), of different datatypes (complex to complex, real to complex, etc.), and can be used at multiple granularities (e.g., many small FFTs or one large FFT).

In certain embodiments, the FFT algorithm can be decomposed in several ways. Two examples include: (i) 2D or 3D FFTs decomposed to multiple 1D FFTs or (ii) large 1D FFT decomposed into smaller FFTs (e.g., according to the Cooley-Tukey decomposition). In certain embodiments, a decomposition according to the Cooley-Tukey algorithm re-expresses the discrete Fourier transform (DFT) of an arbitrary composite size $N=N_1 N_2$ in terms of N1 smaller DFTs of sizes N2, applied recursively. A radix-2 FFT form of the Cooley-Tukey algorithm may be used to divide a DFT of size N into two interleaved DFTs of size N/2 with each recursive stage. Furthermore, using this divide and conquer strategy, a 4-point transform can be reduced to two 2-point transforms: one for even elements, one for odd elements, e.g., and this may be referred to as a two-point butterfly.

In general, a matrix operations circuit is of a finite size (e.g., with a fixed number of processing element circuits and/or types of circuitry). Certain embodiments herein allow for the use of matrix operations circuitry (e.g., a multi-dimensional grid of a matrix operations accelerator circuit) to perform one or more FFT operations by mapping a decomposed portion of a FFT onto one or more circuit blocks of the matrix operations circuitry. Certain embodiments herein allow for FFT operations to be performed even when the non-decomposed FFT includes more points than are supported by the matrix operations circuitry, e.g., by decomposing the FFT to optimally fit (e.g., map) to the matrix operations circuitry. Intermediate values may be recycled back into the matrix operations circuitry as inputs for the next iteration (e.g., as discussed in reference to FIGS. 23 and 24). In certain embodiments, the FFT decomposition will result in partial products that are merged together, e.g., by the matrix operations circuitry or by software.

Certain embodiments herein utilize a systolic array (e.g., of matrix operations circuitry) for FFT operation(s) to deliver a high degree of performance and energy efficiency over previous processors. In one embodiment, data flows through direct connections between processing elements (e.g., including fused multiply accumulate (FMA) circuits and/or arithmetic logic unit (ALU) circuit) eliminating a fetch, decode, and execute pipelined flow and/or eliminating the need for register storage for intermediate values, for example, which are instead stored in a buffer(s) of matrix operations circuitry (e.g., as discussed in reference to FIG. 23).

Systolic arrays typically contain a high degree of specialized compute capable of simultaneous execution. This enables a large number of instructions to be executed per cycle through pipelining Certain embodiments herein disclose matrix operations circuitry that is constructed in a modular fashion from one or more circuit blocks (e.g., discussed in reference to FIGS. 23 and 24). In certain embodiments, an instruction as disclosed herein eliminates the need for the programmer to create their own programming files and/or eliminates the exposure of the matrix operations circuitry (e.g., a two-dimensional grid of processing element circuits and a routing network therebetween) to the end user through instructions.

Figure 23:
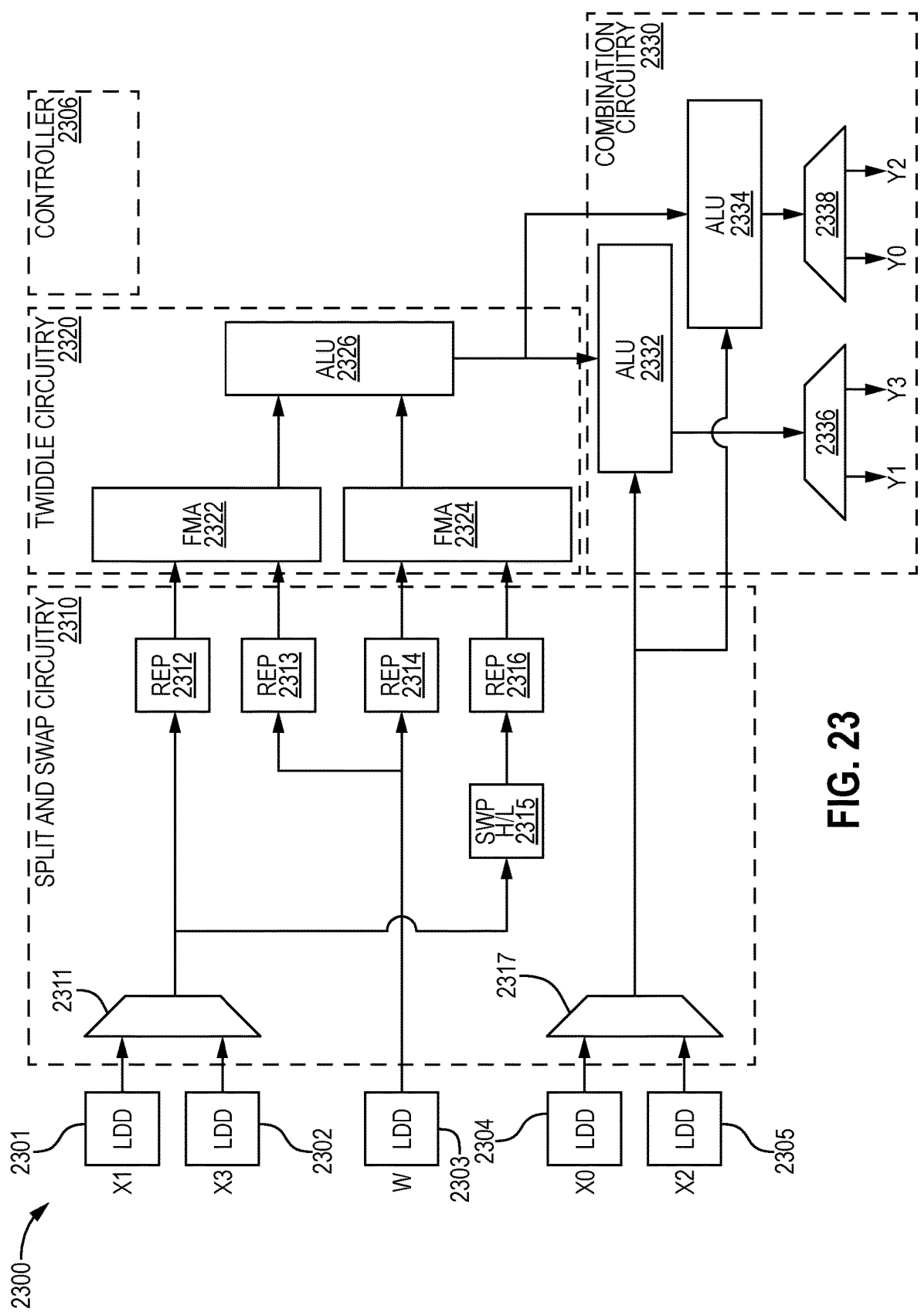
FIG. 23 illustrates a circuit block in a fast Fourier transform (FFT) mode according to embodiments of the disclosure.

Transform operations are an important kernel in numerous high-performance computing applications, and map well to embodiments of the same hardware (e.g., matrix operations circuitry) that accelerates deep learning compute. Thus, certain embodiments herein allow for switching matrix operations circuitry between a first mode (e.g., for deep learning compute operations) to a second mode (e.g., for transform operations), e.g., to maximize the usage of matrix operations circuitry that may otherwise be idle. In one embodiment, a deep learning compute mode causes (e.g., a network routing for) each processing element circuit (e.g., fused multiply accumulate circuit) of matrix operations circuitry to operate on corresponding, same positioned elements of a first two-dimensional matrix and a second two-dimensional matrix (e.g., and to store each resultant in a same positioned element of a (e.g., third) two-dimensional matrix). In one embodiment, a transform mode causes (e.g., a network routing for) each processing element circuit (e.g., fused multiply accumulate circuit) of the same matrix operations circuitry to change to routing for the performance of a transform operation (e.g., as shown in FIG. 23 or FIG. 23) from a different routing (e.g., routing for deep learning compute).

The instructions disclosed herein are improvements to the functioning of a processor (e.g., of a computer) itself. Instruction decode circuitry (e.g., a decoder) not having such an instruction as a part of its instruction set would not decode as discussed herein. An execution circuit not having such an instruction as a part of its instruction set would not execute as discussed herein. For example, a single instruction that, when a processor decodes the single instruction into a decoded instruction and that decoded instruction is executed by the processor, causes matrix operations circuitry (e.g., a matrix operations accelerator circuit) to switch from a first mode that performs other operations (e.g., GEMM operations) to a second mode to configure the matrix operations circuitry for the performance of a fast Fourier transform operation (and/or cause the matrix operations circuitry to perform the fast Fourier transform operation), is an improvement to the functioning of the processor (e.g., of a computer) itself. For example, a configuration instruction according to this disclosure may only allow a decoded and executed instruction to configure the matrix operations circuitry, e.g., preventing a processor from exposing the matrix operations circuitry to modification (e.g., modifying the internal couplings of the data paths) of the functionality of the matrix operations circuitry other than at the (e.g., macro) instruction level.

Certain embodiments herein disclose a circuit block (e.g., configuration) of matrix operations circuitry for a fast Fourier transform operation. In one embodiment, the circuit block implements two 2-point transforms (e.g., a two-point butterfly). In one embodiment, a fast Fourier transform configuration instruction, when decoded and executed by a processor (e.g., core), causes multiple circuit blocks to be configured for a fast Fourier transform operation. In one embodiment, a fast Fourier transform configuration instruction includes a field (or fields) that indicates a number of circuit blocks to be configured for a fast Fourier transform (FFT) operation, e.g., a number of inputs and outputs (e.g., of processing elements, such as, but not limited to fused multiply accumulate (FMA) circuits and/or arithmetic logic unit (ALU) circuits). In one embodiment, the instruction configures the matrix operations circuitry for a fast Fourier transform operation, and causes the matrix operations circuitry to perform the fast Fourier transform operation. In one embodiment, the instruction has an opcode corresponding to the TileFFTConfig mnemonic. In one embodiment, the instruction includes a first field (e.g., operand) that identifies a first input tile (e.g., a first register or registers that represents a first two-dimensional matrix), a second input tile (e.g., a second register or registers that represents a second two-dimensional matrix), and/or a third output tile (e.g., a third register or registers that represents a third two-dimensional matrix). In one embodiment, an instruction includes a first field (e.g., operand) that identifies the size of the FFT (e.g., the number of input points) and/or a second field that identifies the types of values (and thus the types of operations being configured for), for example, single-precision floating point values or double-precision floating point values.

In one embodiment, an instruction includes a first field (e.g., operand) that identifies a first input tile of FFT input data (e.g., a first register or registers that represents a first two-dimensional matrix), a second input tile of twiddle factor input data (e.g., a second register or registers that represents a second two-dimensional matrix), and/or a third output tile to store a resultant of the FFT operations (e.g., a third register or registers that represents a third two-dimensional matrix). In one embodiment, an instruction includes a field (e.g., operand or opcode) that identifies the types of values (and thus the types of operations performed), for example, single-precision floating point values or double-precision floating point values.

In one embodiment, the optimal mapping onto the matrix operations circuitry is handled by the hardware or by a programmer In one embodiment, e.g., for FFTs larger than the matrix operations circuitry size, the hardware will automatically determine the optimal mapping, configure itself (e.g., including routing of outputs back in to the next stage of the FFT as inputs), execute the FFT operations (e.g., according to the FFT algorithm), and merge the results.

In one embodiment, an instruction, indicates a number of points in an FFT operation that matrix operations circuitry is being configured for (e.g., via a field of the instruction), and decoding and executing the instruction configures the matrix operations circuitry to perform an FFT operation on that number of points, e.g., by provide the input values (e.g., stored in tiles) as operands to the instruction. For example, decoding and executing of a "TileFFT8" instruction is to configure the matrix operations circuitry for the performance of an 8-point FFT and provide the input values (e.g., by identifying the tiles they are stored in) as operands to the instruction in one embodiment. In one embodiment, an instruction identifies a register storing an indication of the number of points in an FFT operation that matrix operations circuitry is being configured to perform, e.g., and the matrix operations circuitry determines the optimal mapping.

Certain embodiments herein include an instruction that, when decoded and executed by a processor (e.g., core), causes, for matrix operations circuitry that has already been configured for a fast Fourier transform operation, the matrix operations circuitry to perform the fast Fourier transform operation. In one embodiment, the instruction has an opcode corresponding to the TileFFT mnemonic, for example, the TileFFTSinglePrecision mnemonic for single-precision floating point values or the TileFFTDoublePrecision mnemonic for double-precision floating point values.

In one embodiment, the instruction includes a first field (e.g., operand) that identifies a first input tile (e.g., a first register or registers that represents a first two-dimensional matrix), a second input tile (e.g., a second register or registers that represents a second two-dimensional matrix), and/or a third output tile (e.g., a third register or registers that represents a third two-dimensional matrix). In certain embodiments herein, data (e.g., input data) is loaded and/or stored (e.g., into a tile) by decoding and executing of the respective load and/or store instructions disclosed herein.

In certain embodiments, matrix operations circuitry includes a (e.g., statically or dynamically) configurable routing network connecting neighboring processing element circuits in a matrixed fashion. The topology/organization of the matrix may be of any design, e.g., providing it supports routable connections between the constituent processing element circuits (e.g., ALU circuits and FMA circuits) that construct one or more (e.g., two-point) FFT circuit blocks.

Figure 21:
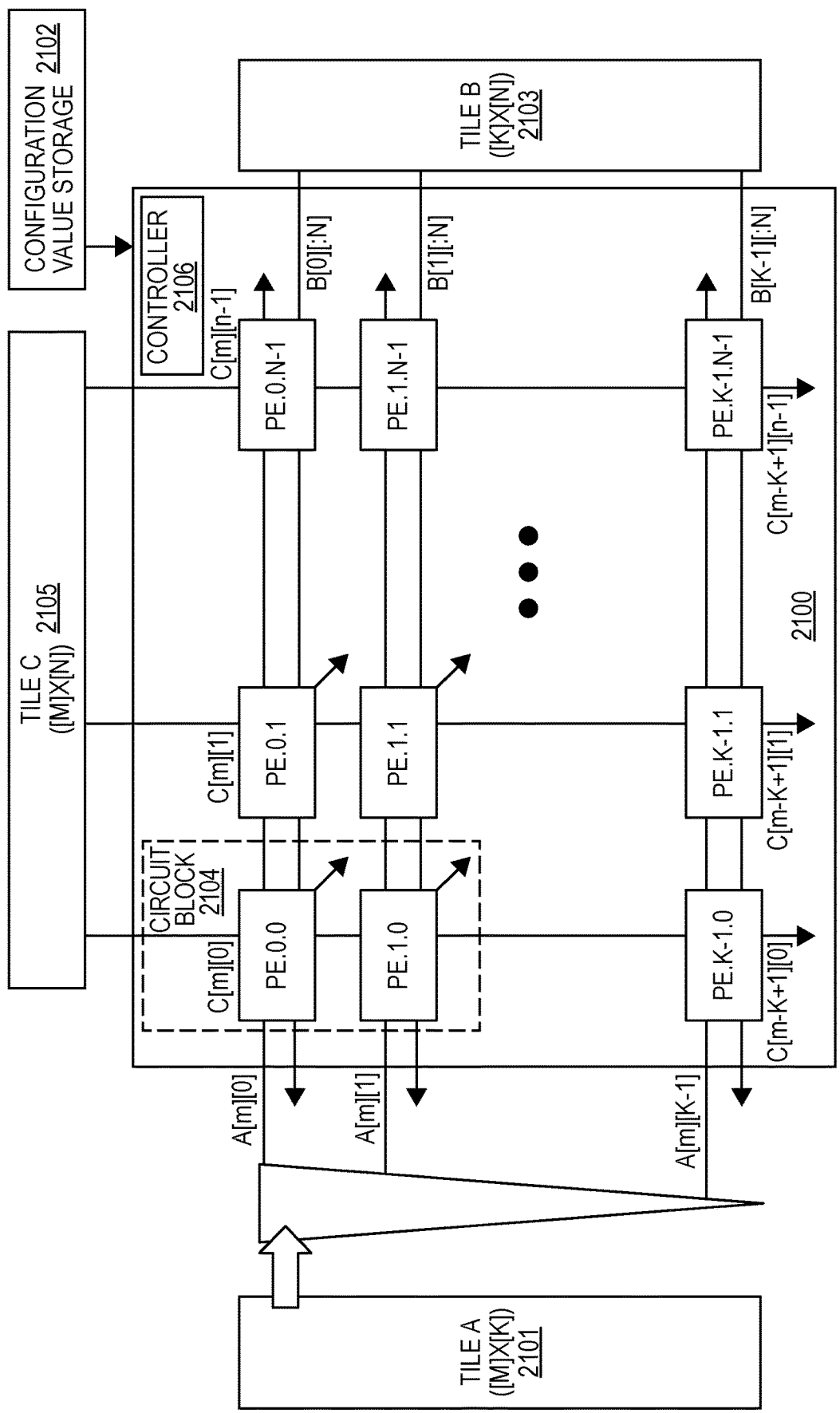
FIG. 21 illustrates matrix operations circuitry that is switchable between a plurality of modes according to embodiments of the disclosure.

FIG. 21 illustrates matrix operations circuitry 2100 that is switchable between a plurality of modes according to embodiments of the disclosure. Depicted matrix operations circuitry 2100 includes a two-dimensional grid of processing element circuits (e.g., fused multiply accumulate (FMA) circuits and/or ALU circuitry) (for example, a PE circuit that performs operations on a plurality of input values to produce a resultant, e.g., that multiplies a first input value and a second input value to generate a product, and adds that product to a third input value to produce the resultant) coupled together by a network (e.g., a configurable routing network that includes a plurality of multiplexers to steer data as requested). In FIG. 21, each PE circuit is indicated by its row and column index (indexed from 0 to K-1 and 0 to N-1, respectively), e.g., PE. 0.1 is the PE circuit at row one (row index 0) and column two (column index 1) and PE. 1.0 is the PE circuit at row two (row index 1) and column one (column index 0). Configuration value storage 2102 (e.g., tile configuration storage 1817 in FIG. 18) stores a value to indicate a mode of the matrix operations circuitry 2100.

Figure 24:
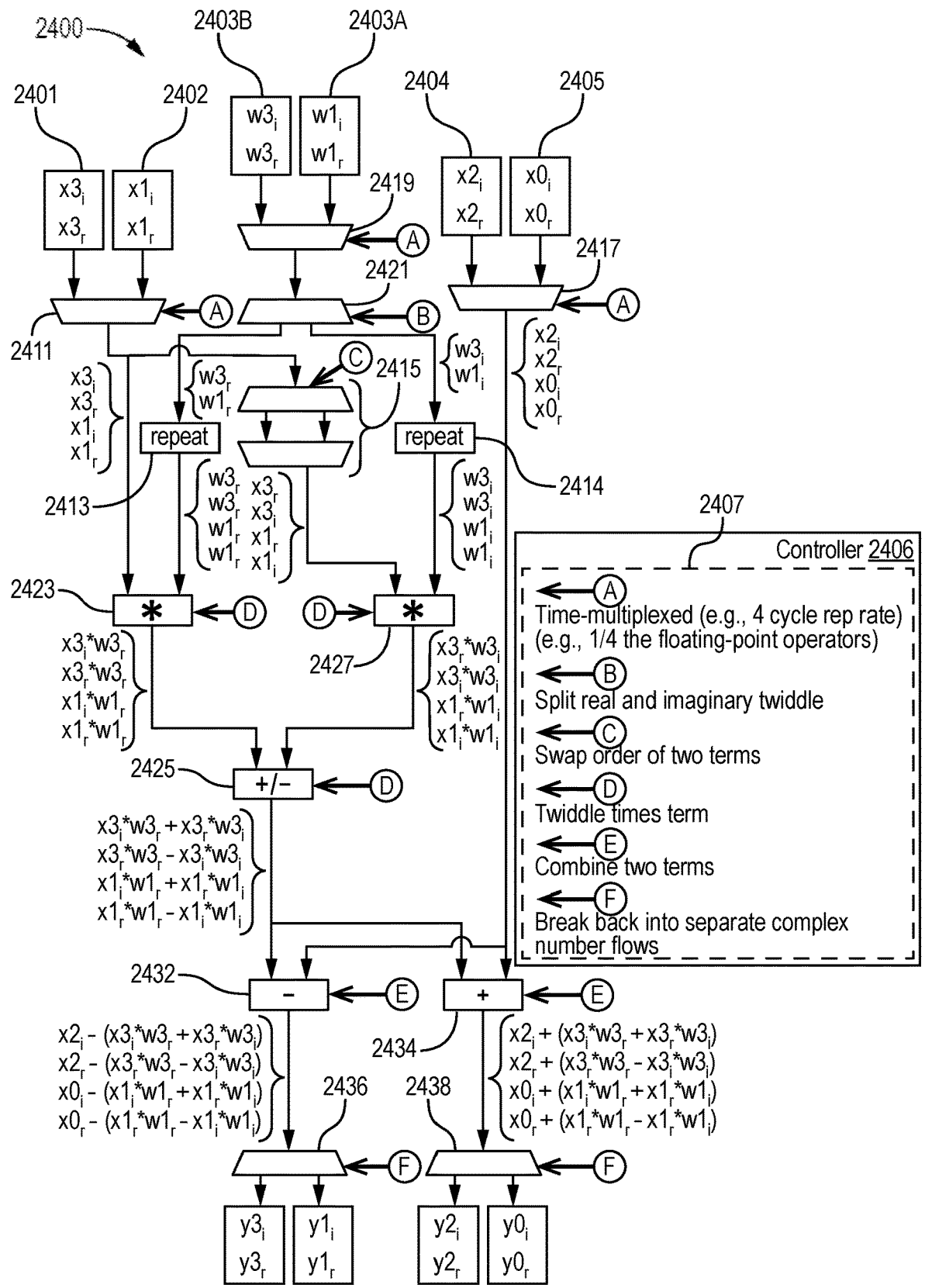
FIG. 24 illustrates a fast Fourier transform (FFT) computation on a circuit block according to embodiments of the disclosure.

In the depicted embodiment, a controller 2106 (e.g., a controller circuit) is included that causes the configuration of the PE circuits and/or network according to the configuration value in configuration value storage 2102. In one embodiment, the controller provides control values to switches (e.g., multiplexers) of the network and/or the individual circuit components (e.g., as shown in FIG. 23 or FIG. 24).

In one embodiment, a first value in configuration value storage 2102 causes matrix operations circuitry 2100 to be configured (e.g., the network to be configured) to cause each processing element circuit to operate on corresponding, same positioned elements of a first two-dimensional matrix (e.g., tile A 2101), a second two-dimensional matrix (e.g., tile B 2103), and/or a third two-dimensional matrix (e.g., tile C 2105). For example, such that PE.0.1 (the PE circuit at row one (row index 0) and column two (column index 1)) takes a first input value from row one (row index 0) and column two (column index 1) of first two-dimensional matrix (e.g., tile A 2101), a second input value from row one (row index 0) and column two (column index 1) of second two-dimensional matrix (e.g., tile B 2103), and/or a third input value from row one (row index 0) and column two (column index 1) of third two-dimensional matrix (e.g., tile C 2105). In one embodiment, the output of each PE (e.g., PE.0.1) is stored in a corresponding, same positioned element of a fourth two-dimensional matrix (e.g., in tile A 2101, tile B 2103, or tile C 2105). In one embodiment, the first value in configuration value storage 2102 causes matrix operations circuitry 2100 to be configured (e.g., the network to be configured) to perform the operations discussed in reference to FIG. 6.

In one embodiment, a second value in configuration value storage 2102 causes matrix operations circuitry 2100 to be configured (e.g., the network to be configured) to cause each fused multiply accumulate circuit to be configured to perform a different (e.g., fast Fourier transform (FFT)) operation. For example, to configure some (or all) of the routing (e.g., couplings) and component operation as in FIG. 23 or FIG. 24.

Figure 22:
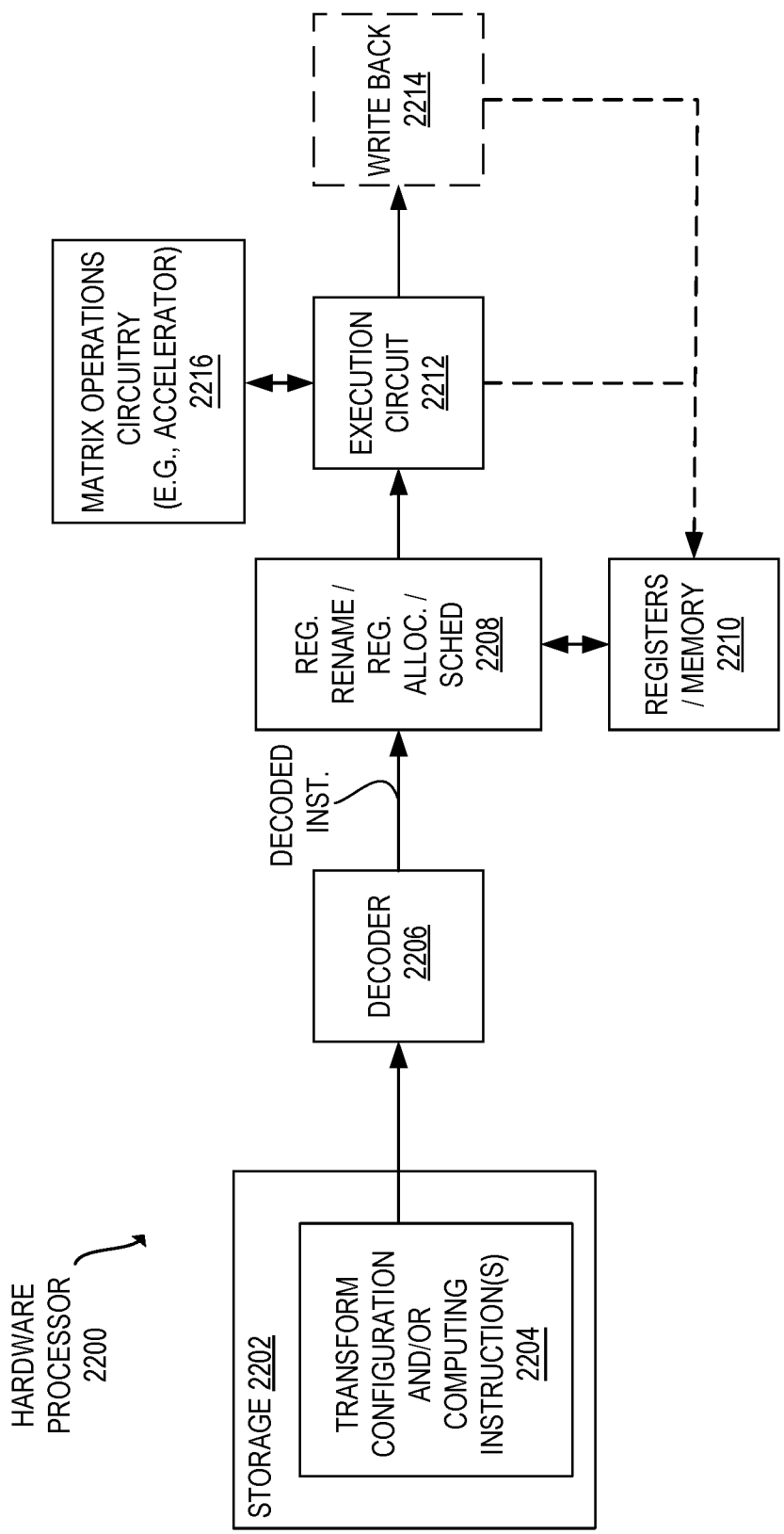
FIG. 22 illustrates a hardware processor coupled to storage that includes one or more transform configuration and/or computing instructions according to embodiments of the disclosure.

FIG. 22 illustrates a hardware processor 2200 coupled to storage 2202 that includes one or more transform (e.g., fast Fourier transform (FFT)) configuration and/or computing instruction 2204 according to embodiments of the disclosure. In certain embodiments, a transform (e.g., configuration and/or computing) instruction is according to any of the disclosure herein. In one embodiment, e.g., in response to a request to perform an operation, the instruction (e.g., macro-instruction) is fetched from storage 2202 and sent to decoder 2206. In the depicted embodiment, the decoder 2206 (e.g., decoder circuit) decodes the instruction into a decoded instruction (e.g., one or more micro-instructions or micro-operations). The decoded instruction is then sent for execution, e.g., via scheduler circuit 2208 to schedule the decoded instruction for execution.

In certain embodiments, (e.g., where the processor/core supports out-of-order (OoO) execution), the processor includes a register rename/allocator circuit coupled to register file/memory circuit 2210 (e.g., unit) to allocate resources and perform register renaming on registers (e.g., tile registers associated with the initial source(s) and final destination of the instruction). In certain embodiments, (e.g., for out-of-order execution), the processor includes one or more scheduler circuits 2208 coupled to the decoder. The scheduler circuit(s) may schedule one or more operations associated with decoded instructions, including one or more operations decoded from a packed data sorting instruction, for execution on the execution circuit 2212.

In certain embodiments, a write back circuit 2214 is included to write back results (e.g., Y0, Y1, Y2, and/or Y3 in FIG. 23 or FIG. 24) of an instruction to a destination (e.g., write them to a register(s) and/or memory), for example, so those results are visible within a processor (e.g., visible outside of the execution circuit that produced those results). In certain embodiments, matrix operations circuitry 2216 is an instance of the circuitry discussed herein (e.g., circuitry 2100 in FIG. 21, circuit block 2300 in FIG. 23, or circuit block 2400 in FIG. 24). In one embodiment, matrix operations circuitry 2216 is a hardware accelerator separate from a core that includes at least decoder 2206 and execution circuit 2212.

One or more of these components (e.g., decoder 2206, register rename/register allocator/scheduler 2208, execution circuit 2212, registers (e.g., register file)/memory 2210, matric operations circuitry, or write back circuit 2214) may be in a single core of a hardware processor (e.g., and multiple cores each with an instance of these components).

Certain embodiments herein of matrix operations circuitry 2216 include a (e.g., statically or dynamically) configurable routing network connecting neighboring PE circuits, e.g., in the manner shown in FIG. 23 or FIG. 24. In one embodiment, the network (e.g., network topology) is configured by execution of a configuration instruction (e.g., having an opcode corresponding to the TileFFTConfig mnemonic). In one embodiment, the network includes in-network routing elements (e.g., switches) with programmable output ports. In one embodiment, (e.g., depending on the size of the desired FFT circuit block), outputs will either be connected to inputs of downstream blocks or to storage (e.g., memory) as final output data values and/or inputs are connected to source the desired data (for example, to route the input data (e.g., including twiddle factors) to the correct PE circuit). In certain embodiments, a set of array programming files providing the set of supported FFT configurations are included. In certain embodiments, these programming files are stored in memory (e.g., memory 1801 in FIG. 18 or memory 2210 in FIG. 22). In certain embodiments, these programming files are contained as a library in a software distribution (e.g., a Math Kernel Library (MKL)), in an on-die storage (e.g., ROM), or other memory/operating system(OS)/run-time locations.

FIG. 23 illustrates a circuit block 2300 in a fast Fourier transform (FFT) mode according to embodiments of the disclosure. Although in the depicted embodiment two fused multiply accumulate (FMA) circuits are utilized, it is understood that any single or plurality of FMAs may be utilized.

In one embodiment, each of PEs in FIG. 21 are an instance of circuit block 2300. In one embodiment, circuit block 2300 is formed from configuring two PEs (e.g., PE.0.0 and PE.1.0 in circuit block 2104 in FIG. 21) for each block. In certain embodiments, circuit block 2300 is placed into transform (e.g., FFT) mode by storing a corresponding value (e.g., bit or bits) therein to cause the coupling of the components according to circuit block 2300, e.g., to switch from any mode discussed elsewhere herein. In certain embodiments, controller 2306 is included to provide the control values to the switches and/or other circuit components to cause performance of the configured operation(s).

In the depicted embodiment, circuit block 2300 is placed into transform (e.g., FFT) mode to cause split and swap circuitry 2310 to perform the depicted routing and/or operations therein, twiddle circuitry 2320 to perform the depicted routing and/or operations therein, and combination circuitry 2330 to perform the depicted routing and/or operations therein. In certain embodiments, circuit block 2300 takes values in a packed data format, for example, such that each value includes a first field with a first element of a pair of elements and a second element of a pair of elements (e.g., concatenated together). In one embodiment, each packed data value includes a first element that is one of a real element and an imaginary element of a single complex number and a second element that is the other of the real element and the imaginary element of the single complex number. A complex number may also be expressed in the form of a+bi, where a is the real element (number), b is the imaginary element (number), and i is the square root of negative one.

Circuit block 2300 may implement two 2-point transforms (e.g., a two-point butterfly), e.g., on input pairs X0, X1, and input pairs X2, and X3. The weights (e.g., twiddle factors) may also be complex numbers (e.g., with the same format and same real/imaginary order of elements as in the input values). In one embodiment, the order is a real element that is then followed (e.g., in series) by an imaginary element. In certain embodiments, the weights (e.g., twiddle factors) are alternated, e.g., as shown in FIG. 24.

In certain embodiments, a first packed data input value X1 (having a real element and an imaginary element) is stored into load buffer 2301, a second packed data input value X3 (having a real element and an imaginary element) is stored into load buffer 2302, a third packed data input value X0 (having a real element and an imaginary element) is stored into load buffer 2304, and a fourth packed data input value X2 (having a real element and an imaginary element) is stored into load buffer 2305. Weights (e.g., twiddle factors) for each of X1 and X3 may be stored into load buffer 2303. In certain embodiments, each weight has a real element and an imaginary element. In certain embodiments, the load buffers are coupled to one or more tiles (e.g., tile A 2101, tile B 2103, or tile C 2105 in FIG. 21) to source the data.

Circuit block 2300 may then perform operations (e.g., with split and swap circuitry 2310, twiddle circuitry 2320, and combination circuitry 2330) to generate resultants Y0, Y1, Y2, and Y3. In certain embodiments, the resultants Y0, Y1, Y2, and Y3 are provided to a next instance of block circuitry (e.g., with the same or different weights) as inputs X0, X1, X2, and X3, respectively.

In the depicted embodiment, switch 2311 has input ports coupled to input buffer 2301 and input buffer 2302 and an output port coupled to repeat circuit 2312, and switch 2317 has input ports coupled to input buffer 2304 and input buffer 2305 and an output port coupled to both ALU circuit 2332 and ALU circuit 2334. Further, the depicted embodiment includes a repeat circuit 2313 and a repeat circuit 2314 that are coupled to an output of load buffer 2303. Depicted repeat circuit 2312 is coupled to a first input port of FMA circuit 2322 of twiddle circuitry 2320. Depicted repeat circuit 2313 is coupled to a second input port of FMA circuit 2322 of twiddle circuitry 2320. Depicted repeat circuit 2314 is coupled to a first input port of FMA circuit 2324 of twiddle circuitry 2320. Depicted repeat circuit 2316 is coupled to a second input port of FMA circuit 2324 of twiddle circuitry 2320. Further, an input of repeat circuit 2316 is coupled to swap circuit 2315 so that the first element (e.g., real element) and second element (e.g., imaginary element) from switch 2311 is swapped in order (e.g., imaginary element before the real element in a single section (width) of data). In certain embodiments, the number of repeat operations (e.g., outputting the same value a preset number of time) of a repeat circuit is configured by the controller 2306 (e.g., according to the mode). In certain embodiments, a repeat circuit is removed from circuit block 2300 by repeating the value output from a load buffer. In certain embodiments, repeat circuits (e.g., repeat circuits 2313, 2313, 2314, and/or 2316) repeat a received value as an output two times (e.g., then removes the value from its input that it was repeating).

In one embodiment, a configuration instruction, when decoded and executed, creates circuit block 2300 (e.g., the routing and component functionality therein).

As one example of operation (e.g., in response to the decoding and executing of a FFT computing instruction), circuit block 2300 outputs X1 (e.g., the entire complex number) to repeat circuit 2312 and to swap circuit 2315. In this example, repeat circuit 2312 outputs the (same) real element of X1 for two consecutive operations (e.g., clock cycles) of FMA circuit 2322. In this example, swap circuit 2315 swaps the real and imaginary elements of X1 to create a flipped X1, and provides the flipped X1 to repeat circuit 2316. In this example, corresponding weight value (W1) for input X1 is sent to repeat circuit 2313 and repeat circuit 2314.

In one embodiment, a repeat circuit repeats the entire complex number twice and the input ports of the receiving circuit (e.g., FMA circuit 2322 and/or FMA circuit 2324) select a first proper subset (e.g., the upper half or the lower half) of the entire complex number for the first of the two repeats and a second, different proper subset (e.g., the other of the upper half or the lower half) of the entire complex number for the second of the two repeats, e.g., as directed by controller 2306. In certain embodiments, FMA 2322 2324 and FMA circuit includes an accumulator storage therein.

As one example, input port one of FMA 2322 provides a real element of X1 as a first input and input port two of FMA 2322 provides a real element of W1 as a second input to a multiplier of FMA 2322 to generate a first product, e.g., and stores that first product in the accumulator storage of FMA 2322. In this example, input port two of FMA 2324 provides an imaginary element of X1 as a second input and input port one of FMA 2324 provides an imaginary element of W1 as a first input to a multiplier of FMA 2324 to generate a second product, e.g., and stores that second product in the accumulator storage of FMA 2324.

In this example, the first product from FMA 2322 and the second product from FMA 2324 are input into ALU 2326 (e.g., subtractor circuitry thereof) and the second product is subtracted from the first product to generate a first result. In this example, the first result is sent as an input to a second port of ALU 2332 and a second port of ALU 2334. In this example, switch 2317 sends input value X0 (having a real element and an imaginary element) to input port one of ALU 2332 and input port one of ALU 2334. In this example, input port one of ALU 2332 provides a real element of X0 as a first input to ALU 2332 and input port two of ALU 2332 provides the first result to ALU 2332, which subtracts the first result from the real element of X0 to generate an output of the circuit block 2300 (e.g., a real element of Y1). In this example, input port one of ALU 2334 provides a real element of X0 as a first input to ALU 2334 and input port two of ALU 2334 provides the first result to ALU 2334, which adds the first result to the real element of X0 to generate an output of the circuit block 2300 (e.g., a real element of Y0).

In this example (e.g., as a next cycle), repeat circuits repeat the output of the same values (X1 and W1) such that input port one of FMA 2322 provides an imaginary element of X1 as a first input and input port two of FMA 2322 provides a real element of W1 as a second input to a multiplier of FMA 2322 to generate a third product, e.g., and stores that third product in the accumulator storage of FMA 2322. In this example, input port two of FMA 2324 provides a real element of X1 as a second input and input port one of FMA 2324 provides an imaginary element of W1 as a first input to a multiplier of FMA 2324 to generate a fourth product, e.g., and stores that fourth product in the accumulator storage of FMA 2324. In this example, the third product from FMA 2322 and the fourth product from FMA 2324 are input into ALU 2326 (e.g., an adder circuit thereof) and the third product is added to the fourth product to generate a second result. In this example, the second result is sent as an input to a second port of ALU 2332 and a second port of ALU 2334. In this example, switch 2317 sends input value X0 (having a real element and an imaginary element) to input port one of ALU 2332 and input port one of ALU 2334. In this example, input port one of ALU 2332 provides an imaginary element of X0 as a first input to ALU 2332 and input port two of ALU 2332 provides the second result to ALU 2332, which subtracts the second result from the imaginary element of X0 to generate an output of the circuit block 2300 (e.g., an imaginary element of Y1). In this example, input port one of ALU 2334 provides an imaginary element of X0 as a first input to ALU 2334 and input port two of ALU 2334 provides the first result to ALU 2334, which adds the first result to the imaginary element of X0 to generate an output of the circuit block 2300 (e.g., an imaginary element of Y0).

The process may then be repeated, e.g., with X3 substituted for X1, X2 substituted for X0, and the weights W3 substituted for the weights W1. Such an embodiment will produce outputs of Y0, Y1, Y2, and Y3 (e.g., as also shown in FIG. 24) using switch 2336 and switch 2338.

Thus, certain embodiments herein utilize a swap circuit such that the (e.g., FMA) circuits do not track real versus imaginary, e.g., the (e.g., FMA) circuits just pick a first subset (e.g., upper half) of bits of a packed data complex number first followed by (e.g., for the next calculation), a second, different subset (e.g., the lower half) of bits of the packed data complex number. A similar methodology may be used to split the weights W and repeat the real and imaginary components.

FIG. 24 illustrates a fast Fourier transform (FFT) computation on a circuit block 2400 according to embodiments of the disclosure. In FIG. 24, controller 2406 provides the controls to perform a FFT operation, for example to implement a two times (or by) 2-point transform (e.g., a two-point butterfly), e.g., on input pairs X0, X1, and input pairs X2, and X3. Example control inputs 2407 (e.g., indicated with a circled A-circled F) for a FFT configuration are depicted, e.g., control values provided by a configuration (e.g., mode) value.

Although in the depicted embodiment two fused multiply accumulate (FMA) circuits are utilized, it is understood that any single or plurality of FMAs may be utilized. In one embodiment, each of PEs in FIG. 21 are an instance of circuit block 2400. In one embodiment, circuit block 2400 is formed from configuring two PEs (e.g., PE.0.0 and PE.1.0 in circuit block 2104 in FIG. 21) for each block. In certain embodiments, circuit block 2400 is placed into transform (e.g., FFT) mode by storing a corresponding value (e.g., bit or bits) therein to cause the coupling of the components according to circuit block 2400, e.g., to switch from any mode discussed elsewhere herein. In certain embodiments, controller 2406 is included to provide the control values to the switches and/or other circuit components to cause performance of the configured operation(s).

In the depicted embodiment, circuit block 2400 is placed into transform (e.g., FFT) mode to cause circuit block 2400 to perform the depicted routing and/or operations therein. In certain embodiments, circuit block 2400 takes values in a packed data format, for example, such that each value includes a first field with a first element of a pair of elements and a second element of a pair of elements (e.g., concatenated together). In one embodiment, each packed data value includes a first element that is one of a real element and an imaginary element of a single complex number and a second element that is the other of the real element and the imaginary element of the single complex number. A complex number may also be expressed in the form of a+bi, where a is the real element (number), b is the imaginary element (number), and i is the square root of negative one.

Circuit block 2400 may implement two 2-point transforms (e.g., a two-point butterfly), e.g., on input pairs X0, X1, and input pairs X2, and X3. The weights (e.g., twiddle factors) may also be complex numbers (e.g., with the same format and same real/imaginary order of elements as in the input values). In one embodiment, the order is a real element that is then followed (e.g., in series) by an imaginary element. In certain embodiments, the weights (e.g., twiddle factors) are alternated, e.g., as shown in FIG. 24.

In certain embodiments, a first packed data input value X1 (having a real element and an imaginary element) is stored into load buffer 2401, a second packed data input value X3 (having a real element and an imaginary element) is stored into load buffer 2402, a third packed data input value X0 (having a real element and an imaginary element) is stored into load buffer 2404, and a fourth packed data input value X2 (having a real element and an imaginary element) is stored into load buffer 2405. Weights (e.g., twiddle factors) for X1 may be stored into load buffer 2403A and weights (e.g., twiddle factors) for X3 may be stored into load buffer 2403B. In certain embodiments, each weight has a real element and an imaginary element. In certain embodiments, the load buffers are coupled to one or more tiles (e.g., tile A 2101, tile B 2103, or tile C 2105 in FIG. 21) to source the data.

Circuit block 2400 may then perform operations to generate resultants Y0, Y1, Y2, and Y3. In certain embodiments, the resultants Y0, Y1, Y2, and Y3 are provided to a next instance of block circuitry (e.g., with the same or different weights) as inputs X0, X1, X2, and X3, respectively.

In the depicted embodiment, switch 2411 has input ports coupled to input buffer 2401 and input buffer 2402 and an output port coupled to an input port of ALU circuit 2423 (e.g., multiplier circuitry of the ALU) and an input port of the swap circuit 2415 (e.g., the input port of the first of two switches that form the swap circuit), and switch 2417 has input ports coupled to input buffer 2404 and input buffer 2405 and an output port coupled to an input port of ALU circuit 2432 (e.g., subtractor circuitry of the ALU) and an input port of ALU circuit 2434 (e.g., adder circuitry of the ALU). Further, the depicted embodiment includes a repeat circuit 2413 and a repeat circuit 2414 that are coupled to switch 2419 that is coupled to an output of load buffer 2403A and an output of load buffer 2403B. Output port of depicted switch 2419 is coupled to an input port of switch 2421, and a first output port of switch 2421 is coupled to an input port of repeat circuit 2413 and a second output port of switch 2421 is coupled to an input port of repeat circuit 2414. Output port of depicted repeat circuit 2413 is coupled to a second input port of ALU circuit 2423. In the depicted embodiment, swap circuit 2414 has an output port (e.g., the output port of the second of two switches that form the swap circuit) coupled to a first input port of ALU circuit 2427 (e.g., multiplier circuitry of the ALU). Depicted ALU circuit 2427 has its output port coupled to a second input port of ALU 2425 (e.g., an adder circuit of the ALU), and the first input port of ALU 2425 is coupled to the output port of ALU circuit 2423. Output port of depicted ALU 2425 is coupled to a first input port of ALU circuit 2432 (e.g., subtractor circuitry of the ALU) and a first input port of ALU circuit 2434 (e.g., adder circuitry of the ALU). Output of depicted switch 2436 is then to store (e.g., in a respective buffer) the corresponding real and imaginary elements of a single resultant (e.g., Y1 and Y3). Output of depicted switch 2438 is then to store (e.g., in a respective buffer) the corresponding real and imaginary elements of a single resultant (e.g., Y2 and Y4).

In certain embodiments, the number of repeat operations (e.g., outputting the same value a preset number of time) of a repeat circuit is configured by the controller 2406 (e.g., according to the mode). In certain embodiments, a repeat circuit is removed from circuit block 2400 by repeating the value output from a load buffer. In certain embodiments, repeat circuits (e.g., repeat circuits 2413 and/or 2414) repeat a received value as an output two times (e.g., then removes the value from its input that it was repeating). In on embodiment, switch 2419 and switch 2421 route the real elements of the weights from load buffer 2403A and load buffer 2403B to repeat circuit 2413 and route the imaginary elements of the weights from load buffer 2403A and load buffer 2403B to repeat circuit 2414, e.g., as controlled by controller 2406 being in the transform (e.g., FFT) mode.

In one embodiment, a configuration instruction, when decoded and executed, creates circuit block 2400 (e.g., the routing and component functionality therein).

As one example of operation (e.g., in response to the decoding and executing of a FFT computing instruction), load buffer 2402 outputs X1 (e.g., the entire complex number) to switch 2411 and then (at a next time period) load buffer 2401 outputs X3 (e.g., the entire complex number) to switch 2411. In this example, switch 2411 outputs the real element of X1, followed by the imaginary element of X1, then the real element of X3, followed by the imaginary element of X3 to a first input port of ALU circuit 2423 (e.g., multiplier circuitry of the ALU) and an input port of swap circuit 2415. In this example, repeat circuit 2413 receives the real element of W1, followed by the real element of W3, and outputs the real element of W1 for two consecutive operations (e.g., clock cycles) of ALU circuit 2423, and then outputs the real element of W3 for two consecutive operations (e.g., clock cycles) of ALU circuit 2423. In this example, repeat circuit 2414 receives the imaginary element of W1, followed by the imaginary element of W3, and outputs the imaginary element of W1 for two consecutive operations (e.g., clock cycles) of ALU circuit 2427, and then outputs the imaginary element of W3 for two consecutive operations (e.g., clock cycles) of ALU circuit 2427. In this example, swap circuit 2415 swaps the real and imaginary elements of X1 and then swaps the real and imaginary elements of X3 to output the imaginary element of X1, followed by the real element of X1, then the imaginary element of X3, followed by the real element of X3 to the first input port of ALU circuit 2427.

In certain embodiments, a multiplier circuit (e.g., at 2423 or 2427) is part of a FMA circuit (e.g., FMA circuit 2324 in FIG. 23), for example, where the accumulation function is not used or the added value is sent to zero).

In this example, the first product from ALU circuit 2423 (e.g., multiplier circuitry thereof) and the second product from ALU circuit 2427 (e.g., multiplier circuitry thereof) are input into ALU circuit 2425 (e.g., subtractor circuitry thereof) and the second product is subtracted from the first product to generate a first result. In this example, the first result is sent as an input to a first port of ALU 2432 and a first port of ALU circuit 2434. In this example, switch 2417 sends real element of input value X0 (having a real element and an imaginary element) to input port two of ALU circuit 2432 and input port two of ALU circuit 2434. In this example, input port one of ALU 2432 provides a real element of X0 as a first input to ALU 2432 and input port two of ALU 2432 provides the first result to ALU 2432, which subtracts the first result from the real element of X0 to generate an output of the circuit block 2400 (e.g., a real element of Y1). In this example, input port one of ALU 2434 provides a real element of X0 as a first input to ALU 2434 and input port two of ALU 2434 provides the first result to ALU 2434, which adds the first result to the real element of X0 to generate an output of the circuit block 2400 (e.g., a real element of Y0).

The process may then be repeated, e.g., with X3 substituted for X1, X2 substituted for X0, and the weights W3 substituted for the weights W1. In one embodiment, corresponding weight value (W3) for input X3 is sent to repeat circuit 2413 and repeat circuit 2414, for example, by switch 2419 sending (e.g., real or imaginary portions of) weight value W3 from load buffer 2403B via switch 2421. Such an embodiment will produce outputs of Y0, Y1, Y2, and Y3 (e.g., as also shown in FIG. 23) using switch 2436 and switch 2438.

In one embodiment, controller 2406 (e.g., when in the transform (e.g., FFT) mode) provides the control values on inputs 2407, for example, to achieve the functionality discussed herein. As one example, switch 2411 and switch 2417 may be provided with a time-multiplexed clock rate (e.g., to cause the output of data) by controller 2406 (e.g., according to a configuration value) that is a proper subset (e.g., ½, ¼, etc.) of the clock rate of the other operators (e.g., ALU circuit 2423, ALU circuit 2427, ALU circuit 2425, ALU circuit 2432, and/or ALU circuit 2434).

Figure 25:
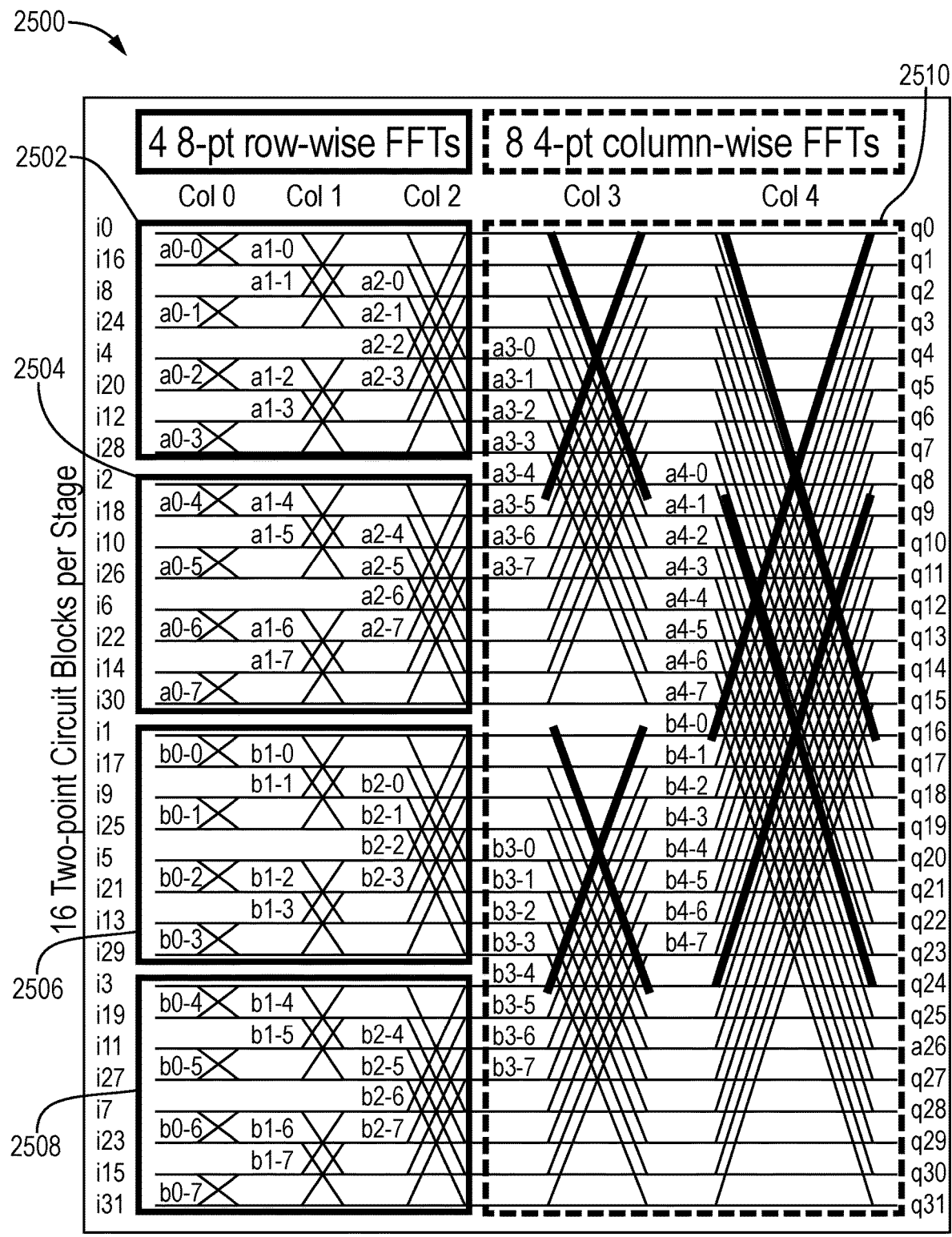
FIG. 25 illustrates a plurality of circuit blocks in a fast Fourier transform (FFT) mode according to embodiments of the disclosure.

FIG. 25 illustrates a plurality of circuit blocks 2500 in a fast Fourier transform (FFT) mode according to embodiments of the disclosure. In one embodiment, each of blocks 2502, 2504, 2506, and 2508 is a respective instance of circuit block 2300 of FIG. 23 of circuit block 2400 of FIG. 24. For example, circuit block 2502 includes an input X0 that is labeled as a0-0, an input X1 that is labeled as a0-1, an input X2 that is labeled as a0-2, and an input X3 that is labeled as a0-3.

Figure 26:
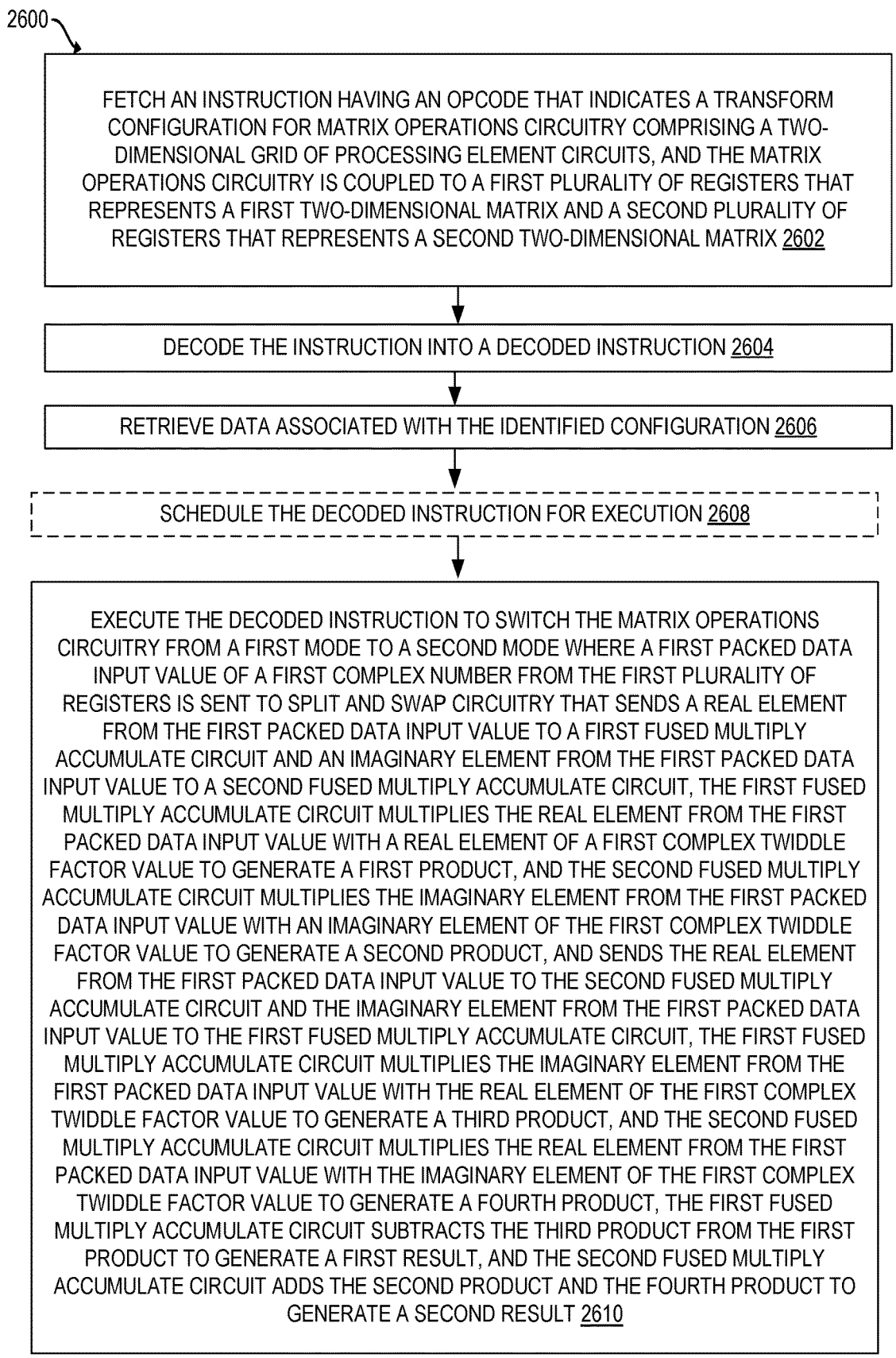
FIG. 26 illustrates a method of processing a fast Fourier transform (FFT) configuration instruction according to embodiments of the disclosure.

FIG. 26 illustrates a method of processing a fast Fourier transform (FFT) configuration instruction according to embodiments of the disclosure. A processor (e.g., or processor core) may perform method 2600, e.g., in response to receiving a request to execute an instruction from software. Depicted method 2600 includes fetch an instruction having an opcode that indicates a transform configuration for matrix operations circuitry comprising a two-dimensional grid of processing element circuits, and the matrix operations circuitry is coupled to a first plurality of registers that represents a first two-dimensional matrix and a second plurality of registers that represents a second two-dimensional matrix 2602, decode the instruction into a decoded instruction 2604, retrieve data associated with the identified configuration 2606, schedule the decoded instruction for execution 2608, execute the decoded instruction to switch the matrix operations circuitry from a first mode (e.g., where each processing element circuit operates on corresponding, same positioned elements of the first two-dimensional matrix and the second two-dimensional matrix) to a second mode where a first packed data input value of a first complex number from the first plurality of registers is sent to split and swap circuitry that sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result 2610.

Figure 27:
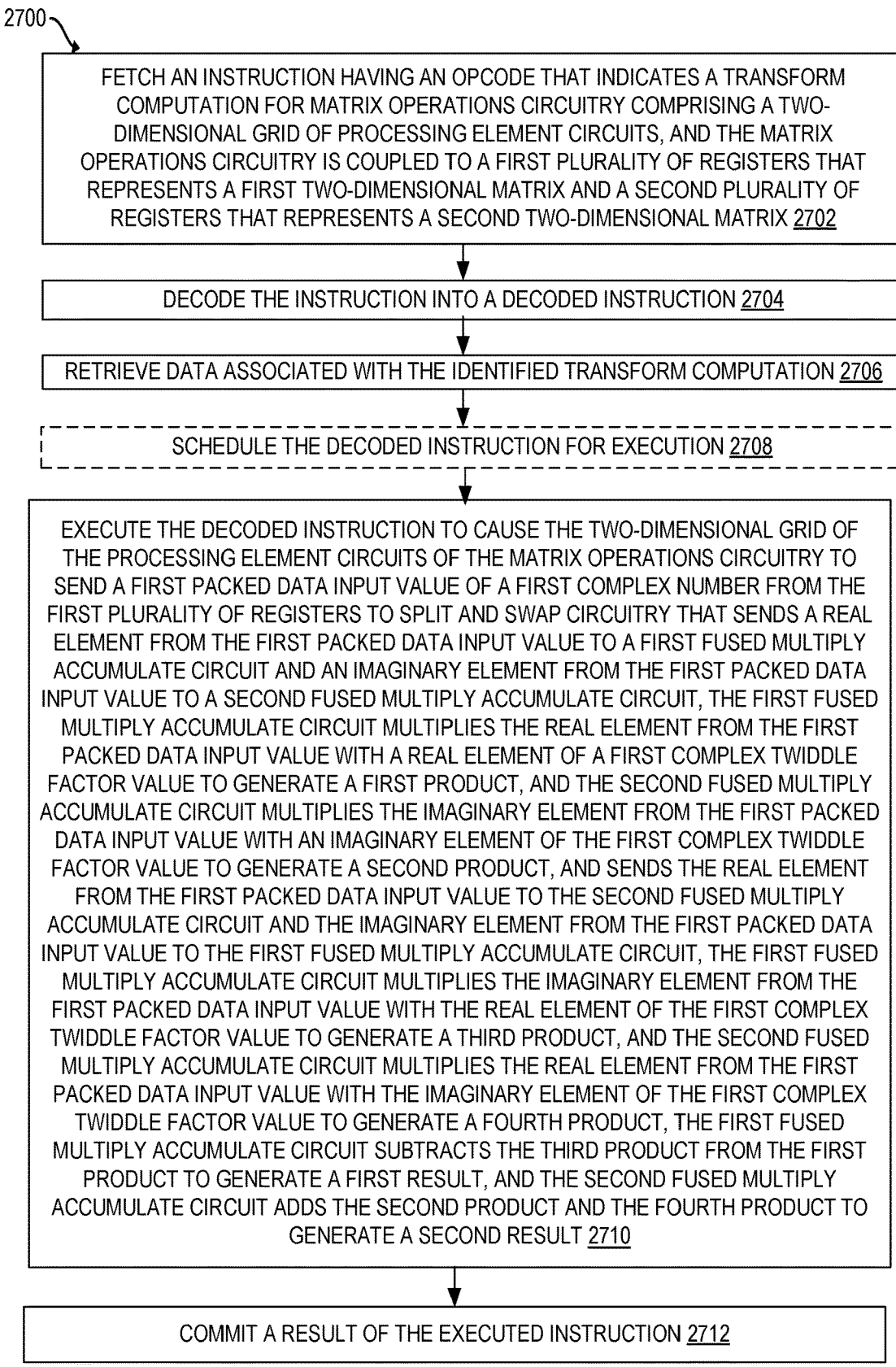
FIG. 27 illustrates a method of processing a fast Fourier transform (FFT) computing instruction according to embodiments of the disclosure.

FIG. 27 illustrates a method of processing a fast Fourier transform (FFT) computing instruction according to embodiments of the disclosure. A processor (e.g., or processor core) may perform method 2700, e.g., in response to receiving a request to execute an instruction from software. Depicted method 2700 includes fetch an instruction having an opcode that indicates a transform computation for matrix operations circuitry comprising a two-dimensional grid of processing element circuits, and the matrix operations circuitry is coupled to a first plurality of registers that represents a first two-dimensional matrix and a second plurality of registers that represents a second two-dimensional matrix 2702, decode the instruction into a decoded instruction 2704, retrieve data associated with the identified transform computation 2706, schedule the decoded instruction for execution 2708, execute the decoded instruction to cause the two-dimensional grid of the processing element circuits of the matrix operations circuitry to send a first packed data input value of a first complex number from the first plurality of registers to split and swap circuitry that sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result 2710, and commit a result of the executed instruction 2712.

Figure 28:
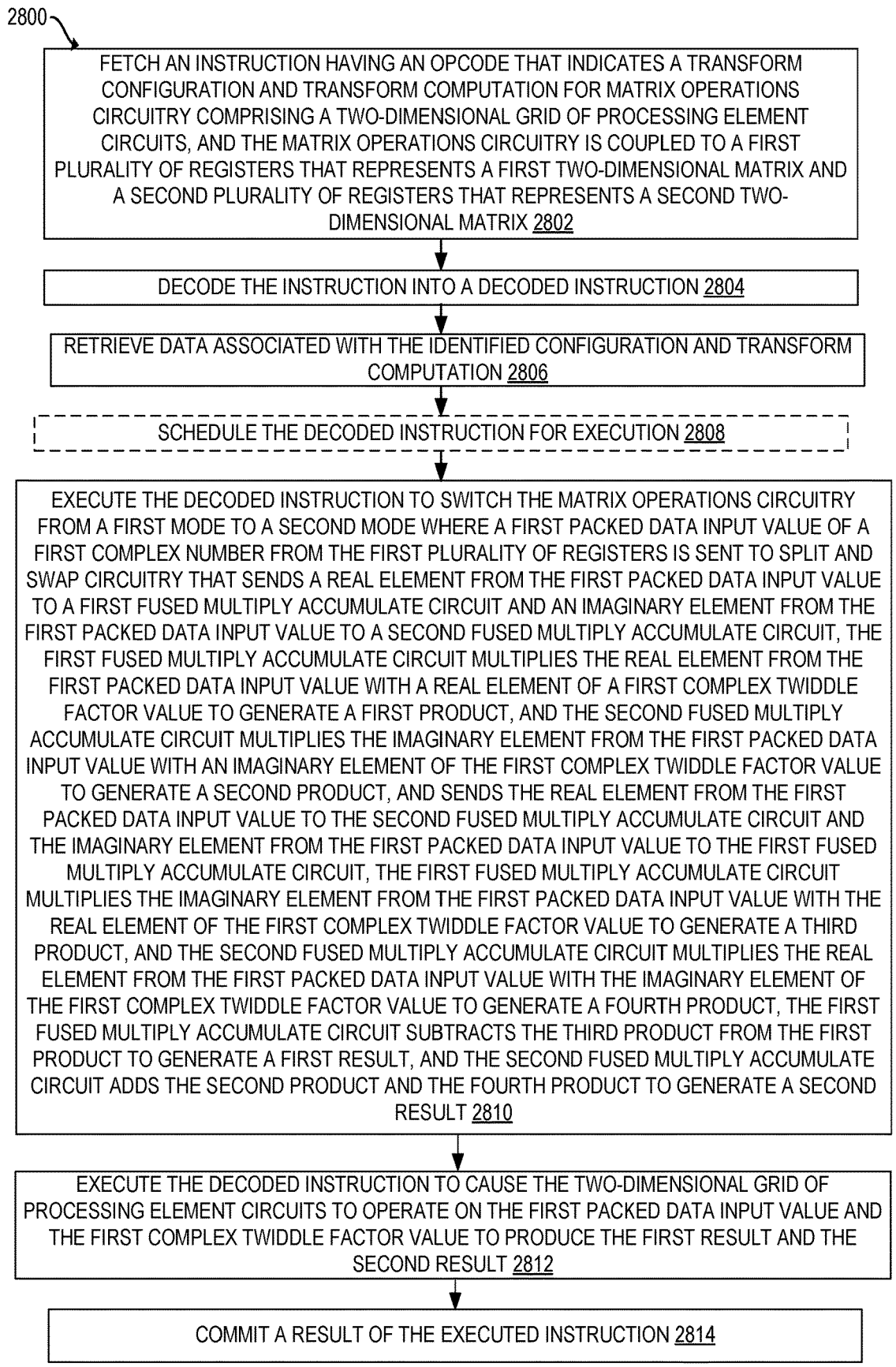
FIG. 28 illustrates a method of processing a fast Fourier transform (FFT) configuration and computing instruction according to embodiments of the disclosure.

FIG. 28 illustrates a method of processing a fast Fourier transform (FFT) configuration and computing instruction according to embodiments of the disclosure. A processor (e.g., or processor core) may perform method 2800, e.g., in response to receiving a request to execute an instruction from software. Depicted method 2800 includes fetch an instruction having an opcode that indicates a transform configuration and transform computation for matrix operations circuitry comprising a two-dimensional grid of processing element circuits, and the matrix operations circuitry is coupled to a first plurality of registers that represents a first two-dimensional matrix and a second plurality of registers that represents a second two-dimensional matrix 2802, decode the instruction into a decoded instruction 2804, retrieve data associated with the identified configuration and transform computation 2806, schedule the decoded instruction for execution 2808, execute the decoded instruction to switch the matrix operations circuitry from a first mode to a second mode where a first packed data input value of a first complex number from the first plurality of registers is sent to split and swap circuitry that sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result 2810, execute the decoded instruction to cause the two-dimensional grid of processing element circuits to operate on the first packed data input value and the first complex twiddle factor value to produce the first result and the second result 2812, and commit a result of the executed instruction 2814.

In one embodiment, an apparatus (e.g., a processor) includes a matrix operations accelerator circuit comprising a two-dimensional grid of processing element circuits; a first plurality of registers that represents a first two-dimensional matrix coupled to the matrix operations accelerator circuit; a second plurality of registers that represents a second two-dimensional matrix coupled to the matrix operations accelerator circuit; a decoder, of a core coupled to the matrix operations accelerator circuit, to decode a single instruction into a decoded single instruction; and a circuit of the core to execute the decoded single instruction to switch the matrix operations accelerator circuit from a first mode where each processing element circuit operates on corresponding, same positioned elements of the first two-dimensional matrix and the second two-dimensional matrix to a second mode where a first packed data input value of a first complex number from the first plurality of registers is broadcast to split and swap circuitry that sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result. The circuit may execute the decoded single instruction to broadcast the first complex twiddle factor value from the second plurality of registers to the split and swap circuitry. The circuit may execute the decoded single instruction to cause adder circuitry to subtract the first result from a real element of a second packed data input value from the first plurality of registers to generate a third result, subtract the second result from an imaginary element of the second packed data input value from the first plurality of registers to generate a fourth result, and store the third result and the fourth result as packed data in the first plurality of registers. The circuit may execute the decoded single instruction to cause the real element and the imaginary element of the first packed data input value to be sent together to a repeat circuit for each input port of the first fused multiply accumulate circuit and the second fused multiply accumulate circuit. The circuit may execute the decoded single instruction to cause a swap circuit coupled to an input port of the second fused multiply accumulate circuit to swap the order of the real element and the imaginary element of the first packed data input value. The single instruction may include at least one field that indicates the values are single-precision (or double-precision) floating-point values. The decoder may decode a second instruction into a decoded second instruction; and the circuit may execute the decoded second instruction to cause the matrix operations accelerator circuit in the second mode to generate the first result and the second result. The circuit may execute the decoded single instruction to cause the matrix operations accelerator circuit in the second mode to generate the first result and the second result.

In another embodiment, a method includes decoding, with a decoder of a core, a single instruction into a decoded single instruction, wherein the core is coupled to a matrix operations accelerator circuit comprising a two-dimensional grid of processing element circuits, and the matrix operations accelerator circuit is coupled to a first plurality of registers that represents a first two-dimensional matrix and a second plurality of registers that represents a second two-dimensional matrix; and executing the decoded single instruction with a circuit of the core to: switch the matrix operations accelerator circuit from a first mode where each processing element circuit operates on corresponding, same positioned elements of the first two-dimensional matrix and the second two-dimensional matrix to a second mode where a first packed data input value of a first complex number from the first plurality of registers is broadcast to split and swap circuitry that sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result. The executing the decoded single instruction may broadcast the first complex twiddle factor value from the second plurality of registers to the split and swap circuitry. The executing the decoded single instruction may cause subtractor circuitry to subtract the first result from a real element of a second packed data input value from the first plurality of registers to generate a third result, subtract the second result from an imaginary element of the second packed data input value from the first plurality of registers to generate a fourth result, and store the third result and the fourth result as packed data in the first plurality of registers. The executing the decoded single instruction may cause the real element and the imaginary element of the first packed data input value to be sent together to a repeat circuit for each input port of the first fused multiply accumulate circuit and the second fused multiply accumulate circuit. The executing the decoded single instruction may cause a swap circuit coupled to an input port of the second fused multiply accumulate circuit to swap the order of the real element and the imaginary element of the first packed data input value. The single instruction may include at least one field that indicates the values are double-precision floating-point values. The method may include decoding a second instruction into a decoded second instruction with the decoder; and executing the decoded second instruction with the circuit to cause the matrix operations accelerator circuit in the second mode to generate the first result and the second result. The executing the decoded single instruction may cause the matrix operations accelerator circuit in the second mode to generate the first result and the second result.

In yet another embodiment, a non-transitory machine readable medium that stores code that when executed by a machine causes the machine to perform a method including decoding, with a decoder of a core, a single instruction into a decoded single instruction, wherein the core is coupled to a matrix operations accelerator circuit comprising a two-dimensional grid of processing element circuits, and the matrix operations accelerator circuit is coupled to a first plurality of registers that represents a first two-dimensional matrix and a second plurality of registers that represents a second two-dimensional matrix; and executing the decoded single instruction with a circuit of the core to: switch the matrix operations accelerator circuit from a first mode where each processing element circuit operates on corresponding, same positioned elements of the first two-dimensional matrix and the second two-dimensional matrix to a second mode where a first packed data input value of a first complex number from the first plurality of registers is broadcast to split and swap circuitry that sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result. The executing the decoded single instruction may broadcast the first complex twiddle factor value from the second plurality of registers to the split and swap circuitry. The executing the decoded single instruction may cause subtractor circuitry to subtract the first result from a real element of a second packed data input value from the first plurality of registers to generate a third result, subtract the second result from an imaginary element of the second packed data input value from the first plurality of registers to generate a fourth result, and store the third result and the fourth result as packed data in the first plurality of registers. The executing the decoded single instruction may cause the real element and the imaginary element of the first packed data input value to be sent together to a repeat circuit for each input port of the first fused multiply accumulate circuit and the second fused multiply accumulate circuit. The executing the decoded single instruction may cause a swap circuit coupled to an input port of the second fused multiply accumulate circuit to swap the order of the real element and the imaginary element of the first packed data input value. The single instruction may include at least one field that indicates the values are double-precision floating-point values. The method may include decoding a second instruction into a decoded second instruction with the decoder; and executing the decoded second instruction with the circuit to cause the matrix operations accelerator circuit in the second mode to generate the first result and the second result. The executing the decoded single instruction may cause the matrix operations accelerator circuit in the second mode to generate the first result and the second result.

In another embodiment, an apparatus (e.g., a processor) includes a means comprising a two-dimensional grid of processing element circuits; a first plurality of registers that represents a first two-dimensional matrix coupled to the means; a second plurality of registers that represents a second two-dimensional matrix coupled to the means; a decoder, of a core coupled to the means, to decode a single instruction into a decoded single instruction; and a circuit of the core to execute the decoded single instruction to switch the means from a first mode where each processing element circuit operates on corresponding, same positioned elements of the first two-dimensional matrix and the second two-dimensional matrix to a second mode where a first packed data input value of a first complex number from the first plurality of registers is broadcast to split and swap circuitry that sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result.

In yet another embodiment, an apparatus comprises a data storage device that stores code that when executed by a hardware processor causes the hardware processor to perform any method disclosed herein. An apparatus may be as described in the detailed description. A method may be as described in the detailed description.

Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source 2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Advanced Vector Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 29A:
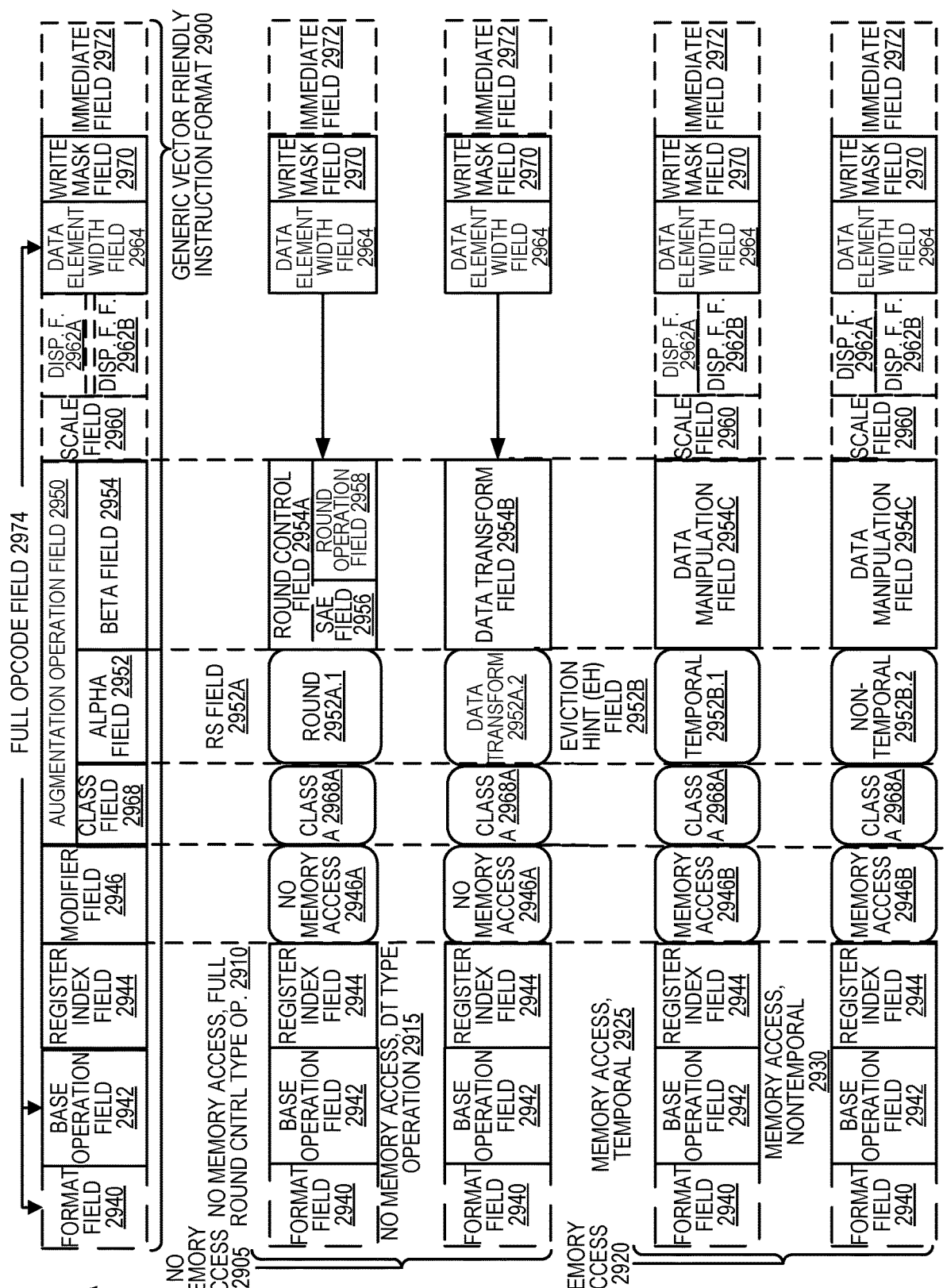
FIG. 29A is a block diagram illustrating a generic vector friendly instruction format and class A instruction templates thereof according to embodiments of the disclosure.
Figure 29B:
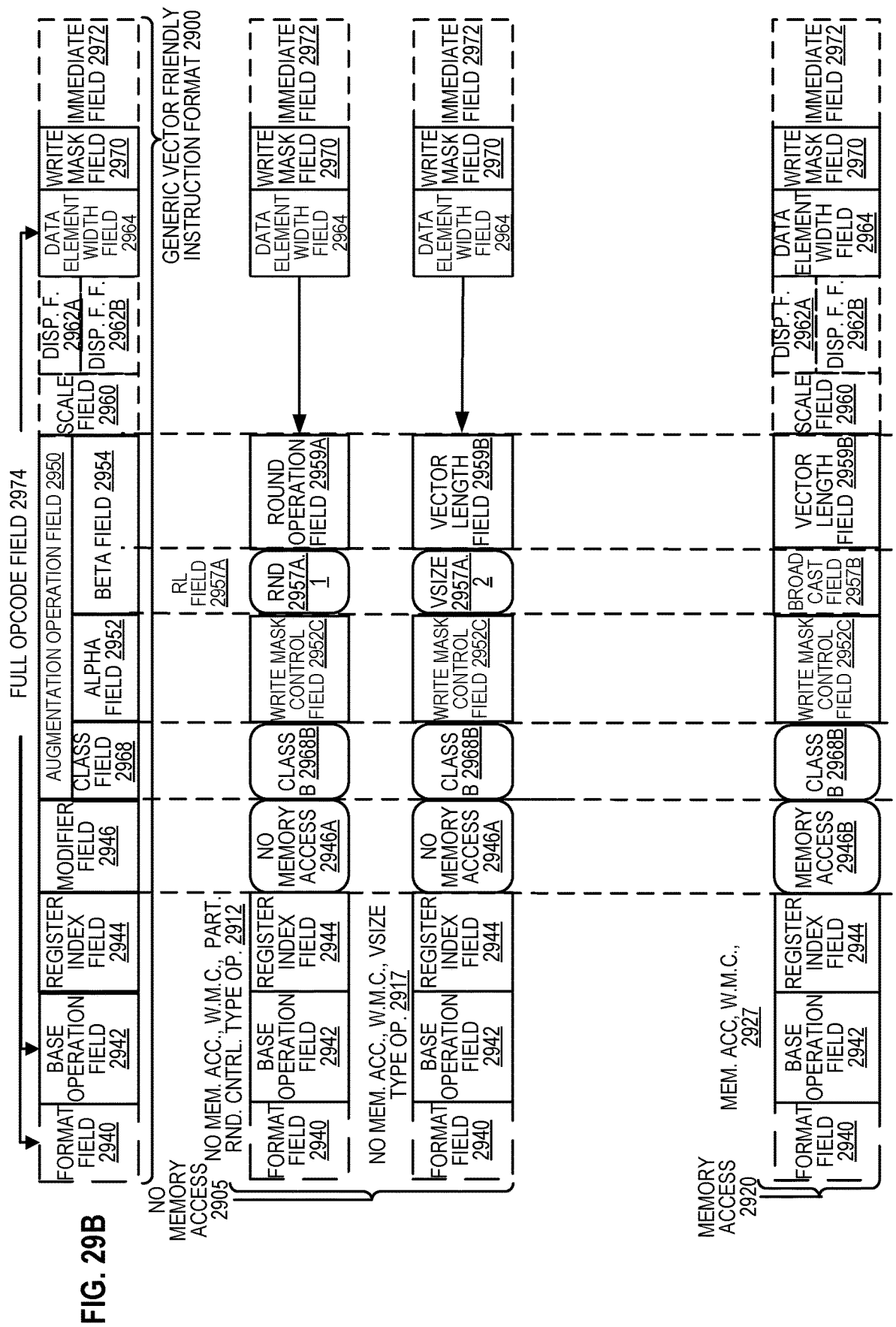
FIG. 29B is a block diagram illustrating the generic vector friendly instruction format and class B instruction templates thereof according to embodiments of the disclosure.

FIGS. 29A-29B are block diagrams illustrating a generic vector friendly instruction format and instruction templates thereof according to embodiments of the disclosure. FIG. 29A is a block diagram illustrating a generic vector friendly instruction format and class A instruction templates thereof according to embodiments of the disclosure; while FIG. 29B is a block diagram illustrating the generic vector friendly instruction format and class B instruction templates thereof according to embodiments of the disclosure. Specifically, a generic vector friendly instruction format 2900 for which are defined class A and class B instruction templates, both of which include no memory access 2905 instruction templates and memory access 2920 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 29A include: 1) within the no memory access 2905 instruction templates there is shown a no memory access, full round control type operation 2910 instruction template and a no memory access, data transform type operation 2915 instruction template; and 2) within the memory access 2920 instruction templates there is shown a memory access, temporal 2925 instruction template and a memory access, non-temporal 2930 instruction template. The class B instruction templates in FIG. 29B include: 1) within the no memory access 2905 instruction templates there is shown a no memory access, write mask control, partial round control type operation 2912 instruction template and a no memory access, write mask control, vsize type operation 2917 instruction template; and 2) within the memory access 2920 instruction templates there is shown a memory access, write mask control 2927 instruction template.

The generic vector friendly instruction format 2900 includes the following fields listed below in the order illustrated in FIGS. 29A-29B.

Format field 2940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2942—its content distinguishes different base operations.

Register index field 2944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2946—its content distinguishes occurrences of instructions in the generic vector instruction format that specify memory access from those that do not; that is, between no memory access 2905 instruction templates and memory access 2920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2950—its content distinguishes which one of a variety of different operations to be performed in addition to the base operation. This field is context specific. In one embodiment of the disclosure, this field is divided into a class field 2968, an alpha field 2952, and a beta field 2954. The augmentation operation field 2950 allows common groups of operations to be performed in a single instruction rather than 2, 3, or 4 instructions.

Scale field 2960—its content allows for the scaling of the index field's content for memory address generation (e.g., for address generation that uses $2^{scale}*index+base$).

Displacement Field 2962A—its content is used as part of memory address generation (e.g., for address generation that uses $2^{scale}*index+base+displacement$).

Displacement Factor Field 2962B (note that the juxtaposition of displacement field 2962A directly over displacement factor field 2962B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2974 (described later herein) and the data manipulation field 2954C. The displacement field 2962A and the displacement factor field 2962B are optional in the sense that they are not used for the no memory access 2905 instruction templates and/or different embodiments may implement only one or none of the two.

Data element width field 2964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2970 allows for partial vector operations, including loads, stores, arithmetic, logical, etc. While embodiments of the disclosure are described in which the write mask field's 2970 content selects one of a number of write mask registers that contains the write mask to be used (and thus the write mask field's 2970 content indirectly identifies that masking to be performed), alternative embodiments instead or additional allow the mask write field's 2970 content to directly specify the masking to be performed.

Immediate field 2972—its content allows for the specification of an immediate. This field is optional in the sense that is it not present in an implementation of the generic vector friendly format that does not support immediate and it is not present in instructions that do not use an immediate.

Class field 2968—its content distinguishes between different classes of instructions. With reference to FIGS. 29A-B, the contents of this field select between class A and class B instructions. In FIGS. 29A-B, rounded corner squares are used to indicate a specific value is present in a field (e.g., class A 2968A and class B 2968B for the class field 2968 respectively in FIGS. 29A-B).

Instruction Templates of Class A

In the case of the non-memory access 2905 instruction templates of class A, the alpha field 2952 is interpreted as an RS field 2952A, whose content distinguishes which one of the different augmentation operation types are to be performed (e.g., round 2952A.1 and data transform 2952A.2 are respectively specified for the no memory access, round type operation 2910 and the no memory access, data transform type operation 2915 instruction templates), while the beta field 2954 distinguishes which of the operations of the specified type is to be performed. In the no memory access 2905 instruction templates, the scale field 2960, the displacement field 2962A, and the displacement scale filed 2962B are not present.

No-Memory Access Instruction Templates—Full Round Control Type Operation

In the no memory access full round control type operation 2910 instruction template, the beta field 2954 is interpreted as a round control field 2954A, whose content(s) provide static rounding. While in the described embodiments of the disclosure the round control field 2954A includes a suppress all floating point exceptions (SAE) field 2956 and a round operation control field 2958, alternative embodiments may support may encode both these concepts into the same field or only have one or the other of these concepts/fields (e.g., may have only the round operation control field 2958).

SAE field 2956—its content distinguishes whether or not to disable the exception event reporting; when the SAE field's 2956 content indicates suppression is enabled, a given instruction does not report any kind of floating-point exception flag and does not raise any floating point exception handler.

Round operation control field 2958—its content distinguishes which one of a group of rounding operations to perform (e.g., Round-up, Round-down, Round-towards-zero and Round-to-nearest). Thus, the round operation control field 2958 allows for the changing of the rounding mode on a per instruction basis. In one embodiment of the disclosure where a processor includes a control register for specifying rounding modes, the round operation control field's 2950 content overrides that register value.

No Memory Access Instruction Templates—Data Transform Type Operation

In the no memory access data transform type operation 2915 instruction template, the beta field 2954 is interpreted as a data transform field 2954B, whose content distinguishes which one of a number of data transforms is to be performed (e.g., no data transform, swizzle, broadcast).

In the case of a memory access 2920 instruction template of class A, the alpha field 2952 is interpreted as an eviction hint field 2952B, whose content distinguishes which one of the eviction hints is to be used (in FIG. 29A, temporal 2952B.1 and non-temporal 2952B.2 are respectively specified for the memory access, temporal 2925 instruction template and the memory access, non-temporal 2930 instruction template), while the beta field 2954 is interpreted as a data manipulation field 2954C, whose content distinguishes which one of a number of data manipulation operations (also known as primitives) is to be performed (e.g., no manipulation; broadcast; up conversion of a source; and down conversion of a destination). The memory access 2920 instruction templates include the scale field 2960, and optionally the displacement field 2962A or the displacement scale field 2962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2952 is interpreted as a write mask control (Z) field 2952C, whose content distinguishes whether the write masking controlled by the write mask field 2970 should be a merging or a zeroing.

In the case of the non-memory access 2905 instruction templates of class B, part of the beta field 2954 is interpreted as an RL field 2957A, whose content distinguishes which one of the different augmentation operation types are to be performed (e.g., round 2957A.1 and vector length (VSIZE) 2957A.2 are respectively specified for the no memory access, write mask control, partial round control type operation 2912 instruction template and the no memory access, write mask control, VSIZE type operation 2917 instruction template), while the rest of the beta field 2954 distinguishes which of the operations of the specified type is to be performed. In the no memory access 2905 instruction templates, the scale field 2960, the displacement field 2962A, and the displacement scale filed 2962B are not present.

In the no memory access, write mask control, partial round control type operation 2910 instruction template, the rest of the beta field 2954 is interpreted as a round operation field 2959A and exception event reporting is disabled (a given instruction does not report any kind of floating-point exception flag and does not raise any floating point exception handler).

Round operation control field 2959A—just as round operation control field 2958, its content distinguishes which one of a group of rounding operations to perform (e.g., Round-up, Round-down, Round-towards-zero and Round-to-nearest). Thus, the round operation control field 2959A allows for the changing of the rounding mode on a per instruction basis. In one embodiment of the disclosure where a processor includes a control register for specifying rounding modes, the round operation control field's 2950 content overrides that register value.

In the no memory access, write mask control, VSIZE type operation 2917 instruction template, the rest of the beta field 2954 is interpreted as a vector length field 2959B, whose content distinguishes which one of a number of data vector lengths is to be performed on (e.g., 128, 256, or 512 byte).

In the case of a memory access 2920 instruction template of class B, part of the beta field 2954 is interpreted as a broadcast field 2957B, whose content distinguishes whether or not the broadcast type data manipulation operation is to be performed, while the rest of the beta field 2954 is interpreted the vector length field 2959B. The memory access 2920 instruction templates include the scale field 2960, and optionally the displacement field 2962A or the displacement scale field 2962B.

With regard to the generic vector friendly instruction format 2900, a full opcode field 2974 is shown including the format field 2940, the base operation field 2942, and the data element width field 2964. While one embodiment is shown where the full opcode field 2974 includes all of these fields, the full opcode field 2974 includes less than all of these fields in embodiments that do not support all of them. The full opcode field 2974 provides the operation code (opcode).

The augmentation operation field 2950, the data element width field 2964, and the write mask field 2970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 30 is a block diagram illustrating an exemplary specific vector friendly instruction format according to embodiments of the disclosure. FIG. 30 shows a specific vector friendly instruction format 3000 that is specific in the sense that it specifies the location, size, interpretation, and order of the fields, as well as values for some of those fields. The specific vector friendly instruction format 3000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 29 into which the fields from FIG. 30 map are illustrated.

It should be understood that, although embodiments of the disclosure are described with reference to the specific vector friendly instruction format 3000 in the context of the generic vector friendly instruction format 2900 for illustrative purposes, the disclosure is not limited to the specific vector friendly instruction format 3000 except where claimed. For example, the generic vector friendly instruction format 2900 contemplates a variety of possible sizes for the various fields, while the specific vector friendly instruction format 3000 is shown as having fields of specific sizes. By way of specific example, while the data element width field 2964 is illustrated as a one bit field in the specific vector friendly instruction format 3000, the disclosure is not so limited (that is, the generic vector friendly instruction format 2900 contemplates other sizes of the data element width field 2964).

The generic vector friendly instruction format 2900 includes the following fields listed below in the order illustrated in FIG. 30A.

EVEX Prefix (Bytes 0-3) 3002—is encoded in a four-byte form.

Format Field 2940 (EVEX Byte 0, bits [7:0])—the first byte (EVEX Byte 0) is the format field 2940 and it contains 0×62 (the unique value used for distinguishing the vector friendly instruction format in one embodiment of the disclosure).

The second-fourth bytes (EVEX Bytes 1-3) include a number of bit fields providing specific capability.

REX field 3005 (EVEX Byte 1, bits [7-5])—consists of a EVEX.R bit field (EVEX Byte 1, bit [7]-R), EVEX.X bit field (EVEX byte 1, bit [6]-X), and 2957BEX byte 1, bit[5]-B). The EVEX.R, EVEX.X, and EVEX.B bit fields provide the same functionality as the corresponding VEX bit fields, and are encoded using 1s complement form, e.g. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2910—this is the first part of the REX' field 2910 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 3015 (EVEX byte 1, bits [3:0]—mmmm)—its content encodes an implied leading opcode byte (0F, 0F 38, or 0F 3).

Data element width field 2964 (EVEX byte 2, bit [7]-W)—is represented by the notation EVEX.W. EVEX.W is used to define the granularity (size) of the datatype (either 32-bit data elements or 64-bit data elements).

EVEX.vvvv 3020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 3020 encodes the 4 low-order bits of the first source register specifier stored in inverted (1s complement) form. Depending on the instruction, an extra different EVEX bit field is used to extend the specifier size to 32 registers.

EVEX.U 2968 Class field (EVEX byte 2, bit [2]-U)—If EVEX.U=0, it indicates class A or EVEX.U0; if EVEX.U=1, it indicates class B or EVEX.U1.

Prefix encoding field 3025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2952 (EVEX byte 3, bit [7]-13 EH; also known as EVEX.EH, EVEX.rs, EVEX.RL, EVEX.write mask control, and EVEX.N; also illustrated with α)—as previously described, this field is context specific.

Beta field 2954 (EVEX byte 3, bits [6:4]-SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 2910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2970 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 3030 (Byte 4) is also known as the opcode byte. Part of the opcode is specified in this field.

MOD R/M Field 3040 (Byte 5) includes MOD field 3042, Reg field 3044, and R/M field 3046. As previously described, the MOD field's 3042 content distinguishes between memory access and non-memory access operations. The role of Reg field 3044 can be summarized to two situations: encoding either the destination register operand or a source register operand, or be treated as an opcode extension and not used to encode any instruction operand. The role of R/M field 3046 may include the following: encoding the instruction operand that references a memory address, or encoding either the destination register operand or a source register operand.

Scale, Index, Base (SIB) Byte (Byte 6)—As previously described, the scale field's 2950 content is used for memory address generation. SIB.xxx 3054 and SIB.bbb 3056—the contents of these fields have been previously referred to with regard to the register indexes Xxxx and Bbbb.

Displacement field 2962A (Bytes 7-10)—when MOD field 3042 contains 10, bytes 7-10 are the displacement field 2962A, and it works the same as the legacy 32-bit displacement (disp32) and works at byte granularity.

Displacement factor field 2962B (Byte 7)—when MOD field 3042 contains 01, byte 7 is the displacement factor field 2962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128,−64, 0, and 64; since a greater range is often needed, disp32 is used; however, disp32 requires 4 bytes. In contrast to disp8 and disp32, the displacement factor field 2962B is a reinterpretation of disp8; when using displacement factor field 2962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2962B substitutes the legacy x86 instruction set 8-bit displacement. Thus, the displacement factor field 2962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2972 operates as previously described.

Full Opcode Field

FIG. 30B is a block diagram illustrating the fields of the specific vector friendly instruction format 3000 that make up the full opcode field 2974 according to one embodiment of the disclosure. Specifically, the full opcode field 2974 includes the format field 2940, the base operation field 2942, and the data element width (W) field 2964. The base operation field 2942 includes the prefix encoding field 3025, the opcode map field 3015, and the real opcode field 3030.

Register Index Field

FIG. 30C is a block diagram illustrating the fields of the specific vector friendly instruction format 3000 that make up the register index field 2944 according to one embodiment of the disclosure. Specifically, the register index field 2944 includes the REX field 3005, the REX' field 3010, the MODR/M.reg field 3044, the MODR/M.r/m field 3046, the VVVV field 3020, xxx field 3054, and the bbb field 3056.

Augmentation Operation Field

Figure 30D:
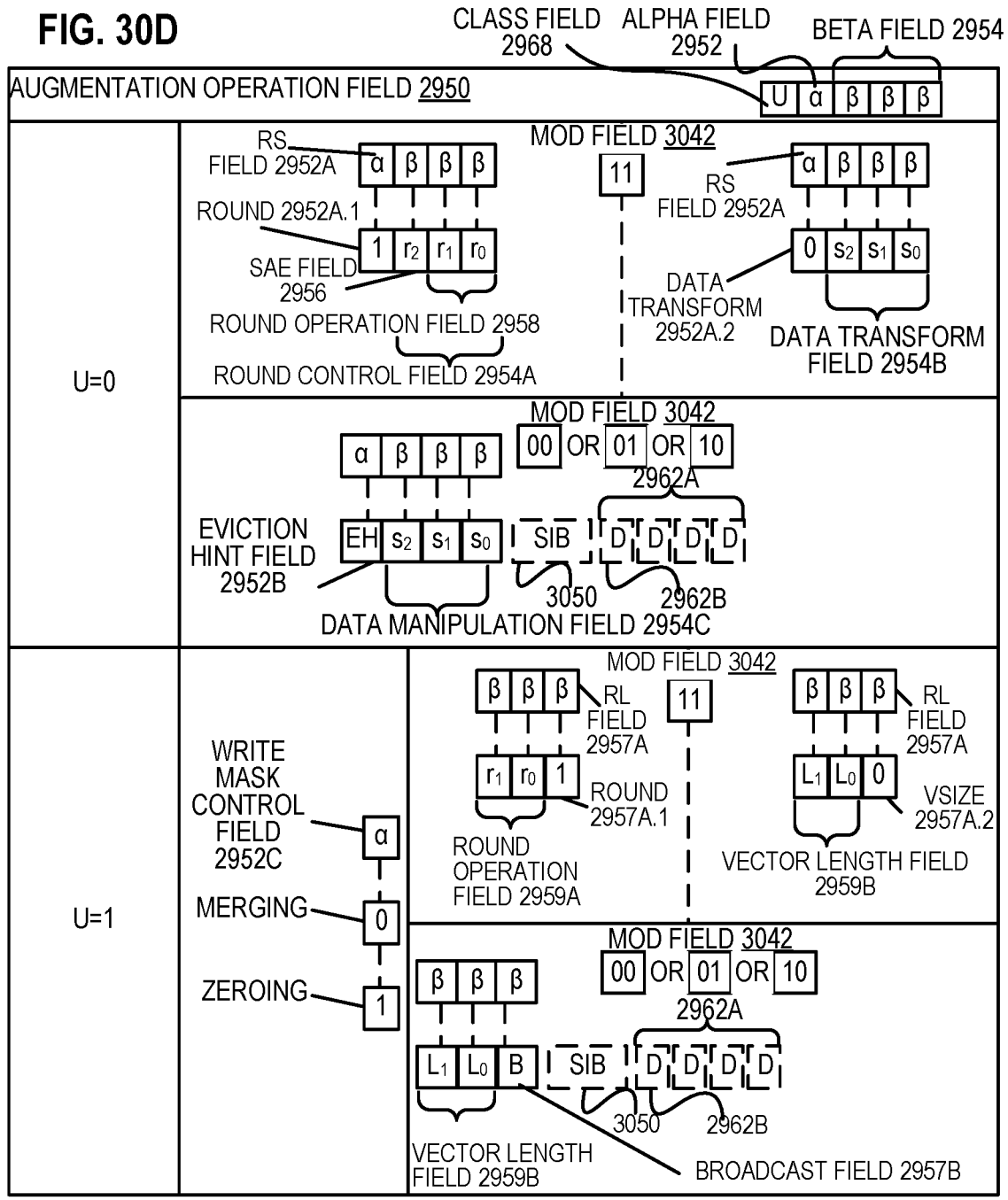
FIG. 30D is a block diagram illustrating the fields of the specific vector friendly instruction format in FIG. 30A that make up the augmentation operation field 2950 according to one embodiment of the disclosure.

FIG. 30D is a block diagram illustrating the fields of the specific vector friendly instruction format 3000 that make up the augmentation operation field 2950 according to one embodiment of the disclosure. When the class (U) field 2968 contains 0, it signifies EVEX.U0 (class A 2968A); when it contains 1, it signifies EVEX.U1 (class B 2968B). When U=0 and the MOD field 3042 contains 11 (signifying a no memory access operation), the alpha field 2952 (EVEX byte 3, bit [7]-EH) is interpreted as the rs field 2952A. When the rs field 2952A contains a 1 (round 2952A.1), the beta field 2954 (EVEX byte 3, bits [6:4]-SSS) is interpreted as the round control field 2954A. The round control field 2954A includes a one bit SAE field 2956 and a two bit round operation field 2958. When the rs field 2952A contains a 0 (data transform 2952A.2), the beta field 2954 (EVEX byte 3, bits [6:4]-SSS) is interpreted as a three bit data transform field 2954B. When U=0 and the MOD field 3042 contains 00, 01, or 10 (signifying a memory access operation), the alpha field 2952 (EVEX byte 3, bit [7]-EH) is interpreted as the eviction hint (EH) field 2952B and the beta field 2954 (EVEX byte 3, bits [6:4]-SSS) is interpreted as a three bit data manipulation field 2954C.

When U=1, the alpha field 2952 (EVEX byte 3, bit [7]—EH) is interpreted as the write mask control (Z) field 2952C. When U=1 and the MOD field 3042 contains 11 (signifying a no memory access operation), part of the beta field 2954 (EVEX byte 3, bit [4]-So) is interpreted as the RL field 2957A; when it contains a 1 (round 2957A.1) the rest of the beta field 2954 (EVEX byte 3, bit [6-5]-S$_{24}$) is interpreted as the round operation field 2959A, while when the RL field 2957A contains a 0 (VSIZE 2957.A2) the rest of the beta field 2954 (EVEX byte 3, bit [6-5]-S$_{2-1}$) is interpreted as the vector length field 2959B (EVEX byte 3, bit [6-5]-L1_0). When U=1 and the MOD field 3042 contains 00, 01, or 10 (signifying a memory access operation), the beta field 2954 (EVEX byte 3, bits [6:4]-SSS) is interpreted as the vector length field 2959B (EVEX byte 3, bit [6-5]-Li$_{1-0}$ and the broadcast field 2957B (EVEX byte 3, bit [4]-B).

Exemplary Register Architecture

Figure 31:
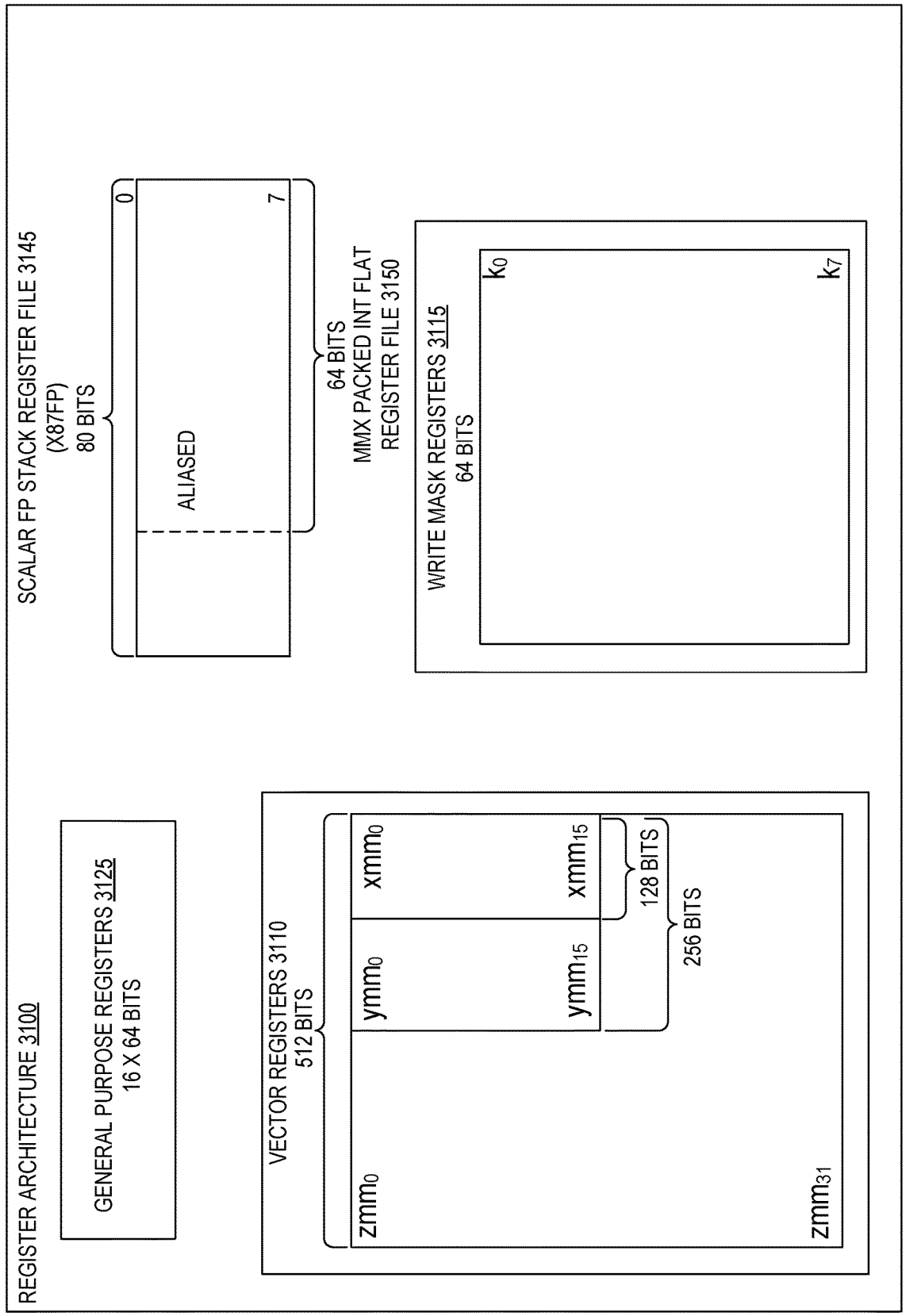
FIG. 31 is a block diagram of a register architecture according to one embodiment of the disclosure

FIG. 31 is a block diagram of a register architecture 3100 according to one embodiment of the disclosure. In the embodiment illustrated, there are 32 vector registers 3110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 3000 operates on these overlaid register file as illustrated in the below tables.

| Adjustable Vector Length | Class | Operations | Registers |
|---|---|---|---|
| Instruction Templates that do not include the vector length field 2959B | A (FIG. 29A; U = 0) | 2910, 2915, 2925, 2930 | zmm registers (the vector length is 64 byte) |
| | B (FIG. 29B; U = 1) | 2912 | zmm registers (the vector length is 64 byte) |
| Instruction templates that do include the vector length field 2959B | B (FIG. 29B; U = 1) | 2917, 2927 | zmm, ymm, or xmm registers (the vector length is 64 byte, 32 byte, or 16 byte) depending on the vector length field 2959B |

In other words, the vector length field 2959B selects between a maximum length and one or more other shorter lengths, where each such shorter length is half the length of the preceding length; and instructions templates without the vector length field 2959B operate on the maximum vector length. Further, in one embodiment, the class B instruction templates of the specific vector friendly instruction format 3000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 3115—in the embodiment illustrated, there are 8 write mask registers (k0 through k7), each 64 bits in size. In an alternate embodiment, the write mask registers 3115 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 3125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3145, on which is aliased the MMX packed integer flat register file 3150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 32A is a block diagram illustrating both an exemplary in-order pipeline and an exemplary register renaming, out-of-order issue/execution pipeline according to embodiments of the disclosure. FIG. 32B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 32A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 32A, a processor pipeline 3200 includes a fetch stage 3202, a length decode stage 3204, a decode stage 3206, an allocation stage 3208, a renaming stage 3210, a scheduling (also known as a dispatch or issue) stage 3212, a register read/memory read stage 3214, an execute stage 3216, a write back/memory write stage 3218, an exception handling stage 3222, and a commit stage 3224.

FIG. 32B shows processor core 3290 including a front end unit 3230 coupled to an execution engine unit 3250, and both are coupled to a memory unit 3270. The core 3290 may be a reduced instruction set computing (RISC) core, a complex instruction set computing (CISC) core, a very long instruction word (VLIW) core, or a hybrid or alternative core type. As yet another option, the core 3290 may be a special-purpose core, such as, for example, a network or communication core, compression engine, coprocessor core, general purpose computing graphics processing unit (GPGPU) core, graphics core, or the like.

The front end unit 3230 includes a branch prediction unit 3232 coupled to an instruction cache unit 3234, which is coupled to an instruction translation lookaside buffer (TLB) 3236, which is coupled to an instruction fetch unit 3238, which is coupled to a decode unit 3240. The decode unit 3240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 3240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3290 includes a microcode ROM or other medium that stores microcode for certain macro-instructions (e.g., in decode unit 3240 or otherwise within the front end unit 3230). The decode unit 3240 is coupled to a rename/allocator unit 3252 in the execution engine unit 3250.

The execution engine unit 3250 includes the rename/allocator unit 3252 coupled to a retirement unit 3254 and a set of one or more scheduler unit(s) 3256. The scheduler unit(s) 3256 represents any number of different schedulers, including reservations stations, central instruction window, etc. The scheduler unit(s) 3256 is coupled to the physical register file(s) unit(s) 3258. Each of the physical register file(s) units 3258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3258 comprises a vector registers unit, a write mask registers unit, and a scalar registers unit. These register units may provide architectural vector registers, vector mask registers, and general purpose registers. The physical register file(s) unit(s) 3258 is overlapped by the retirement unit 3254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3254 and the physical register file(s) unit(s) 3258 are coupled to the execution cluster(s) 3260. The execution cluster(s) 3260 includes a set of one or more execution units 3262 and a set of one or more memory access units 3264. The execution units 3262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3256, physical register file(s) unit(s) 3258, and execution cluster(s) 3260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3264). It should also be understood that where separate pipelines are used, one or more of these pipelines may be out-of-order issue/execution and the rest in-order.

The set of memory access units 3264 is coupled to the memory unit 3270, which includes a data TLB unit 3272 coupled to a data cache unit 3274 coupled to a level 2 (L2) cache unit 3276. In one exemplary embodiment, the memory access units 3264 may include a load unit, a store address unit, and a store data unit, each of which is coupled to the data TLB unit 3272 in the memory unit 3270. The instruction cache unit 3234 is further coupled to a level 2 (L2) cache unit 3276 in the memory unit 3270. The L2 cache unit 3276 is coupled to one or more other levels of cache and eventually to a main memory.

By way of example, the exemplary register renaming, out-of-order issue/execution core architecture may implement the pipeline 3200 as follows: 1) the instruction fetch 3238 performs the fetch and length decoding stages 3202 and 3204; 2) the decode unit 3240 performs the decode stage 3206; 3) the rename/allocator unit 3252 performs the allocation stage 3208 and renaming stage 3210; 4) the scheduler unit(s) 3256 performs the schedule stage 3212; 5) the physical register file(s) unit(s) 3258 and the memory unit 3270 perform the register read/memory read stage 3214; the execution cluster 3260 perform the execute stage 3216; 6) the memory unit 3270 and the physical register file(s) unit(s) 3258 perform the write back/memory write stage 3218; 7) various units may be involved in the exception handling stage 3222; and 8) the retirement unit 3254 and the physical register file(s) unit(s) 3258 perform the commit stage 3224.

The core 3290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3290 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 3234/3274 and a shared L2 cache unit 3276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 33B:
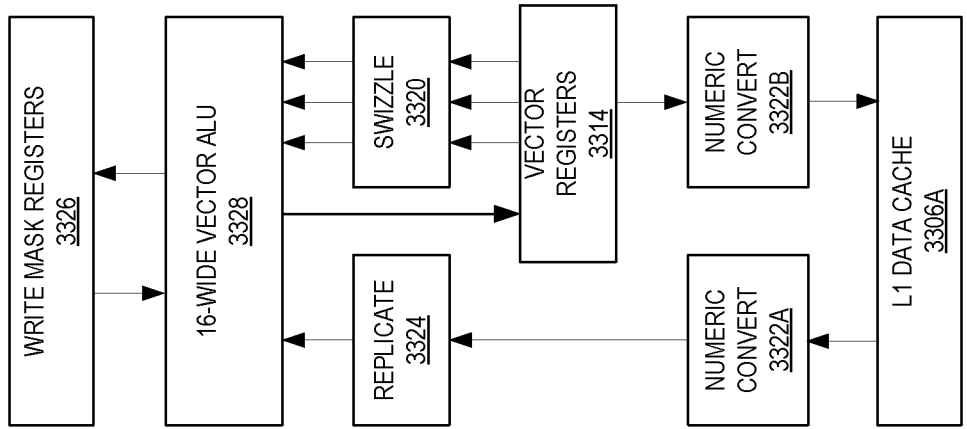
FIG. 33B is an expanded view of part of the processor core in FIG. 33A according to embodiments of the disclosure.
Figure 33A:
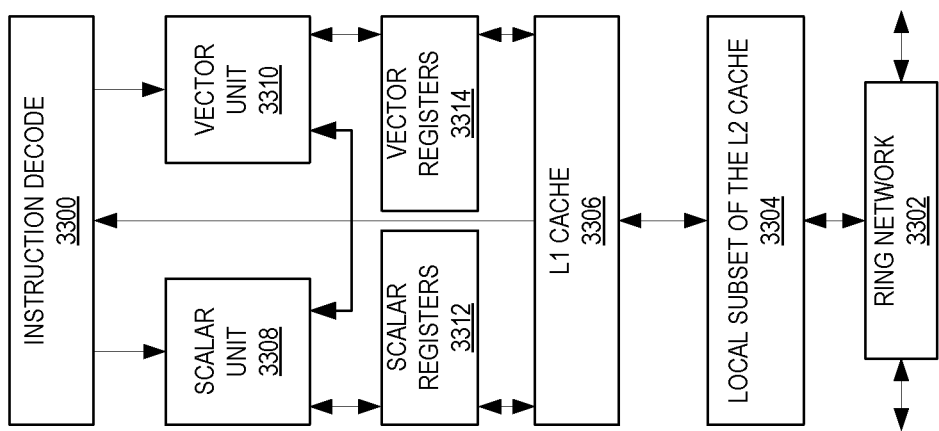
FIG. 33A is a block diagram of a single processor core, along with its connection to the on-die interconnect network and with its local subset of the Level 2 (L2) cache, according to embodiments of the disclosure.

FIGS. 33A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 33A is a block diagram of a single processor core, along with its connection to the on-die interconnect network 3302 and with its local subset of the Level 2 (L2) cache 3304, according to embodiments of the disclosure. In one embodiment, an instruction decode unit 3300 supports the x86 instruction set with a packed data instruction set extension. An L1 cache 3306 allows low-latency accesses to cache memory into the scalar and vector units. While in one embodiment (to simplify the design), a scalar unit 3308 and a vector unit 3310 use separate register sets (respectively, scalar registers 3312 and vector registers 3314) and data transferred between them is written to memory and then read back in from a level 1 (L1 cache 3306, alternative embodiments of the disclosure may use a different approach (e.g., use a single register set or include a communication path that allow data to be transferred between the two register files without being written and read back).

The local subset of the L2 cache 3304 is part of a global L2 cache that is divided into separate local subsets, one per processor core. Each processor core has a direct access path to its own local subset of the L2 cache 3304. Data read by a processor core is stored in its L2 cache subset 3304 and can be accessed quickly, in parallel with other processor cores accessing their own local L2 cache subsets. Data written by a processor core is stored in its own L2 cache subset 3304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 33B is an expanded view of part of the processor core in FIG. 33A according to embodiments of the disclosure. FIG. 33B includes an L1 data cache 3306A part of the L1 cache 3304, as well as more detail regarding the vector unit 3310 and the vector registers 3314. Specifically, the vector unit 3310 is a 16-wide vector processing unit (VPU) (see the 16-wide ALU 3328), which executes one or more of integer, single-precision float, and double-precision float instructions. The VPU supports swizzling the register inputs with swizzle unit 3320, numeric conversion with numeric convert units 3322A-B, and replication with replication unit 3324 on the memory input. Write mask registers 3326 allow predicating resulting vector writes.

Figure 34:
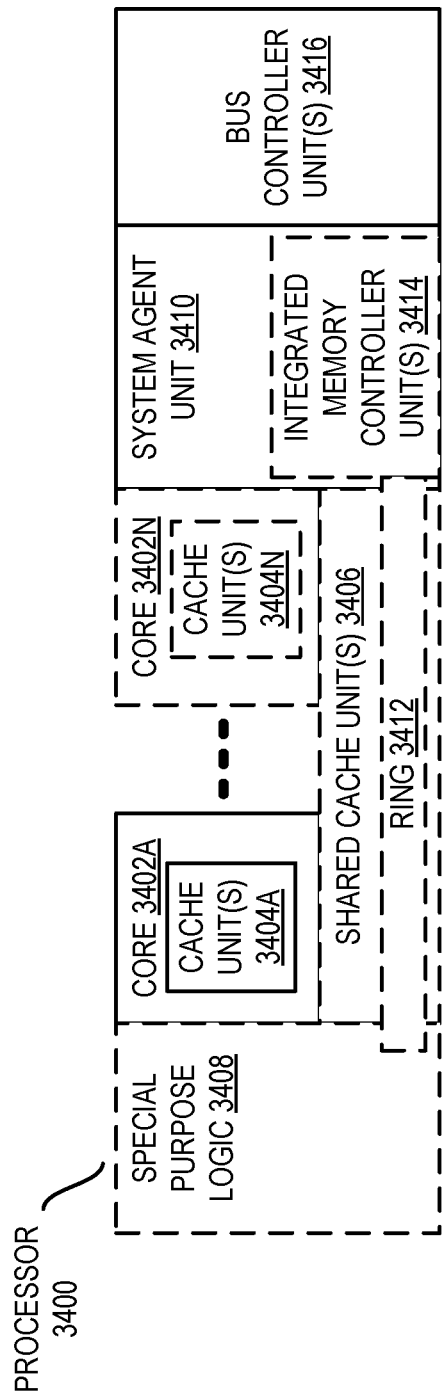
FIG. 34 is a block diagram of a processor that may have more than one core, may have an integrated memory controller, and may have integrated graphics according to embodiments of the disclosure.

FIG. 34 is a block diagram of a processor 3400 that may have more than one core, may have an integrated memory controller, and may have integrated graphics according to embodiments of the disclosure. The solid lined boxes in FIG. 34 illustrate a processor 3400 with a single core 3402A, a system agent 3410, a set of one or more bus controller units 3416, while the optional addition of the dashed lined boxes illustrates an alternative processor 3400 with multiple cores 3402A-N, a set of one or more integrated memory controller unit(s) 3414 in the system agent unit 3410, and special purpose logic 3408.

Thus, different implementations of the processor 3400 may include: 1) a CPU with the special purpose logic 3408 being integrated graphics and/or scientific (throughput) logic (which may include one or more cores), and the cores 3402A-N being one or more general purpose cores (e.g., general purpose in-order cores, general purpose out-of-order cores, a combination of the two); 2) a coprocessor with the cores 3402A-N being a large number of special purpose cores intended primarily for graphics and/or scientific (throughput); and 3) a coprocessor with the cores 3402A-N being a large number of general purpose in-order cores. Thus, the processor 3400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3406, and external memory (not shown) coupled to the set of integrated memory controller units 3414. The set of shared cache units 3406 may include one or more mid-level caches, such as level 2 (L2), level 3 (L3), level 4 (L4), or other levels of cache, a last level cache (LLC), and/or combinations thereof. While in one embodiment a ring based interconnect unit 3412 interconnects the integrated graphics logic 3408, the set of shared cache units 3406, and the system agent unit 3410/integrated memory controller unit(s) 3414, alternative embodiments may use any number of well-known techniques for interconnecting such units. In one embodiment, coherency is maintained between one or more cache units 3406 and cores 3402-A-N.

In some embodiments, one or more of the cores 3402A-N are capable of multi-threading. The system agent 3410 includes those components coordinating and operating cores 3402A-N. The system agent unit 3410 may include for example a power control unit (PCU) and a display unit. The PCU may be or include logic and components needed for regulating the power state of the cores 3402A-N and the integrated graphics logic 3408. The display unit is for driving one or more externally connected displays.

The cores 3402A-N may be homogenous or heterogeneous in terms of architecture instruction set; that is, two or more of the cores 3402A-N may be capable of execution the same instruction set, while others may be capable of executing only a subset of that instruction set or a different instruction set.

Exemplary Computer Architectures

FIGS. 35-38 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 35:
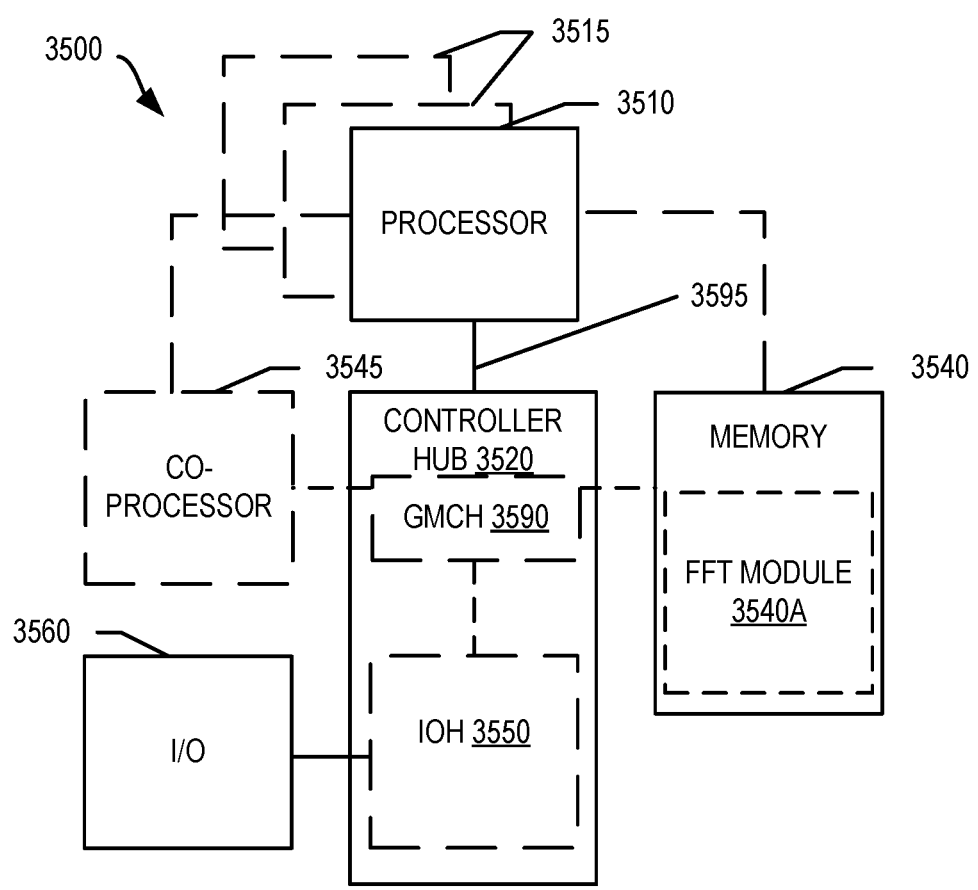
FIG. 35 is a block diagram of a system in accordance with one embodiment of the present disclosure.

Referring now to FIG. 35, shown is a block diagram of a system 3500 in accordance with one embodiment of the present disclosure. The system 3500 may include one or more processors 3510, 3515, which are coupled to a controller hub 3520. In one embodiment the controller hub 3520 includes a graphics memory controller hub (GMCH) 3590 and an Input/Output Hub (IOH) 3550 (which may be on separate chips); the GMCH 3590 includes memory and graphics controllers to which are coupled memory 3540 and a coprocessor 3545; the IOH 3550 is couples input/output (I/O) devices 3560 to the GMCH 3590. Alternatively, one or both of the memory and graphics controllers are integrated within the processor (as described herein), the memory 3540 and the coprocessor 3545 are coupled directly to the processor 3510, and the controller hub 3520 in a single chip with the IOH 3550. Memory 3540 may include a fast Fourier transform (FFT) module 3540A, for example, to store code that when executed causes a processor to perform any method of this disclosure.

The optional nature of additional processors 3515 is denoted in FIG. 35 with broken lines. Each processor 3510, 3515 may include one or more of the processing cores described herein and may be some version of the processor 3400.

The memory 3540 may be, for example, dynamic random access memory (DRAM), phase change memory (PCM), or a combination of the two. For at least one embodiment, the controller hub 3520 communicates with the processor(s) 3510, 3515 via a multi-drop bus, such as a frontside bus (FSB), point-to-point interface such as Quickpath Interconnect (QPI), or similar connection 3595.

In one embodiment, the coprocessor 3545 is a special-purpose processor, such as, for example, a high-throughput MIC processor, a network or communication processor, compression engine, graphics processor, GPGPU, embedded processor, or the like. In one embodiment, controller hub 3520 may include an integrated graphics accelerator.

There can be a variety of differences between the physical resources 3510, 3515 in terms of a spectrum of metrics of merit including architectural, microarchitectural, thermal, power consumption characteristics, and the like.

In one embodiment, the processor 3510 executes instructions that control data processing operations of a general type. Embedded within the instructions may be coprocessor instructions. The processor 3510 recognizes these coprocessor instructions as being of a type that should be executed by the attached coprocessor 3545. Accordingly, the processor 3510 issues these coprocessor instructions (or control signals representing coprocessor instructions) on a coprocessor bus or other interconnect, to coprocessor 3545. Coprocessor(s) 3545 accept and execute the received coprocessor instructions.

Figure 36:
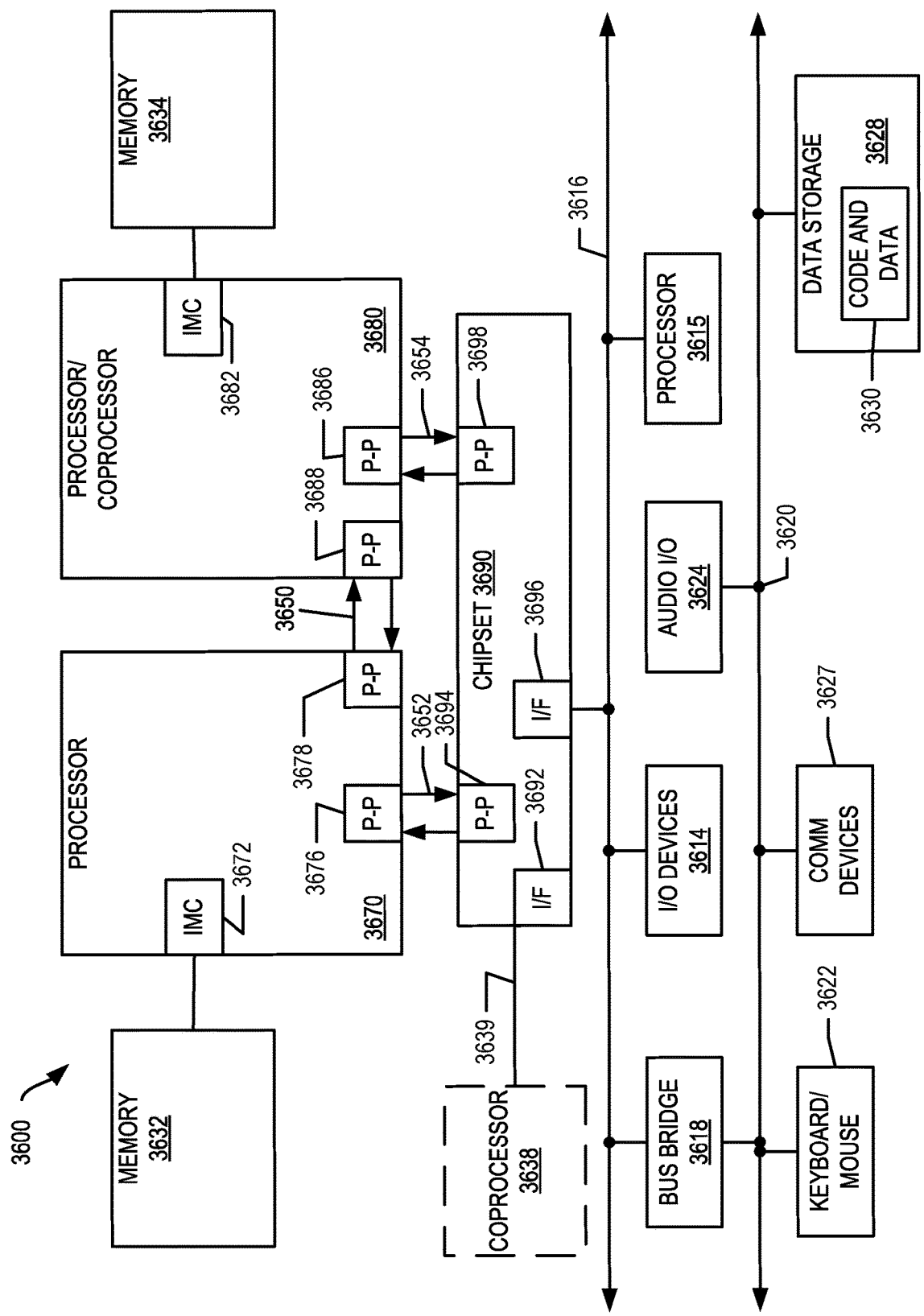
FIG. 36 is a block diagram of a more specific exemplary system in accordance with an embodiment of the present disclosure.

Referring now to FIG. 36, shown is a block diagram of a first more specific exemplary system 3600 in accordance with an embodiment of the present disclosure. As shown in FIG. 36, multiprocessor system 3600 is a point-to-point interconnect system, and includes a first processor 3670 and a second processor 3680 coupled via a point-to-point interconnect 3650. Each of processors 3670 and 3680 may be some version of the processor 3400. In one embodiment of the disclosure, processors 3670 and 3680 are respectively processors 3510 and 3515, while coprocessor 3638 is coprocessor 3545. In another embodiment, processors 3670 and 3680 are respectively processor 3510 coprocessor 3545.

Processors 3670 and 3680 are shown including integrated memory controller (IMC) units 3672 and 3682, respectively. Processor 3670 also includes as part of its bus controller units point-to-point (P-P) interfaces 3676 and 3678; similarly, second processor 3680 includes P-P interfaces 3686 and 3688. Processors 3670, 3680 may exchange information via a point-to-point (P-P) interface 3650 using P-P interface circuits 3678, 3688. As shown in FIG. 36, IMCs 3672 and 3682 couple the processors to respective memories, namely a memory 3632 and a memory 3634, which may be portions of main memory locally attached to the respective processors.

Processors 3670, 3680 may each exchange information with a chipset 3690 via individual P-P interfaces 3652, 3654 using point to point interface circuits 3676, 3694, 3686, 3698. Chipset 3690 may optionally exchange information with the coprocessor 3638 via a high-performance interface 3639. In one embodiment, the coprocessor 3638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3690 may be coupled to a first bus 3616 via an interface 3696. In one embodiment, first bus 3616 may be a Peripheral Component Interconnect (PCI) bus, or a bus such as a PCI Express bus or another third generation I/O interconnect bus, although the scope of the present disclosure is not so limited.

As shown in FIG. 36, various I/O devices 3614 may be coupled to first bus 3616, along with a bus bridge 3618 which couples first bus 3616 to a second bus 3620. In one embodiment, one or more additional processor(s) 3615, such as coprocessors, high-throughput MIC processors, GPGPU's, accelerators (such as, e.g., graphics accelerators or digital signal processing (DSP) units), field programmable gate arrays, or any other processor, are coupled to first bus 3616. In one embodiment, second bus 3620 may be a low pin count (LPC) bus. Various devices may be coupled to a second bus 3620 including, for example, a keyboard and/or mouse 3622, communication devices 3627 and a storage unit 3628 such as a disk drive or other mass storage device which may include instructions/code and data 3630, in one embodiment. Further, an audio I/O 3624 may be coupled to the second bus 3620. Note that other architectures are possible. For example, instead of the point-to-point architecture of FIG. 36, a system may implement a multi-drop bus or other such architecture.

Figure 37:
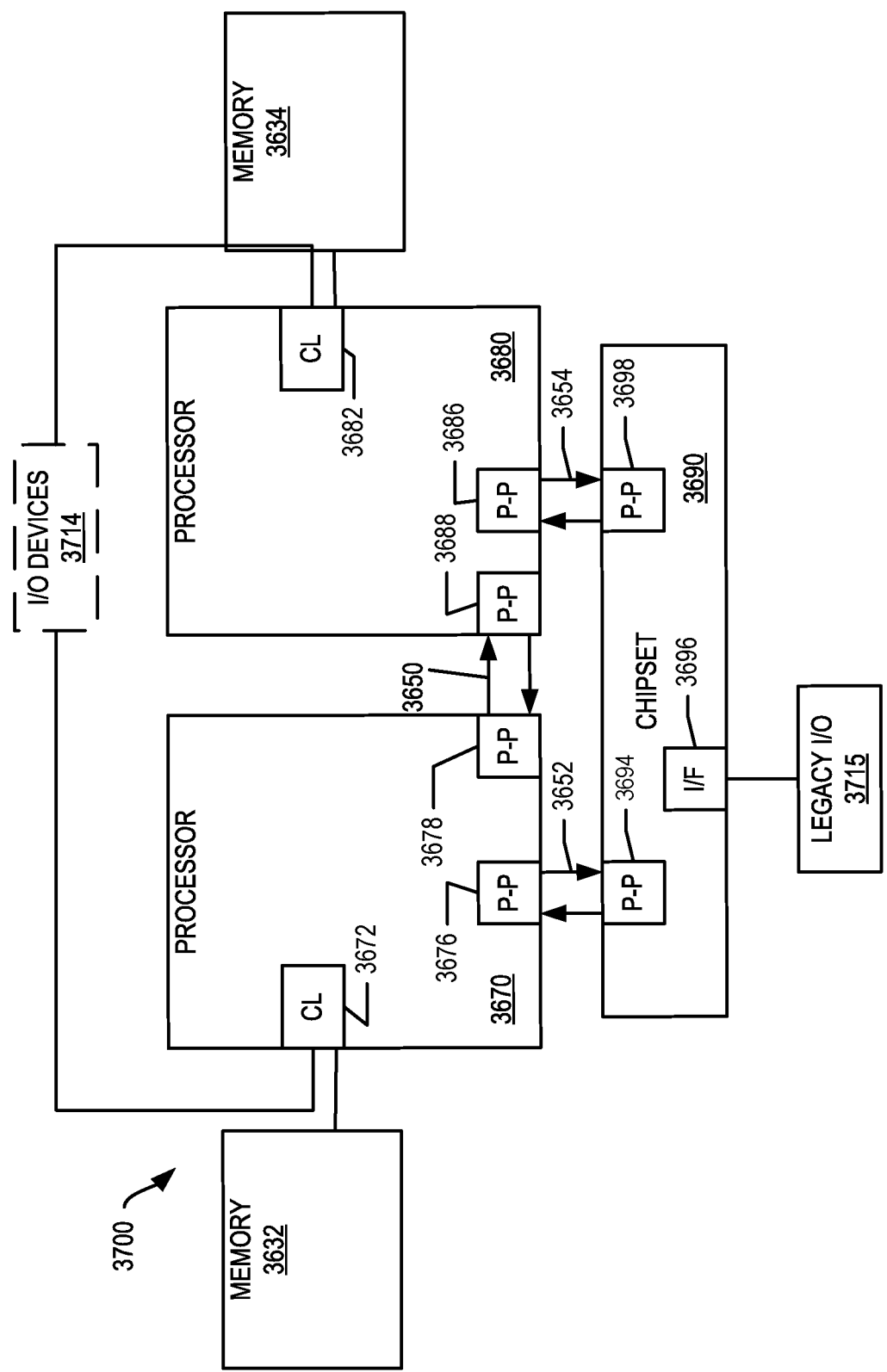
FIG. 37, shown is a block diagram of a second more specific exemplary system in accordance with an embodiment of the present disclosure.

Referring now to FIG. 37, shown is a block diagram of a second more specific exemplary system 3700 in accordance with an embodiment of the present disclosure. Like elements in FIGS. 36 and 37 bear like reference numerals, and certain aspects of FIG. 36 have been omitted from FIG. 37 in order to avoid obscuring other aspects of FIG. 37.

FIG. 37 illustrates that the processors 3670, 3680 may include integrated memory and I/O control logic ("CL") 3672 and 3682, respectively. Thus, the CL 3672, 3682 include integrated memory controller units and include I/O control logic. FIG. 37 illustrates that not only are the memories 3632, 3634 coupled to the CL 3672, 3682, but also that I/O devices 3714 are also coupled to the control logic 3672, 3682. Legacy I/O devices 3715 are coupled to the chipset 3690.

Figure 38:
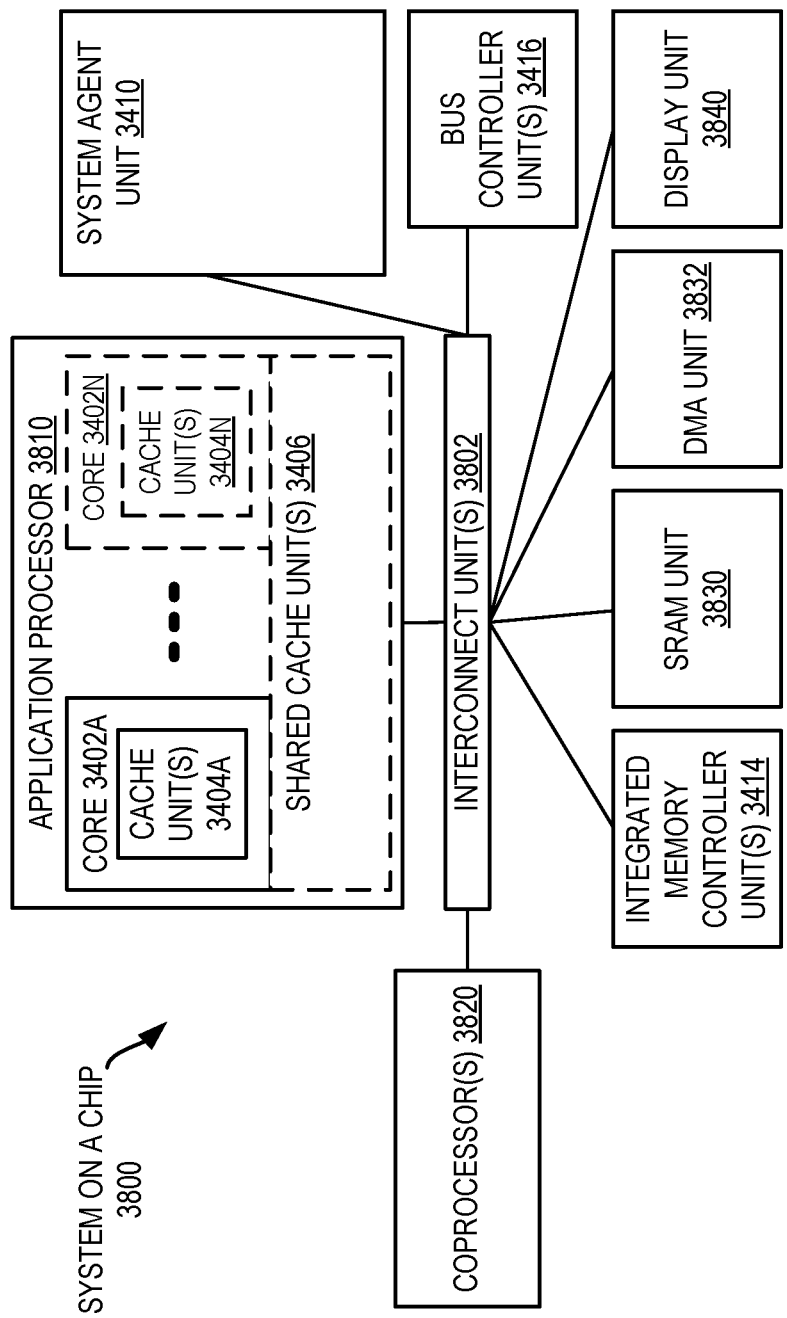
FIG. 38, shown is a block diagram of a system on a chip (SoC) in accordance with an embodiment of the present disclosure.

Referring now to FIG. 38, shown is a block diagram of a SoC 3800 in accordance with an embodiment of the present disclosure. Similar elements in FIG. 34 bear like reference numerals. Also, dashed lined boxes are optional features on more advanced SoCs. In FIG. 38, an interconnect unit(s) 3802 is coupled to: an application processor 3810 which includes a set of one or more cores 202A-N and shared cache unit(s) 3406; a system agent unit 3410; a bus controller unit(s) 3416; an integrated memory controller unit(s) 3414; a set or one or more coprocessors 3820 which may include integrated graphics logic, an image processor, an audio processor, and a video processor; an static random access memory (SRAM) unit 3830; a direct memory access (DMA) unit 3832; and a display unit 3840 for coupling to one or more external displays. In one embodiment, the coprocessor(s) 3820 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 3630 illustrated in FIG. 36, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, nontransitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 39:
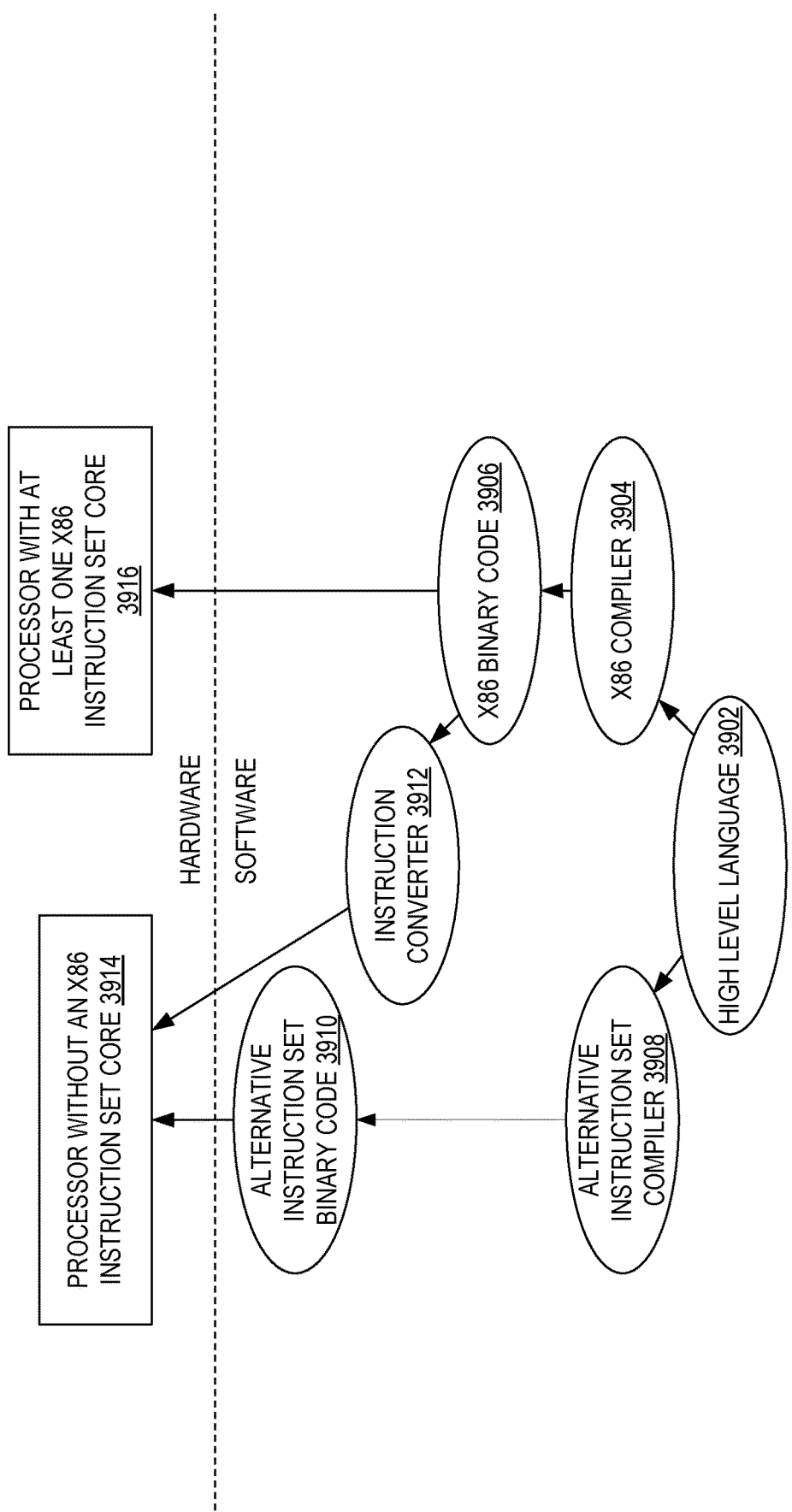
FIG. 39 is a block diagram contrasting the use of a software instruction converter to convert binary instructions in a source instruction set to binary instructions in a target instruction set according to embodiments of the disclosure.

FIG. 39 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 39 shows a program in a high level language 3902 may be compiled using an x86 compiler 3904 to generate x86 binary code 3906 that may be natively executed by a processor with at least one x86 instruction set core 3916. The processor with at least one x86 instruction set core 3916 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 3904 represents a compiler that is operable to generate x86 binary code 3906 (e.g., object code) that can, with or without additional linkage processing, be executed on the processor with at least one x86 instruction set core 3916. Similarly, FIG. 39 shows the program in the high level language 3902 may be compiled using an alternative instruction set compiler 3908 to generate alternative instruction set binary code 3910 that may be natively executed by a processor without at least one x86 instruction set core 3914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3912 is used to convert the x86 binary code 3906 into code that may be natively executed by the processor without an x86 instruction set core 3914. This converted code is not likely to be the same as the alternative instruction set binary code 3910 because an instruction converter capable of this is difficult to make; however, the converted code will accomplish the general operation and be made up of instructions from the alternative instruction set. Thus, the instruction converter 3912 represents software, firmware, hardware, or a combination thereof that, through emulation, simulation or any other process, allows a processor or other electronic device that does not have an x86 instruction set processor or core to execute the x86 binary code 3906.

What is claimed is:

1. An apparatus comprising:
a matrix operations accelerator circuit comprising a two-dimensional grid of processing element circuits;
a first plurality of registers that represents a first two-dimensional matrix coupled to the matrix operations accelerator circuit;
a second plurality of registers that represents a second two-dimensional matrix coupled to the matrix operations accelerator circuit;
a decoder, of a core coupled to the matrix operations accelerator circuit, to decode a single instruction into a decoded single instruction; and
a circuit of the core to execute the decoded single instruction to:
switch the matrix operations accelerator circuit from a first mode where each processing element circuit operates on corresponding, same positioned elements of the first two-dimensional matrix and the second two-dimensional matrix to a second mode where:
a first packed data input value of a first complex number from the first plurality of registers is sent to split and swap circuitry that:
sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and
sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product,
the first fused multiply accumulate circuit subtracts the third product from the first product to generate a first result, and
the second fused multiply accumulate circuit adds the second product and the fourth product to generate a second result.

2. The apparatus of claim 1, wherein the circuit is to execute the decoded single instruction to send the first complex twiddle factor value from the second plurality of registers to the split and swap circuitry.

3. The apparatus of claim 1, wherein the circuit is to execute the decoded single instruction to cause subtractor circuitry to subtract the first result from a real element of a second packed data input value from the first plurality of registers to generate a third result, subtract the second result from an imaginary element of the second packed data input value from the first plurality of registers to generate a fourth result, and store the third result and the fourth result as packed data in the first plurality of registers.

4. The apparatus of claim 1, wherein the circuit is to execute the decoded single instruction to cause the real element and the imaginary element of the first packed data input value to be sent together to a repeat circuit for each input port of the first fused multiply accumulate circuit and the second fused multiply accumulate circuit.

5. The apparatus of claim 4, wherein the circuit is to execute the decoded single instruction to cause a swap circuit coupled to an input port of the second fused multiply accumulate circuit to swap the order of the real element and the imaginary element of the first packed data input value.

6. The apparatus of claim 1, wherein the single instruction includes at least one field that indicates the values are single-precision floating-point values.

7. The apparatus of claim 1, wherein the decoder is to decode a second instruction into a decoded second instruction; and the circuit is to execute the decoded second instruction to cause the matrix operations accelerator circuit in the second mode to generate the first result and the second result.

8. The apparatus of claim 1, wherein the circuit is to execute the decoded single instruction to cause the matrix operations accelerator circuit in the second mode to generate the first result and the second result.

9. A method comprising:
decoding, with a decoder of a core, a single instruction into a decoded single instruction, wherein the core is coupled to a matrix operations accelerator circuit comprising a two-dimensional grid of processing element circuits, and the matrix operations accelerator circuit is coupled to a first plurality of registers that represents a first two-dimensional matrix and a second plurality of registers that represents a second two-dimensional matrix; and
executing the decoded single instruction with a circuit of the core to:
switch the matrix operations accelerator circuit from a first mode where each processing element circuit operates on corresponding, same positioned elements of the first two-dimensional matrix and the second two-dimensional matrix to a second mode where:
a first packed data input value of a first complex number from the first plurality of registers is sent to split and swap circuitry that:
sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and
sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result.

10. The method of claim 9, wherein the executing the decoded single instruction sends the first complex twiddle factor value from the second plurality of registers to the split and swap circuitry.

11. The method of claim 9, wherein the executing the decoded single instruction causes subtractor circuitry to subtract the first result from a real element of a second packed data input value from the first plurality of registers to generate a third result, subtract the second result from an imaginary element of the second packed data input value from the first plurality of registers to generate a fourth result, and store the third result and the fourth result as packed data in the first plurality of registers.

12. The method of claim 9, wherein the executing the decoded single instruction causes the real element and the imaginary element of the first packed data input value to be sent together to a repeat circuit for each input port of the first fused multiply accumulate circuit and the second fused multiply accumulate circuit.

13. The method of claim 12, wherein the executing the decoded single instruction causes a swap circuit coupled to an input port of the second fused multiply accumulate circuit to swap the order of the real element and the imaginary element of the first packed data input value.

14. The method of claim 9, wherein the single instruction includes at least one field that indicates the values are double-precision floating-point values.

15. The method of claim 9, further comprising decoding a second instruction into a decoded second instruction with the decoder; and executing the decoded second instruction with the circuit to cause the matrix operations accelerator circuit in the second mode to generate the first result and the second result.

16. The method of claim 9, wherein the executing the decoded single instruction causes the matrix operations accelerator circuit in the second mode to generate the first result and the second result.

17. A non-transitory machine readable medium that stores code that when executed by a machine causes the machine to perform a method comprising:

decoding, with a decoder of a core, a single instruction into a decoded single instruction, wherein the core is coupled to a matrix operations accelerator circuit comprising a two-dimensional grid of processing element circuits, and the matrix operations accelerator circuit is coupled to a first plurality of registers that represents a first two-dimensional matrix and a second plurality of registers that represents a second two-dimensional matrix; and executing the decoded single instruction with a circuit of the core to:

switch the matrix operations accelerator circuit from a first mode where each processing element circuit operates on corresponding, same positioned elements of the first two-dimensional matrix and the second two-dimensional matrix to a second mode where:

a first packed data input value of a first complex number from the first plurality of registers is sent to split and swap circuitry that:

sends a real element from the first packed data input value to a first fused multiply accumulate circuit and an imaginary element from the first packed data input value to a second fused multiply accumulate circuit, the first fused multiply accumulate circuit multiplies the real element from the first packed data input value with a real element of a first complex twiddle factor value to generate a first product, and the second fused multiply accumulate circuit multiplies the imaginary element from the first packed data input value with an imaginary element of the first complex twiddle factor value to generate a second product, and sends the real element from the first packed data input value to the second fused multiply accumulate circuit and the imaginary element from the first packed data input value to the first fused multiply accumulate circuit, the first fused multiply accumulate circuit multiplies the imaginary element from the first packed data input value with the real element of the first complex twiddle factor value to generate a third product, and the second fused multiply accumulate circuit multiplies the real element from the first packed data input value with the imaginary element of the first complex twiddle factor value to generate a fourth product, the first fused multiply accumulate circuit subtracts the third product from the first product to generate a first result, and the second fused multiply accumulate circuit adds the second product and the fourth product to generate a second result.

18. The non-transitory machine readable medium of claim 17, wherein the executing the decoded single instruction sends the first complex twiddle factor value from the second plurality of registers to the split and swap circuitry.

19. The non-transitory machine readable medium of claim 17, wherein the executing the decoded single instruction causes subtractor circuitry to subtract the first result from a real element of a second packed data input value from the first plurality of registers to generate a third result, subtract the second result from an imaginary element of the second packed data input value from the first plurality of registers to generate a fourth result, and store the third result and the fourth result as packed data in the first plurality of registers.

20. The non-transitory machine readable medium of claim 17, wherein the executing the decoded single instruction causes the real element and the imaginary element of the first packed data input value to be sent together to a repeat circuit for each input port of the first fused multiply accumulate circuit and the second fused multiply accumulate circuit.

21. The non-transitory machine readable medium of claim 20, wherein the executing the decoded single instruction causes a swap circuit coupled to an input port of the second fused multiply accumulate circuit to swap the order of the real element and the imaginary element of the first packed data input value.

22. The non-transitory machine readable medium of claim 17, wherein the single instruction includes at least one field that indicates the values are double-precision floating-point values.

23. The non-transitory machine readable medium of claim 17, further comprising decoding a second instruction into a decoded second instruction with the decoder; and executing the decoded second instruction with the circuit to cause the matrix operations accelerator circuit in the second mode to generate the first result and the second result.

24. The non-transitory machine readable medium of claim 17, wherein the executing the decoded single instruction causes the matrix operations accelerator circuit in the second mode to generate the first result and the second result.

\* \* \* \* \*